United States Patent
Iben et al.

(10) Patent No.: US 12,555,598 B2
(45) Date of Patent: Feb. 17, 2026

(54) SYMMETRICAL MAGNETIC HEAD AND MAGNETIC MEDIA FOR USE WITH SUCH HEAD

(71) Applicant: International Business Machines Corporation, Armonk, NY (US)

(72) Inventors: Icko E.T. Iben, Santa Clara, CA (US); Jason Liang, Campbell, CA (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 18/387,789

(22) Filed: Nov. 7, 2023

(65) Prior Publication Data

US 2025/0149061 A1 May 8, 2025

(51) Int. Cl.
*G11B 5/55* (2006.01)
(52) U.S. Cl.
CPC .................................. *G11B 5/5526* (2013.01)
(58) Field of Classification Search
None
See application file for complete search history.

(56) References Cited

U.S. PATENT DOCUMENTS

| | | | |
|---|---|---|---|
| 4,151,570 A * | 4/1979 | Ravizza | G11B 5/588 360/291.9 |
| 5,535,068 A | 7/1996 | Hughes | |
| 5,541,784 A * | 7/1996 | Cribbs | G11B 5/59633 360/77.06 |
| 5,926,336 A | 7/1999 | Le et al. | |
| 5,940,237 A | 8/1999 | Takagi | |
| 7,095,583 B2 | 8/2006 | Johnson et al. | |

(Continued)

FOREIGN PATENT DOCUMENTS

| | | |
|---|---|---|
| CN | 104715763 A | 6/2015 |
| EP | 1276099 A2 | 1/2003 |

(Continued)

OTHER PUBLICATIONS

Non-Final Office Action from U.S. Appl. No. 18/387,758, dated Jun. 13, 2024.

(Continued)

*Primary Examiner* — Fred Tzeng
(74) *Attorney, Agent, or Firm* — Zilka-Kotab, P.C.

(57) ABSTRACT

An apparatus, in accordance with one aspect of the present invention, includes a magnetic head having an array of transducers, the transducers comprising data elements, at least two first servo readers positioned toward a first end of the array and at least two second servo readers positioned toward a second end of the array. The array is symmetrical about a centerpoint of the array, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto.

25 Claims, 27 Drawing Sheets

(56) References Cited

U.S. PATENT DOCUMENTS

| | | |
|---|---|---|
| 7,307,809 B2 | 12/2007 | Neumann |
| 7,602,579 B2 | 10/2009 | Biskeborn et al. |
| 7,652,841 B2 | 1/2010 | Kawakami et al. |
| 8,493,829 B2 | 7/2013 | Katagiri |
| 8,773,795 B1 * | 7/2014 | Biskeborn .......... G11B 5/00878 360/75 |
| 9,142,224 B2 | 9/2015 | Hansen et al. |
| 9,171,563 B1 * | 10/2015 | Biskeborn .............. G11B 5/584 |
| 9,183,878 B2 | 11/2015 | Cherubini et al. |
| 9,196,264 B2 * | 11/2015 | Biskeborn .......... G11B 5/00878 |
| 9,218,838 B2 | 12/2015 | Biskeborn et al. |
| 9,336,805 B2 * | 5/2016 | Biskeborn .............. G11B 5/584 |
| 9,514,770 B2 * | 12/2016 | Biskeborn .......... G11B 5/00826 |
| 9,653,114 B1 | 5/2017 | Biskeborn et al. |
| 9,761,272 B1 | 9/2017 | Biskeborn |
| 10,102,877 B2 | 10/2018 | Biskeborn et al. |
| 10,115,430 B2 | 10/2018 | Biskeborn |
| 10,580,452 B2 | 3/2020 | Biskeborn et al. |
| 11,011,204 B2 | 5/2021 | Biskeborn et al. |
| 11,100,945 B2 | 8/2021 | Yamaga et al. |
| 11,222,659 B1 | 1/2022 | Goker |
| 11,532,325 B1 | 12/2022 | Le et al. |
| 11,605,399 B2 | 3/2023 | Peng et al. |
| 11,972,783 B1 * | 4/2024 | Bui .................... G11B 5/59633 |
| 12,148,457 B1 | 11/2024 | Iben et al. |
| 12,300,284 B1 | 5/2025 | Iben et al. |
| 2003/0053241 A1 | 3/2003 | Misawa |
| 2004/0130818 A1 | 7/2004 | Chliwnyj et al. |
| 2005/0117246 A1 * | 6/2005 | Sueki ................. G11B 5/00813 |
| 2005/0152059 A1 | 7/2005 | Hashimoto |
| 2006/0061898 A1 | 3/2006 | Nakao |
| 2007/0070538 A1 | 3/2007 | Lau et al. |
| 2007/0247738 A1 | 10/2007 | Yamagishi |
| 2007/0291408 A1 | 12/2007 | Biskeborn |
| 2009/0040643 A1 | 2/2009 | Weng et al. |
| 2009/0231756 A1 | 9/2009 | Koeppe |
| 2012/0019948 A1 | 1/2012 | Fasen |
| 2012/0212848 A1 | 8/2012 | Katagiri |
| 2013/0063836 A1 | 3/2013 | Bui et al. |
| 2015/0092294 A1 | 4/2015 | Cherubini et al. |
| 2015/0170691 A1 | 6/2015 | Biskeborn et al. |
| 2017/0256277 A1 | 9/2017 | Peng |
| 2021/0065741 A1 | 3/2021 | Nakao |
| 2023/0127110 A1 | 4/2023 | Wang et al. |
| 2023/0129110 A1 | 4/2023 | Nakao et al. |
| 2023/0253011 A1 | 8/2023 | Bui et al. |
| 2023/0267964 A1 * | 8/2023 | Biskeborn .............. G11B 5/584 |
| 2025/0149060 A1 | 5/2025 | Iben et al. |
| 2025/0149062 A1 | 5/2025 | Iben et al. |
| 2025/0149063 A1 | 5/2025 | Iben et al. |

FOREIGN PATENT DOCUMENTS

| | | |
|---|---|---|
| GB | 2518677 A | 4/2015 |
| KR | 2002-0076283 A | 10/2002 |
| TW | 200523912 A | 7/2005 |
| TW | 200540846 A | 12/2005 |
| TW | 200739541 A | 10/2007 |
| TW | 202526920 A | 7/2025 |
| WO | 2012174015 A1 | 12/2012 |
| WO | 2025/098789 A1 | 5/2025 |
| WO | 2025/098790 A1 | 5/2025 |

OTHER PUBLICATIONS

International Searching Authority, "Notification of Transmittal of the International Search Report and the Written Opinion of the International Searching Authority, or Declaration," Patent Cooperation Treaty, Jan. 7, 2025, 14 pages, International Application No.—PCT/EP2024/080089.

Raeymaekers et al., "Design of a dual stage actuator tape head with high-bandwidth track following capability," Microsystem Technologies, vol. 15, 2009, pp. 1525-1529.

Notice of Allowance from U.S. Appl. No. 18/387,776, dated Sep. 30, 2024.

Final Office Action from U.S. Appl. No. 18/387,758, dated Oct. 11, 2024.

Non-Final Office Action from U.S. Appl. No. 18/387,776, dated Aug. 26, 2024.

International Searching Authority, "Notification of Transmittal of the International Search Report and the Written Opinion of the International Searching Authority, or Declaration," Patent Cooperation Treaty, Jan. 24, 2025, 13 pages, International Application No.—PCT/ EP2024/080087.

Iben et al., U.S. Appl. No. 18/387,758, filed Nov. 7, 2023.
Iben et al., U.S. Appl. No. 18/387,776, filed Nov. 7, 2023.
Iben et al., U.S. Appl. No. 18/503,545, filed Nov. 7, 2023.
Iben et al., U.S. Appl. No. 18/503,563, filed Nov. 7, 2023.
Ibm, List of IBM Patents or Patent Applications Treated as Related, dated Nov. 17, 2023, 2 pages.

* cited by examiner

SYMMETRICAL MAGNETIC HEAD AND MAGNETIC MEDIA FOR USE WITH SUCH HEAD

BACKGROUND

The present invention relates to data storage systems, and more particularly, this invention relates to a new magnetic head design and corresponding magnetic recording tape media.

In magnetic storage systems, magnetic transducers, also referred to as "elements," read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Storing data on recording tape media is a low-cost approach to storing large scale data. However, the cost of developing the media for a given format is expensive. Increasing the usage of recording area on magnetic media lowers the overall cost of data storage, and is therefore a desirable goal.

SUMMARY

An apparatus, in accordance with one aspect of the present invention, includes a magnetic head having an array of transducers, the transducers comprising data elements, at least two first servo readers positioned toward a first end of the array and at least two second servo readers positioned toward a second end of the array. The array is symmetrical about a centerpoint of the array, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto.

An apparatus, in accordance with one approach, includes a drive mechanism for passing a magnetic tape over the magnetic head, and a controller electrically coupled to the magnetic head.

An apparatus, in accordance with another general embodiment, includes a magnetic head having an array of transducers and a second array of transducers aligned along a longitudinal axis of the array, wherein a first end of the second array is positioned adjacent the array. The array comprises data elements, at least two first servo readers positioned toward a first end of the array and at least two second servo readers positioned toward a second end of the array. The second array includes second data elements and at least two third servo readers positioned toward a second end of the second array. The array is symmetrical about a centerpoint thereof, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto. A distance between the center of the innermost second servo reader and a center of the data element of the second array closest thereto is the same as the distance between the center of the outermost first servo reader and the center of the data element closest thereto. A distance between a center of the outermost second servo reader and a center of the data element of the second array closest thereto is the same as the distance between the center of the innermost second servo reader and the center of the data element closest thereto.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

A product, in accordance with one aspect of the present invention, includes a magnetic tape having a plurality of servo bands extending along a longitudinal axis of the magnetic tape. A width $W_{SB.Tape}$ of each of the servo bands satisfies the following equation:

$$W_{SB.Tape} \sim \frac{W_{EP.Tape}}{2},$$

to an accuracy of 10%, where:

$W_{EP.Tape}$ is an average pitch of elements on the head used to read and write data and is given as.

$$W_{EP.Tape} \sim \left( \frac{W_{Tape} - 2 \cdot W_{Edge}}{\left( N_E \cdot N_{DB} + \frac{(N_{DB} + 1)}{2} \right)} \right)$$

where:
$N_E$ is the number of elements used to write each data band,
$N_{DB}$ is the number of databands specified by a format of the magnetic tape,
$W_{Edge}$ is a width of an edge band of the magnetic tape where no data and no servo pattern is written as specified by the format, and
$W_{Tape}$ is a width of the magnetic tape.

Other aspects of the present invention will become apparent from the following detailed description, which, when taken in conjunction with the drawings, illustrate by way of example the principles of the invention.

DETAILED DESCRIPTION

Figure 1:
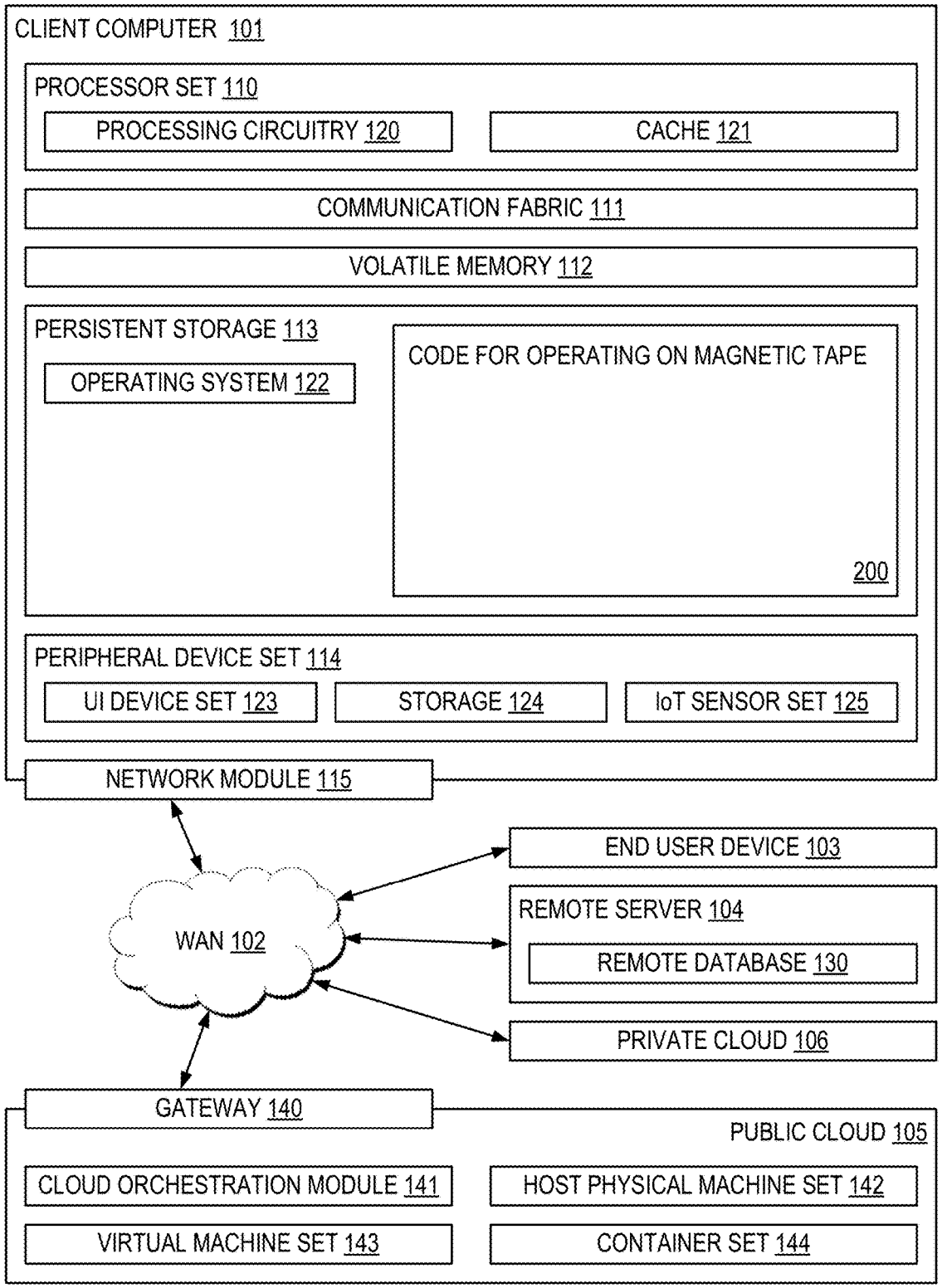
FIG. 1 is a diagram of a computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of magnetic-media-based data storage systems, as well as operation and/or component parts thereof. Various approaches include an apparatus symmetrical transducer (element) layout, with two servo readers positioned one each side of an array of data elements. Magnetic tape media for use with such apparatus is also described.

An apparatus, in accordance with one aspect of the present invention, includes a magnetic head having an array of transducers, the transducers comprising data elements such as read elements or write elements, at least two first servo readers positioned toward a first end of the array and at least two second servo readers positioned toward a second end of the array. The servo readers are preferably generally aligned with the data elements along the longitudinal axis of the array, and are positioned relative to the data elements to enable positioning of the data elements within a data band of a magnetic tape based on readback signals from at least some of the servo readers reading the servo bands that flank the data band. The array is symmetrical about a centerpoint of the array, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto. The symmetrical nature of the array and multiple servo readers on each side of the data elements enables use of narrower servo bands, which in turn allows more space on tape for data tracks, thereby increasing storage capacity per unit length of tape. Moreover, the symmetry enables use of the same design for both leading and trailing modules in a given magnetic head. In addition, a narrower servo band enable use of greater angles of the marks (e.g., magnetic bars) in the servo bands.

In one approach, which may be combined with other approaches described herein, only two of the first servo readers and only two of the second servo readers are present in the array. The dual servo per servo band option provides two benefits: (1) it enables a higher angle of the servo band marks because the maximum time to cross a servo band is cut in half; and (2) it enables higher capacity because the required value for $W_{SB}$ (described below) may be approximately half the value required for the single servo option.

In one approach, which may be combined with other approaches described herein, a number of the data elements, $N_E$, in the array is 32, the data elements having an average pitch $W_{EP.Head}$ of the data elements is in a range of 86 to 97 microns. A center to center distance $W_{SE.Short.Head}$ between the data element closest to the first end of the array and the first servo reader closest to the data elements is in a range of $(W_{EP.Head}/2)+3$ to $(W_{EP.Head}/2)+10$ microns. A center to center distance $W_{SE.Long.Head}$ between the data element closest to the first end of the array and the first servo reader farthest from the data elements is in a range of $W_{EP.Head}+3$ to $W_{EP.Head}+10$ microns. A center to center distance between the data element closest to the second end of the array and the second servo reader closest to the data element is about equal to $W_{SE.Short.Head}$. A center to center distance between the data element closest to the second end of the array and the second servo reader farthest from the data element is about equal to $W_{SE.Long.Head}$. These dimensions have been found to maximize capacity on the tape with minimal guard bands.

In one approach, which may be combined with other approaches described herein, the data elements are write elements, wherein the magnetic head includes a second array aligned with the array in an intended direction of tape travel thereacross, the second array comprising read elements, at least two third servo readers positioned toward a first end of the second array and at least two fourth servo readers positioned toward a second end of the second array, wherein the second array is symmetrical about a centerpoint thereof, e.g., as if the array were folded over on the centerline such that the second end of the array overlies the first end of the array. This feature enables read-while-write, which is important for data integrity.

In one approach, which may be combined with other approaches described herein, a longitudinal axis of the array is nominally tilted by greater than 0 degrees from normal relative to an intended direction of tape travel thereacross. The tilt provides a predefined "effective" element pitch, and enables compensation for tape lateral expansion and contraction by adjusting the tilt, which in turn increases or decreases the effective element pitch, enabling compensation for changes in tape and/or head dimensions due to moisture, thermal expansion and contraction, etc.

In one approach, which may be combined with other approaches described herein, a second array of transducers is aligned along a longitudinal axis of the array. A first end of the second array is positioned adjacent the array. The second array of transducers comprises second data elements and at least two third servo readers positioned toward a second end of the second array. The number of the second data elements is equal to the number of the data elements, A distance between the center of the innermost second servo reader and a center of the second data element of the second array closest thereto is the same as the distance between the center of the outermost first servo reader and the center of the data element closest thereto. A distance between a center of the outermost second servo reader and a center of the second data element of the second array closest thereto is the same as the distance between the center of the innermost second servo reader and the center of the data element closest thereto. An apparatus with such configuration, and as further described herein, increases the capacity written on tape and also greatly increases the rate at which data can be written or read, by operating on two data bands.

In a preferred approach, a combined array consisting of the array and the second array is symmetrical about a centerpoint of the combined array. Such symmetry provides similar benefits as noted above for approach having the symmetrical array.

In one approach, which may be combined with other approaches described herein, an average pitch $W_{EP.Head}$ of the data elements satisfies one or more of the following equations:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(\theta_o)}$$

$$W_{EP.Head} \sim \frac{W_{Tape} - 2 \cdot W_{Edge}}{N_E \cdot N_{DB} \cdot \cos(\theta_o)}$$

with an accuracy of 10% (e.g., within a range of ±10% of the value given by inserting the appropriate variables into the equation), where:

$W_{Tape}$ is a total width of a magnetic tape specified by a format for which the apparatus is designed, $W_{Edge}$ is a width of an edge band of the magnetic tape specified by the format, $N_E$ is a total number of data elements in the array, $N_{DB}$ is a number of data bands on the magnetic tape specified by the format, and $\theta_o$ is a nominal tilt angle of the magnetic head relative to normal from an intended direction of tape travel across the magnetic head. This pitch enables writing of more data tracks to the tape, increasing data storage capacity.

In one approach, which may be combined with other approaches described herein, an average pitch $W_{EP.Head}$ of the data elements satisfies the following equation:

$$W_{EP.Head} = \left( \frac{W_{Tape} - 2 \cdot W_{Edge} - (N_{DB} + 1) \cdot (W_S \cdot \cos(\theta_o) + 2 \cdot W_{SBG} - W_{TP.Nom})}{\left(N_E \cdot N_{DB} + \frac{(N_{DB} + 1)}{2}\right) \cdot \cos(\theta_o)} \right)$$

with an accuracy of 2% (e.g., within a range of +2% of the value given by inserting the appropriate variables into the equation), where:

$W_{Tape}$ is a total width of a magnetic tape specified by a format for which the apparatus is designed, $W_{Edge}$ is a width of an edge band of the magnetic tape specified by the format, $W_S$ is a width of a servo band of the magnetic tape specified by the format, $W_{SBG}$ is a width of a servo band guard of the magnetic tape specified by the format (e.g., preferably $W_{SBG}$ is in a range of greater than 0 to 5 microns, more preferably less than about 4 microns, more preferably less than about 3.1 microns), $W_{TP.Nom}$ is a predefined nominal data track pitch that is preferably in a range of greater than 0 to 650 nanometers, $N_E$ is a total number of data elements in the array for performing data operations on one data band, $N_{DB}$ is a number of data bands on the magnetic tape specified by the format, and $\theta_o$ is a nominal tilt angle of the magnetic head relative to normal from an intended direction of tape travel across the magnetic head. This pitch enables writing of more data tracks to the tape, increasing data storage capacity.

In one approach, which may be combined with other approaches described herein, the distance $W_{SE.Short.Head}$ between the center of the innermost first servo reader and the center of the data element closest thereto satisfies the following equation:

$$W_{SE.Short.Head} \sim \frac{W_{EP.Head}}{2} + \frac{W_S}{2} + \frac{W_{SBG}}{\cos(\theta_o)}$$

with an accuracy of 2%, where:

$W_{EP.Head}$ is an average pitch of the data elements of the array, $W_S$ is the width of the servo readers in the array, $W_{SBG}$ is a width of a servo band guard specified by a format for which the apparatus is designed, where $W_{SBG}$ is preferably in a range of greater than 0 to 5 microns, more preferably less than about 4 microns, more preferably less than about 3.1 microns, and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

In one approach, which may be combined with other approaches described herein, the distance $W_{SE.Short.Head}$ between the center of the innermost first servo reader and the center of the data element closest thereto satisfies the following equation:

$$W_{SE.Short.Head} = \frac{W_{EP.Head}}{2} + \frac{W_S}{2} - \frac{W_{TP.Nom}}{2 \cdot \cos(\theta_o)} + \frac{W_{SBG}}{\cos(\theta_o)}$$

with an accuracy of 2%, where:

$W_{EP.Head}$ is an average pitch of the data elements of the array, $W_S$ is the width of the servo readers in the array, $W_{SBG}$ is a width of a servo band guard specified by a format for which the apparatus is designed, $W_{TP.Nom}$ is a predefined nominal data track pitch that is preferably in a range of greater than 0 to 650 nanometers, and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

In one approach, which may be combined with other approaches described herein, the distance $W_{SE.Long.Head}$ between the center of the outermost first servo reader and the center of the data element closest thereto satisfies the following equation:

$$W_{SE.Long.Head} \sim W_{EP.Head} + \frac{W_S}{2} + \frac{W_{SBG}}{\cos(\theta_o)}$$

with an accuracy of 2%, where:

$W_{EP.Head}$ is an average pitch of the data elements of the array, $W_S$ is a width of the servo readers in the array (e.g., an average width of the servo readers, a design width of each servo reader, etc.), $W_{SBG}$ is a width of a servo band guard specified by a format for which the apparatus is designed, and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

In one approach, which may be combined with other approaches described herein, the distance $W_{SE.Long.Head}$ between the center of the outermost first servo reader and the center of the data element closest thereto satisfies the following equation:

$$W_{SE.Long.Head} = W_{EP.Head} + \frac{W_S}{2} - \frac{W_{TP.Nom}}{2 \cdot \cos(\theta_o)} + \frac{W_{SBG}}{\cos(\theta_o)}$$

with an accuracy of 2%, where:

$W_{EP.Head}$ is an average pitch of the data elements of the array, $W_S$ is a width of the servo readers in the array, $W_{TP.Nom}$ is a predefined nominal data track pitch that is preferably in a range of greater than 0 to 650 nanometers, $W_{SBG}$ is a width of a servo band guard specified by a format for which the apparatus is designed, and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

In one approach, which may be combined with other approaches described herein, a distance $W_{ServoSpan.Head}$ between the center of the innermost one of the first servo readers and the center of the outermost one of the second servo readers satisfies the following equation:

$$W_{ServoSpan.Head} \sim \left(N_E + \frac{1}{2}\right) \cdot W_{EP.Head} + W_S + \frac{2 \cdot W_{SBG}}{\cos(\theta_o)}$$

with an accuracy of 2%, where:

$N_E$ is a total number of data elements in the array, $W_{EP.Head}$ is an average pitch of the data elements of the array, $W_S$ is a width of the servo readers in the array, $W_{SBG}$ is a width of a servo band guard specified by a format for which the apparatus is designed (e.g., in a range as set forth elsewhere herein), and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

In one approach, which may be combined with other approaches described herein, a distance $W_{ServoSpan.Head}$ between the center of the innermost one of the first servo readers and the center of the outermost one of the second servo readers, e.g., as shown in FIGS. 15, 17, 18 and 19 labeled as $W_{Head}$, satisfies the following equation:

$$W_{ServoSpan.Head} = \left(N_E + \frac{1}{2}\right) \cdot W_{EP.Head} + W_S + \frac{2 \cdot W_{SBG} - W_{TP.Nom}}{\cos(\theta_o)}$$

with an accuracy of 2%, where:

$N_E$ is a total number of data elements in the array, $W_{EP.Head}$ is an average pitch of the data elements of the array, $W_S$ is a width of the servo readers in the array, $W_{TP.Nom}$ is a predefined nominal data track pitch that is in a range of greater than 0 to 650 nanometers, $W_{SBG}$ is a width of a servo band guard specified by the format wherein $W_{SBG}$ is in a range of greater than 0 to 5 microns, more preferably less than about 4 microns, more preferably less than about 3.1 microns, and $\theta_o$ is a nominal tilt angle of the magnetic head relative to normal from an intended direction of tape travel across the magnetic head. This distance enables use of the dual servo per servo band option described elsewhere herein, which in turn enables use of narrower servo bands and higher storage per unit length of tape.

An apparatus, in accordance with one approach, includes a drive mechanism for passing a magnetic tape over the magnetic head, and a controller electrically coupled to the magnetic head. Preferably, the controller is configured to not overwrite any portions of the servo bands with data tracks during writing.

An apparatus, in accordance with another general embodiment, includes a magnetic head having an array of transducers and a second array of transducers aligned along a longitudinal axis of the array, wherein a first end of the second array is positioned adjacent the array. The array comprises data elements, at least two first servo readers positioned toward a first end of the array and at least two second servo readers positioned toward a second end of the array. The second array includes second data elements and at least two third servo readers positioned toward a second end of the second array. The array is symmetrical about a centerpoint thereof, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto. A distance between the center of the innermost second servo reader and a center of the data element of the second array closest thereto is the same as the distance between the center of the outermost first servo reader and the center of the data element closest thereto. A distance between a center of the outermost second servo reader and a center of the data element of the second array closest thereto is the same as the distance between the center of the innermost second servo reader and the center of the data element closest thereto. The symmetrical nature of the array and multiple servo readers on each side of the data elements enables use of narrower servo bands, which in turn allows more space on tape for data tracks, thereby increasing storage capacity per unit length of tape. Moreover, the symmetry enables use of the same design for both leading and trailing modules in a given magnetic head. In addition, a narrower servo band enable use of greater angles of the marks (e.g., magnetic bars) in the servo bands. Moreover, by spanning two data bands, an apparatus with such configuration, and as further described herein, increases the capacity written on tape and also greatly increases the rate at which data can be written or read, by operating on two data bands.

In a preferred approach, which may be combined with other approaches described herein, only two of the first servo readers and only two of the second servo readers are present in the array. The dual servo per servo band option provides two benefits: (1) it enables a higher angle of the servo band marks because the maximum time to cross a servo band is cut in half; and (2) it enables higher capacity because the required value for $W_{SB}$ (described below) may be approximately half the value required for the single servo option.

In one approach, which may be combined with other approaches described herein, the data elements are write elements. The magnetic head includes a third array aligned with the array in an intended direction of tape travel thereacross and a fourth array aligned with the second array in the intended direction of tape travel. The third array includes read elements, at least two fourth servo readers positioned toward a first end of the third array and at least two fifth servo readers positioned toward a second end of the third array. The third array is symmetrical about a centerpoint thereof. In addition, the combined array consisting of the third and fourth arrays may be symmetrical about the centerpoint of the combined array. This approach enables read-while-write, which is important for data verification and integrity.

In one approach, which may be combined with other approaches described herein, a longitudinal axis of the array is nominally tilted by greater than 0 degrees from normal relative to an intended direction of tape travel thereacross. The tilt provides a predefined "effective" element pitch, and enables compensation for tape lateral expansion and contraction by adjusting the tilt, which in turn increases or decreases the effective element pitch, enabling compensation for changes in tape and/or head dimensions due to moisture, thermal expansion and contraction, etc.

In one approach, which may be combined with other approaches described herein, a combined array consisting of the array and the second array is symmetrical about a centerpoint of the combined array. Such symmetry provides similar benefits as noted above for approach having the symmetrical array.

A product, in accordance with one aspect of the present invention, includes a magnetic tape having a plurality of servo bands extending along a longitudinal axis of the magnetic tape. A width $W_{SB.Tape}$ of each of the servo bands satisfies the following equation:

$$W_{SB.Tape} \sim \frac{W_{EP.Tape}}{2}$$

to an accuracy of 10%, where:
$W_{EP.Tape}$ is an average pitch of elements on the head used to read and write data and is given as.

$$W_{EP.Tape} \sim \left( \frac{W_{Tape} - 2 \cdot W_{Edge}}{\left( N_E \cdot N_{DB} + \frac{(N_{DB} + 1)}{2} \right)} \right)$$

where:
$N_E$ is the number of elements used to write each data band,
$N_{DB}$ is the number of databands specified by a format of the magnetic tape,
$W_{Edge}$ is a width of an edge band of the magnetic tape where no data and no servo pattern is written as specified by the format, and
$W_{Tape}$ is a width of the magnetic tape. This product may be used with the new and novel apparatus designs noted above.

In one approach, which may be combined with other approaches described herein, a pitch $W_{ServoSpan.Tape}$ of adjacent pairs of the servo bands satisfies the following equation:

$$W_{ServoSpan.Tape} \sim \left( N_E + \frac{1}{2} \right) \cdot W_{EP.Tape} + 2 \cdot W_{SBG}$$

to an accuracy of 1%, where:
$N_E$ is a total number of data elements for concurrent writing per data band as specified by a format of the magnetic tape,
$W_{EP.Tape}$ is an average pitch of data tracks specified by a format of the magnetic tape, and
$W_{SBG}$ is a width of a servo band guard specified by the format, where $W_{SBG}$ is in a range of greater than 0 to 5 microns, more preferably less than about 4 microns, more preferably less than about 3.1 microns. This servo band pitch allows for writing more data tracks on tape relative to extant products.

In one approach, which may be combined with other approaches described herein, a pitch $W_{ServoSpan.Tape}$ of adjacent pairs of the servo bands satisfies the following equation:

$$W_{ServoSpan.Tape} = W_{ServoSpan.Tape} + W_{SE.Long.Tape} + (N_E - 1) \cdot W_{EP.Tape}$$

with an accuracy of 1%, where:
$W_{EP.Tape}$ is an average pitch of elements on the head used to read and write data and is given as:

$$W_{EP.Tape} \sim \left( \frac{W_{Tape} - 2 \cdot W_{Edge}}{\left( N_E \cdot N_{DB} + \frac{(N_{DB} + 1)}{2} \right)} \right)$$

$W_{SE.Short.Tape}$ is a design pitch, specified by a format of the magnetic tape, between a data element closest to a first end of an array and a servo reader of the array located closest to the data element, and is given by:

$$W_{SE.Short.Tape} \sim \frac{W_{EP.Tape}}{2}$$

$W_{SE.Long.Tape}$ is a design pitch, specified by a format of the magnetic tape, between the data element closest to the first end of the array and a second servo reader of the array located closest to the first end, and is given by:

$$W_{SE.Short.Tape} \sim W_{EP.Tape}$$

where:
$N_E$ is a total number of data elements for concurrent writing specified by a format of the magnetic tape, and
$N_{DB}$ is a total number of data bands on the tape specified by a format of the magnetic tape, and
$W_{Tape}$ is the width of the tape and specified by a format of the magnetic tape, and
$W_{Edge}$ is the edge guard band of the tape and specified by a format of the magnetic tape as the region on the tape where no data or servo pattern is written. This servo band pitch allows for writing more data tracks on tape relative to extant products.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code in block 200 for operating on a magnetic tape. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
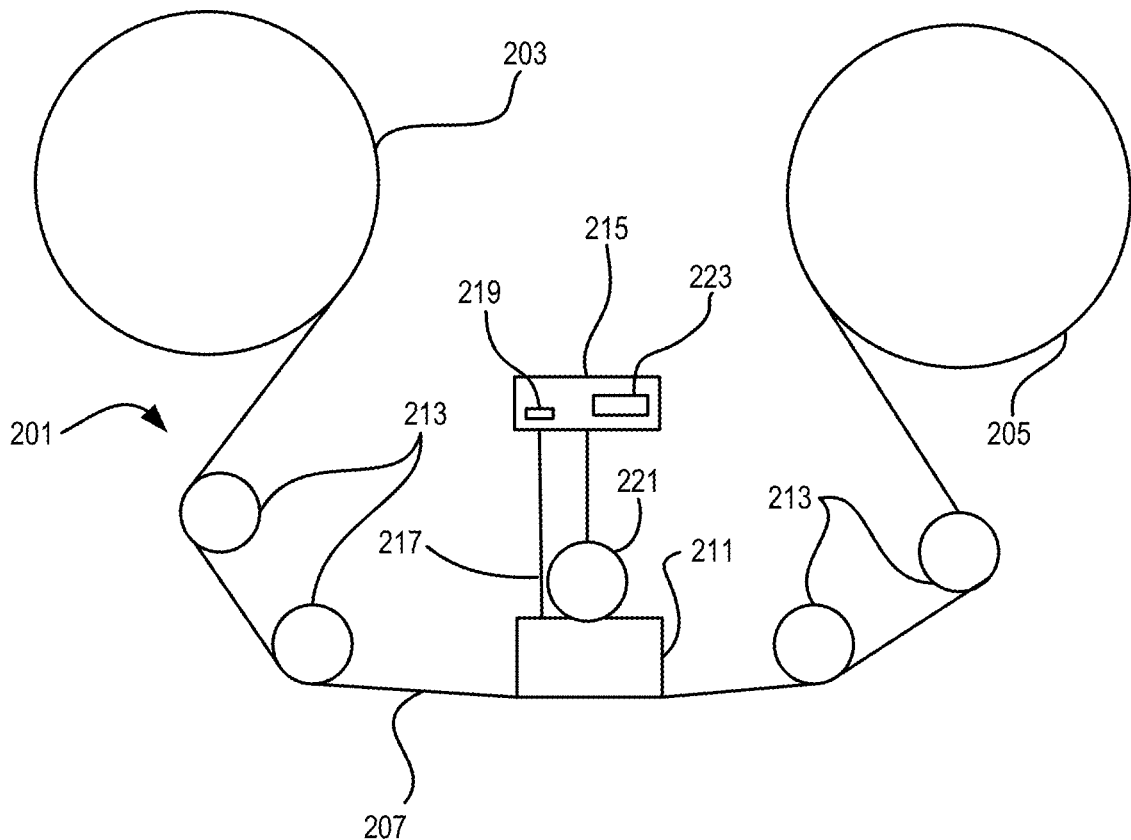
FIG. 2A is a schematic diagram of a simplified tape drive system, in accordance with one aspect.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read elements (also referred to as readers, reader elements, and read transducers), write elements (also known in the art as writers, writer elements, and write transducers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various approaches. The controller 215 may be coupled to a memory 219 of any known type, which may store instructions executable by the controller 215. Moreover, the controller 215 may be configured and/or programmable to perform or control some or all of the methodologies presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
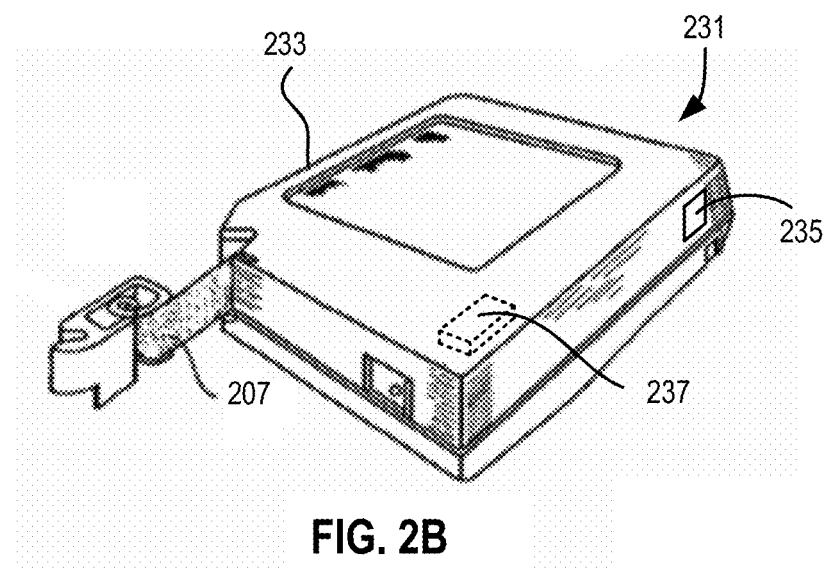
FIG. 2B is a schematic diagram of a tape cartridge, in accordance with one aspect.

FIG. 2B illustrates an exemplary tape cartridge 231, according to one aspect of the present invention. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred approach, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
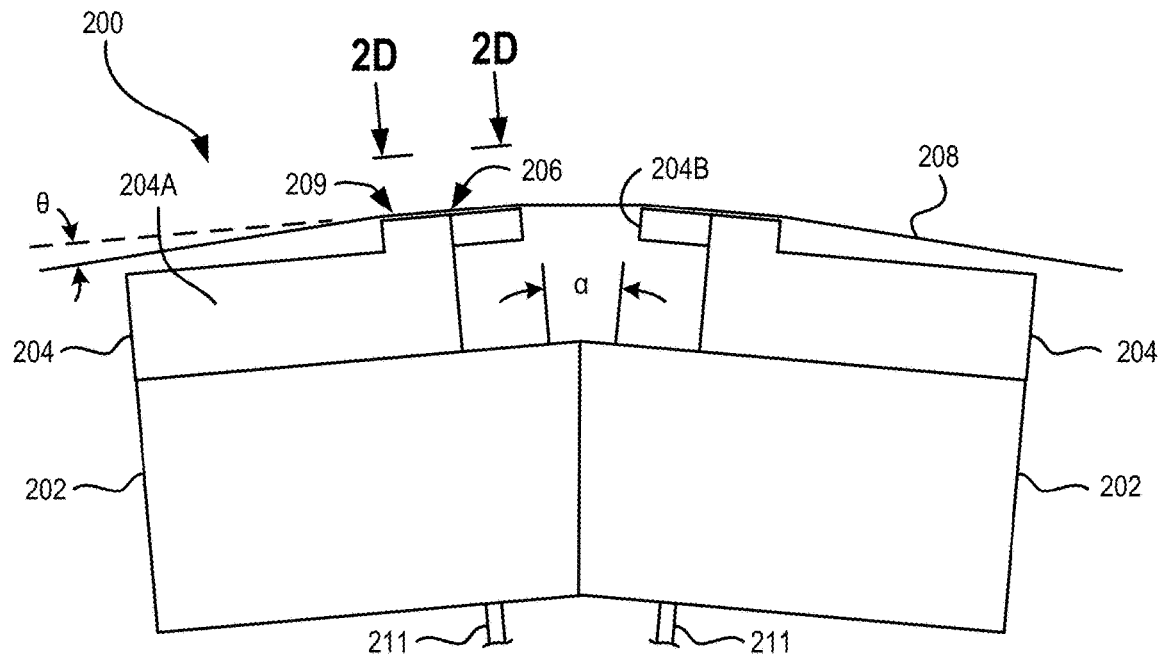
FIG. 2C illustrates a side view of a flat-lapped, bi-directional, two-module magnetic tape head, in accordance with one aspect.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read elements and/or write elements 206 are formed. In use, a tape 208 is moved over the modules 204 along a media (tape) bearing surface 209 in the manner shown for reading and writing data on the tape 208 using the read elements and write elements. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the elements 206 of each of the modules 204. Pads on a cable 217 are typically wire bonded to pads on the associated module 204.

The read elements and write elements may be arranged in a piggyback or merged configuration. An illustrative piggybacked configuration comprises a (magnetically inductive) write element on top of (or below) a (magnetically shielded) read element (e.g., a magnetoresistive reader, etc.), wherein the poles of the write element and the shields of the read element are generally separated. An illustrative merged configuration comprises one reader shield in the same physical layer as one writer pole (hence, "merged"). The read elements and write elements may also be arranged in an interleaved configuration. Alternatively, each array of channels may be read elements or write elements only. Any of these arrays may contain one or more servo readers for reading servo data on the medium.

Figure 2D:
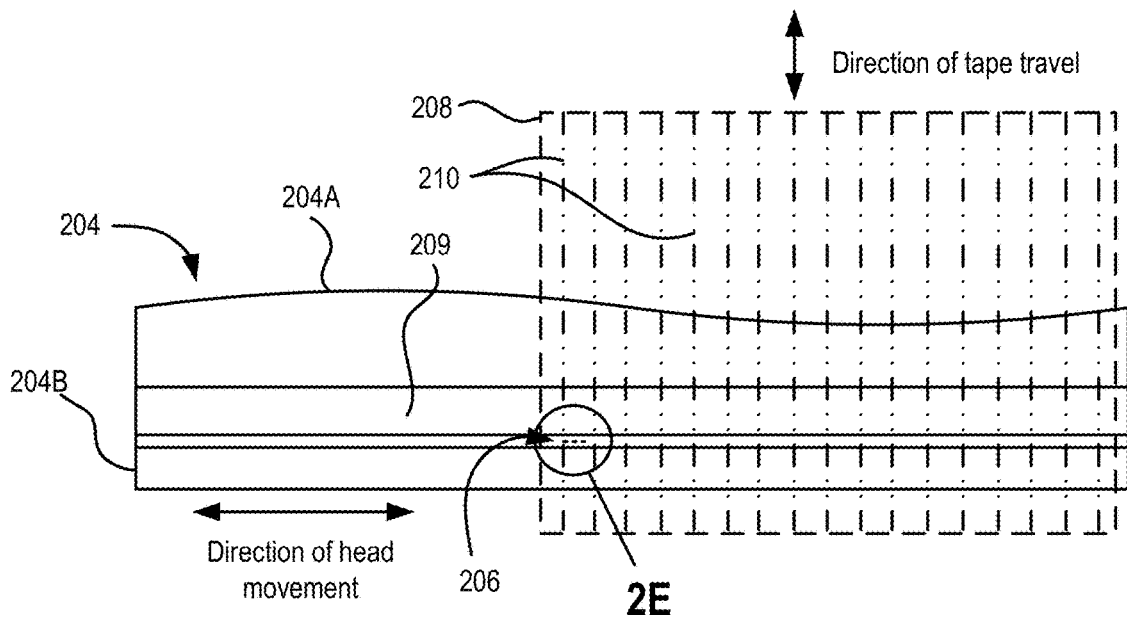
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read elements and/or write elements 206 are positioned to specific track positions within one of the data bands. Outer readers, sometimes called servo readers, read the servo tracks 210. The servo signals are in turn used in a conventional manner to keep the read elements and/or write elements 206 aligned with a particular set of tracks during the read/write operations.

Figure 2E:
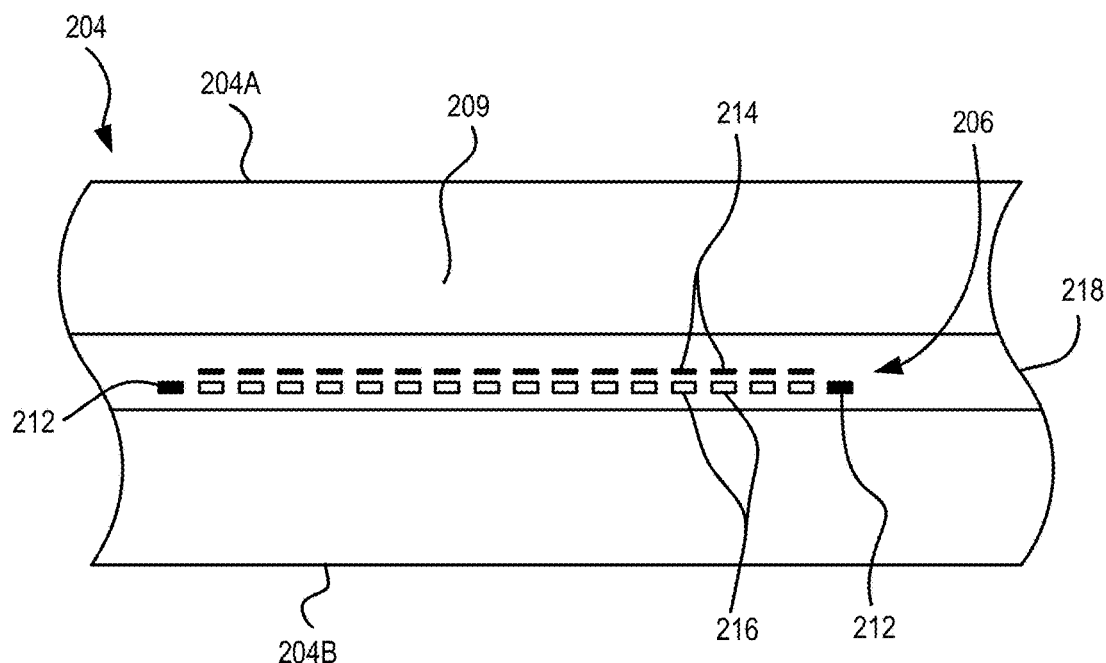
FIG. 2E is a detailed view taken from Circle 2E of FIG. 2D.

FIG. 2E depicts a plurality of read elements and/or write elements 206 formed in a gap 218 on the module 204 in Circle 2E of FIG. 2D. As shown in FIG. 2E, the array of read elements and write elements 206 includes, for example, 16 write elements 214, 16 read elements 216 and two servo readers 212, though the number of elements may vary. Illustrative approaches include 8, 16, 32, 40, and 64 active read elements and/or write elements 206 per array, and alternatively interleaved designs having odd numbers of read elements or write elements such as 17, 25, 33, etc. An illustrative approach includes 32 read elements per array and/or 32 write elements per array, where the actual number of element elements could be greater, e.g., 33, 34, etc. Multiple simultaneously-operated elements allow the tape to travel at a modest velocity while maintaining a high data transfer rate. Lower velocities are desirable to reduce mechanical difficulties from speed-induced tracking.

While the read elements and write elements may be arranged in a piggyback configuration as shown in FIG. 2E, the read elements 216 and write elements 214 may also be arranged in an interleaved configuration. Alternatively, each array of read elements and/or write elements 206 may be read elements or write elements only, and the arrays may contain one or more servo readers 212. As noted by considering FIGS. 2C and 2D-2E together, each module 204 may include a complementary set of read elements and/or write elements 206 for such things as bi-directional reading and writing, read-while-write capability, backward compatibility, etc.

Figure 2F:
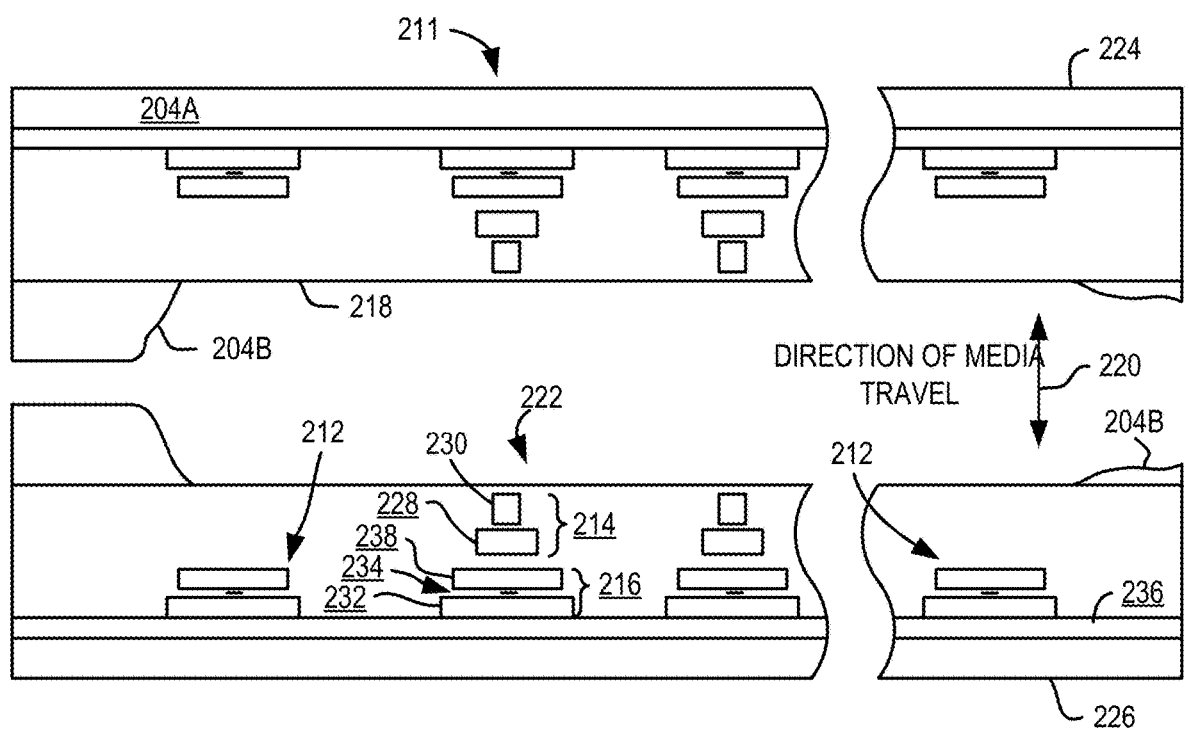
FIG. 2F is a detailed view of a partial tape bearing surface of a pair of modules.

FIG. 2F shows a partial tape bearing surface view of complementary modules of a magnetic tape head 211, according to one approach. In this approach, each module has a plurality of read/write (R/W) pairs in a piggyback configuration formed on a common substrate 204A and an optional electrically insulative insulating layer 236. The write elements 214 and the read elements 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write element of the leading module and read element of the trailing module aligned with the write element of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
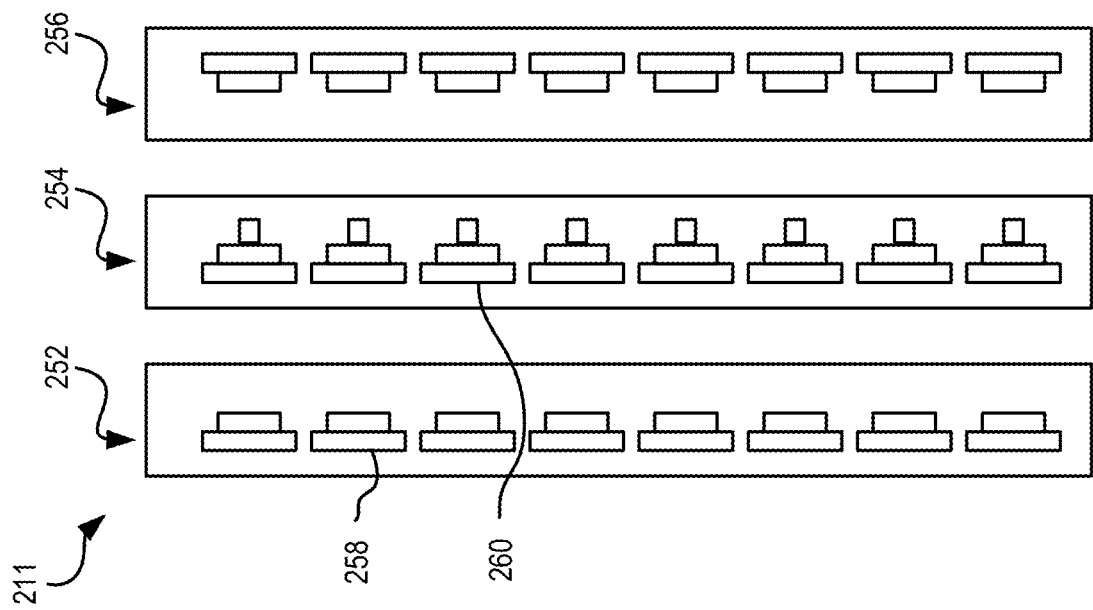
FIG. 4 is a partial tape bearing surface view of a magnetic head having a read-write-read configuration, in accordance with one aspect.
Figure 3:
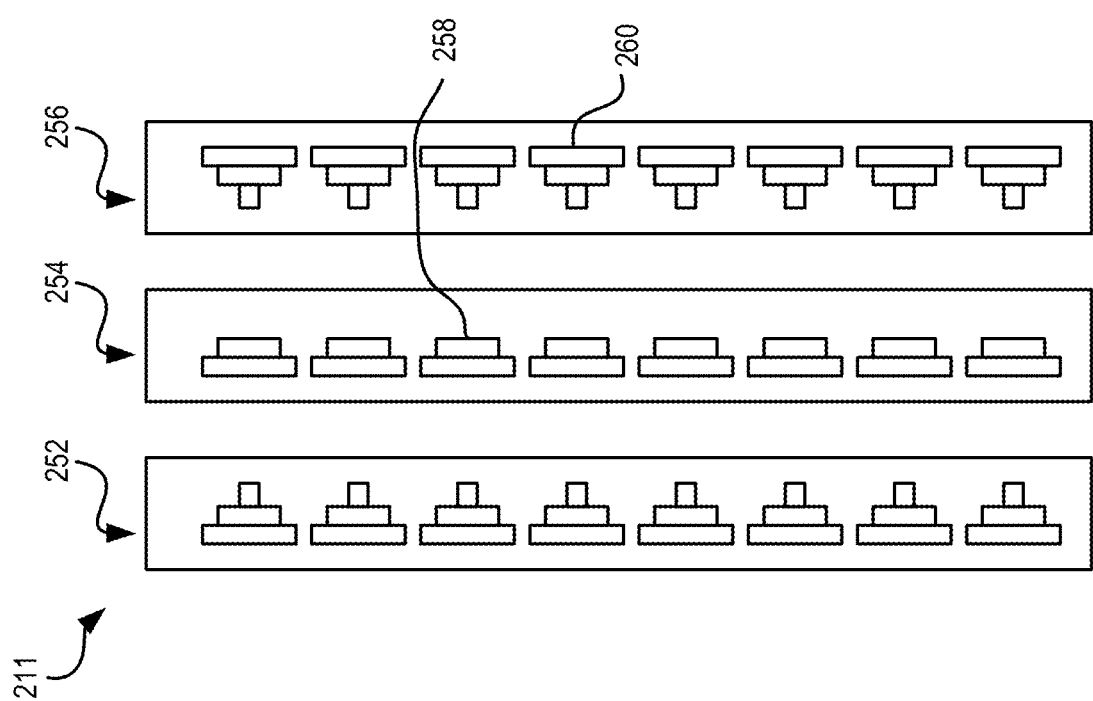
FIG. 3 is a partial tape bearing surface view of a magnetic head having a write-read-write configuration, in accordance with one aspect.

The configuration of the tape head 211, according to one approach, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write elements 260. The inner module 254 of FIG. 3 includes one or more arrays of read elements 258 in a similar configuration. Variations of a multi-module head include a R-W-R head (FIG. 4), a R-R-W head, a W-W-R head, etc. In yet other variations, one or more of the modules may have read/write pairs of elements. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
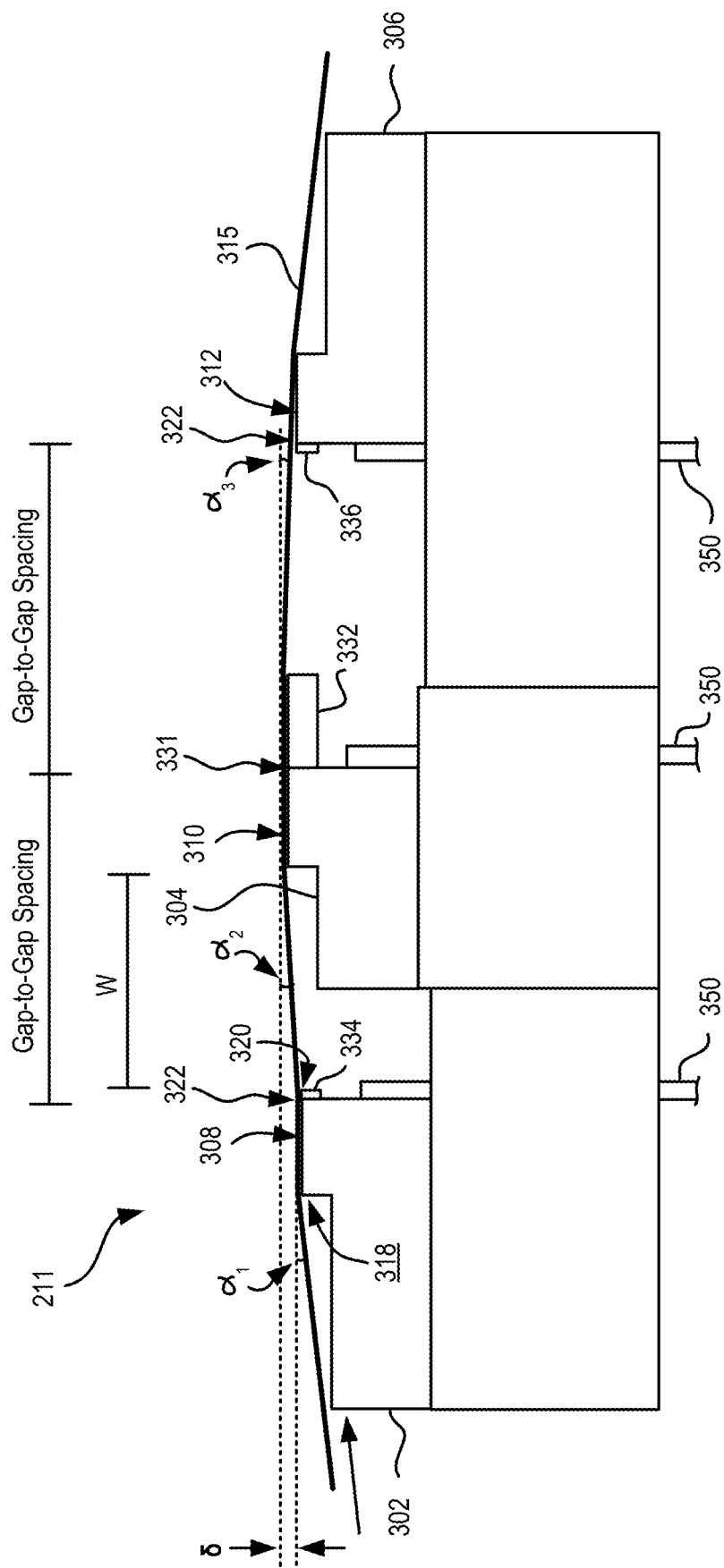
FIG. 5 is a side view of a magnetic tape head with three modules where the modules all generally lie along about parallel planes, in accordance with one aspect.

FIG. 5 illustrates a magnetic head 211 according to one aspect of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
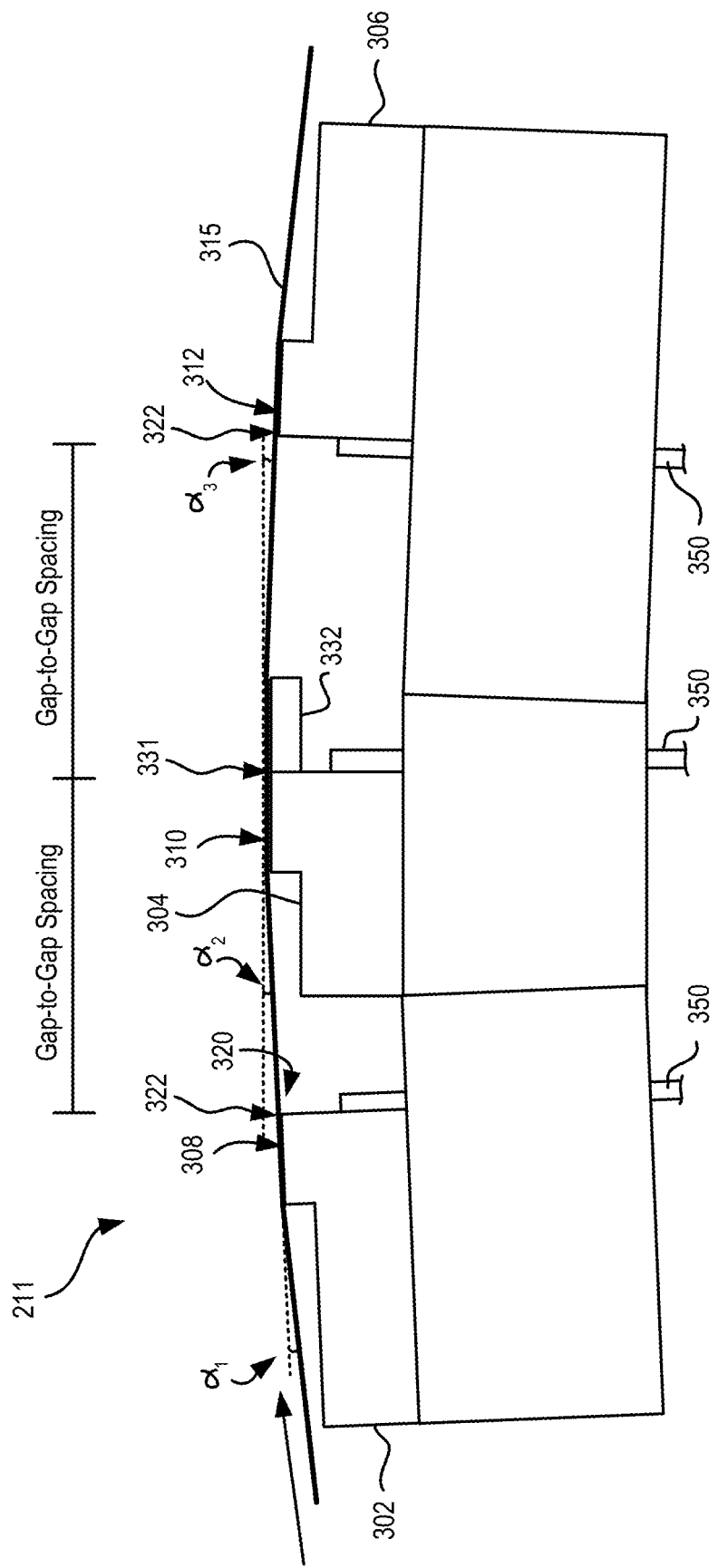
FIG. 6 is a side view of a magnetic tape head with three modules in a tangent (angled) configuration, in accordance with one aspect.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, elements 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no write elements. The first and third modules 302, 306 include a plurality of write elements 322 and no data read elements, with the exception that the outer modules 302, 306 may include optional servo readers. The servo readers may be used to position the head during reading and/or writing operations. The servo reader(s) on each module are typically located towards the end of the array of read elements or write elements.

By having only read elements or side by side write elements and servo readers in the gap between the substrate and closure, the gap length can be substantially reduced. Typical heads have piggybacked read elements and write elements, where the write element is formed above each read element. A typical gap is 20-35 microns. However, irregularities on the tape may tend to droop into the gap and create gap erosion. Thus, the smaller the gap the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
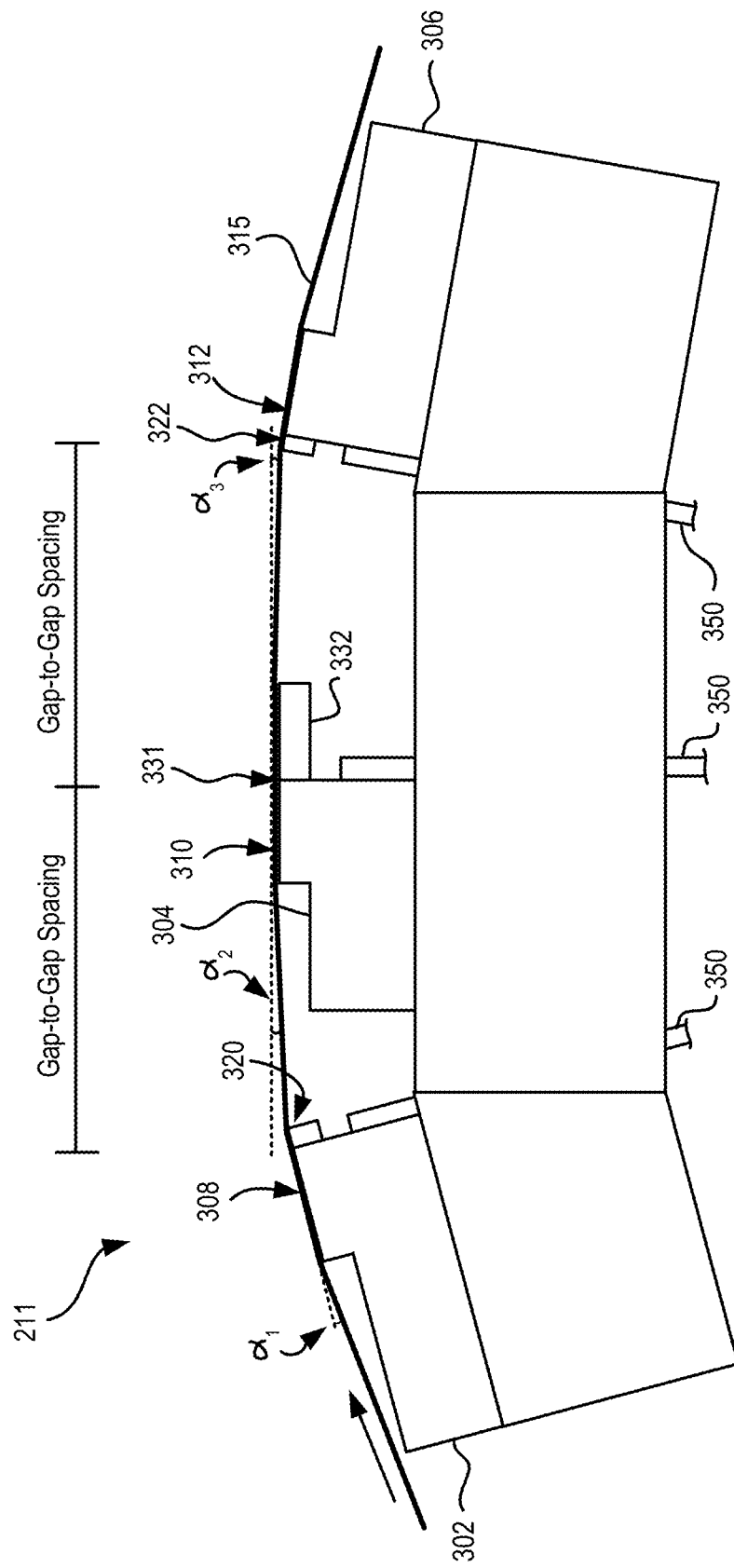
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write elements, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
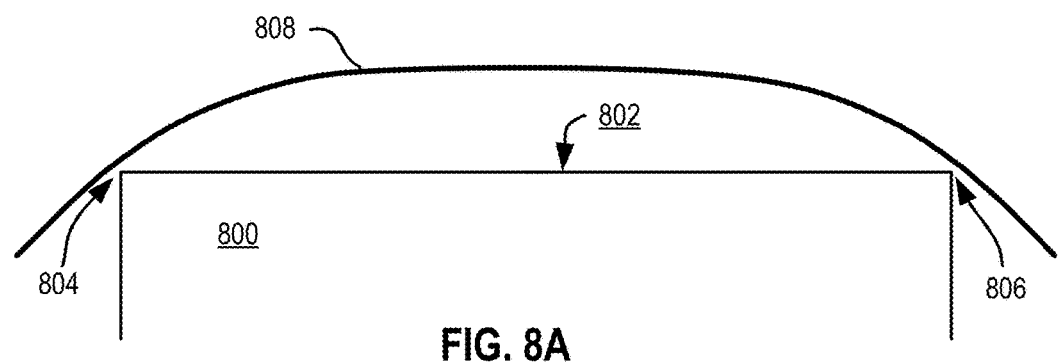
FIGS. 8A-8C are schematics depicting the principles of tape tenting.
Figure 8B:
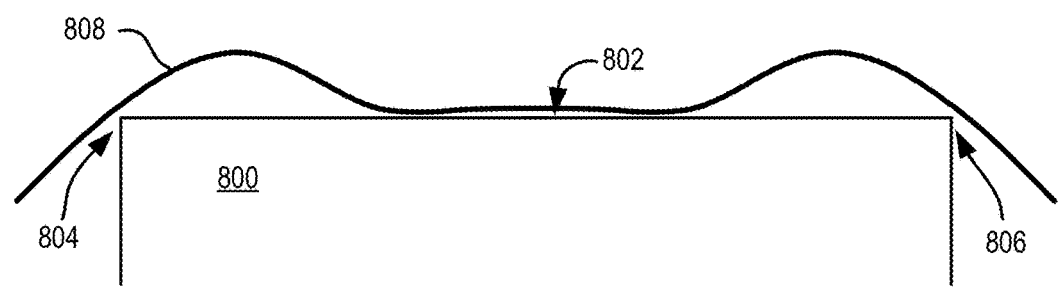
Figure 8C:
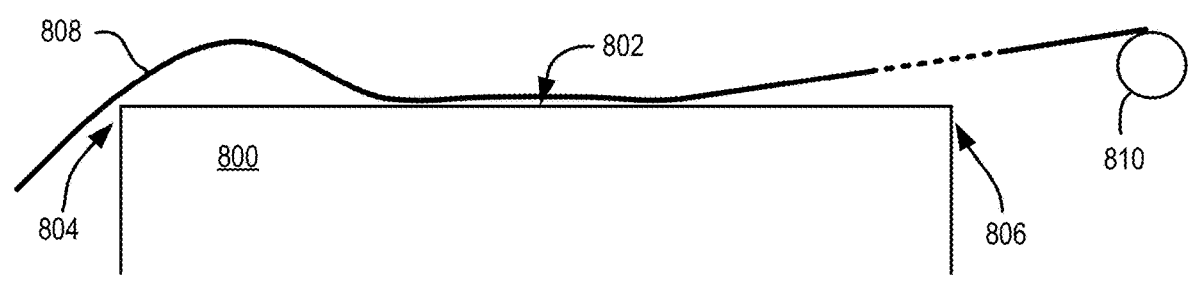

As a tape is run over a module, it is preferred that the tape passes sufficiently close to magnetic elements on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes (also referred to as tapes, magnetic recording tapes, tape media, and the like) may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various approaches herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the approaches below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
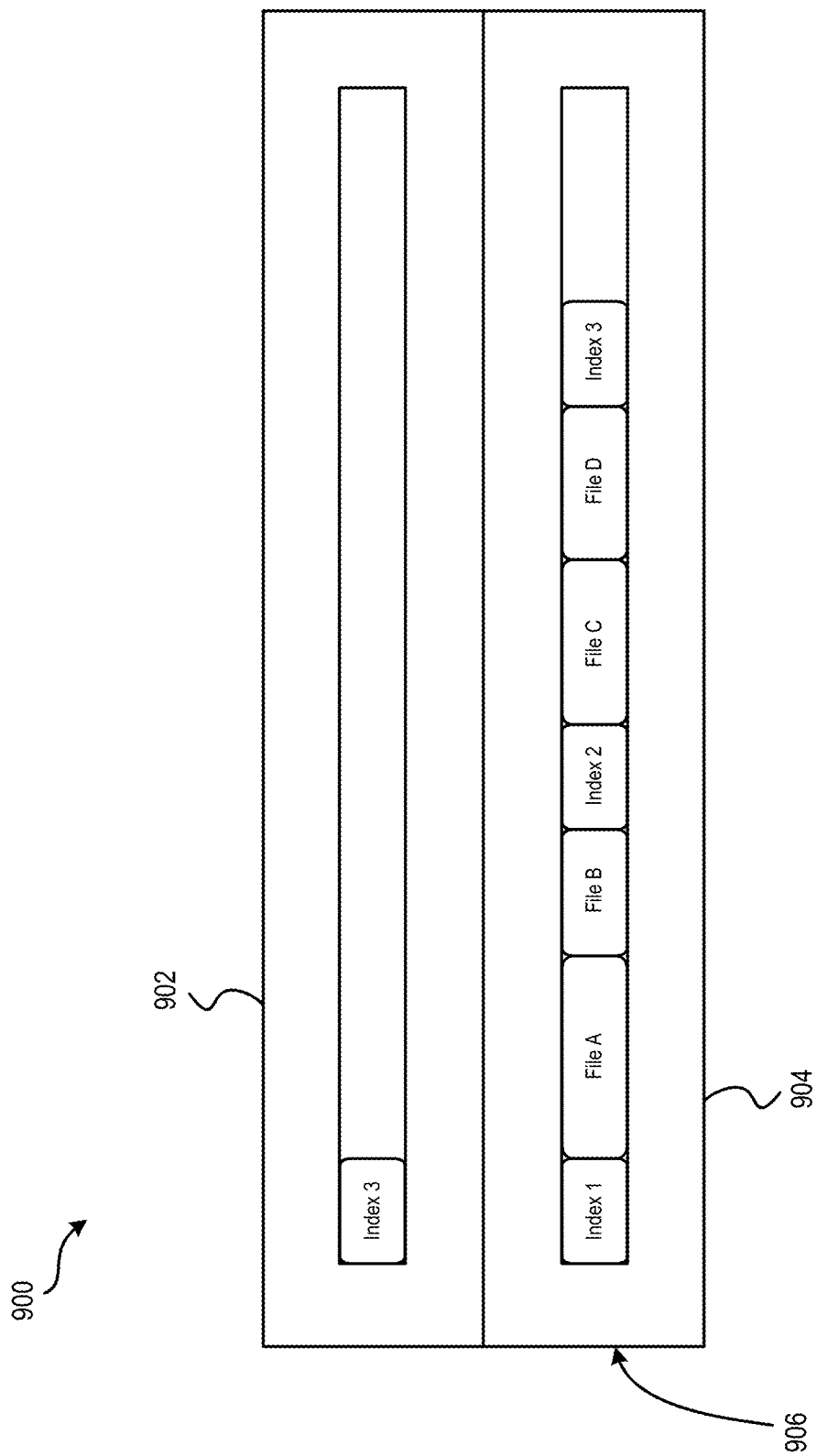
FIG. 9 is a representational diagram of files and indexes stored on a magnetic tape, in accordance with one aspect.

Looking to FIG. 9, a magnetic tape 900 having an index partition 902 and a data partition 904 is illustrated, according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As mentioned above, magnetic tape is generally compliant with some predefined tape format, such as LTO 9, LTO 10, etc. A format may specify servo track spacing, guard band location, number of tracks, and so on. Magnetic heads and their corresponding drives are designed to comply with a particular format (or formats e.g., via reverse compatibility). Format specifications are generally available in the literature, and therefore readily available to interested parties. Various approaches described herein may correspond to extant formats, modified versions of extant formats created according to the teachings herein, and/or creation of a new format that could be, in relevant part, specified by one skilled in the art after being apprised of the present disclosure and the teachings herein.

In some aspects described herein, a format may refer to a drive format, which may generally refer to a configuration of how the tape drive performs data operations, e.g., specifying such things as how much servo band guard to leave when writing, how much data track width to overwrite when performing shingled writing, what the nominal tilt angle of the transducer array is, etc.

Servo bands compliant with the desired tape and/or drive format are written on the magnetic tape at the factory to ensure precise positioning of the servo tracks within the servo bands under ideal conditions to ensure consistency of the servo pattern, proper and consistent spacing, and to minimize the detrimental effects of tape lateral expansion and contraction. Moreover, servo tracks are not written by customer tape drives due to a variety of reasons, such as the inherent variability between writer element spacing from module to module and drive to drive, the inability to ensure optimal conditions that avoid tape lateral expansion or contraction, and so on, as would be apparent to unskilled in the art. Indeed, customer-level tape drives do not typically have built-in capabilities to write servo tracks, e.g., they do not have servo writers. It bears mention that some tape drives are able to write High Definition (HD) servo tracks that supplement the prewritten data band. The present disclosure is directed to servo bands prewritten on magnetic tapes according to a particular format.

Figure 10:
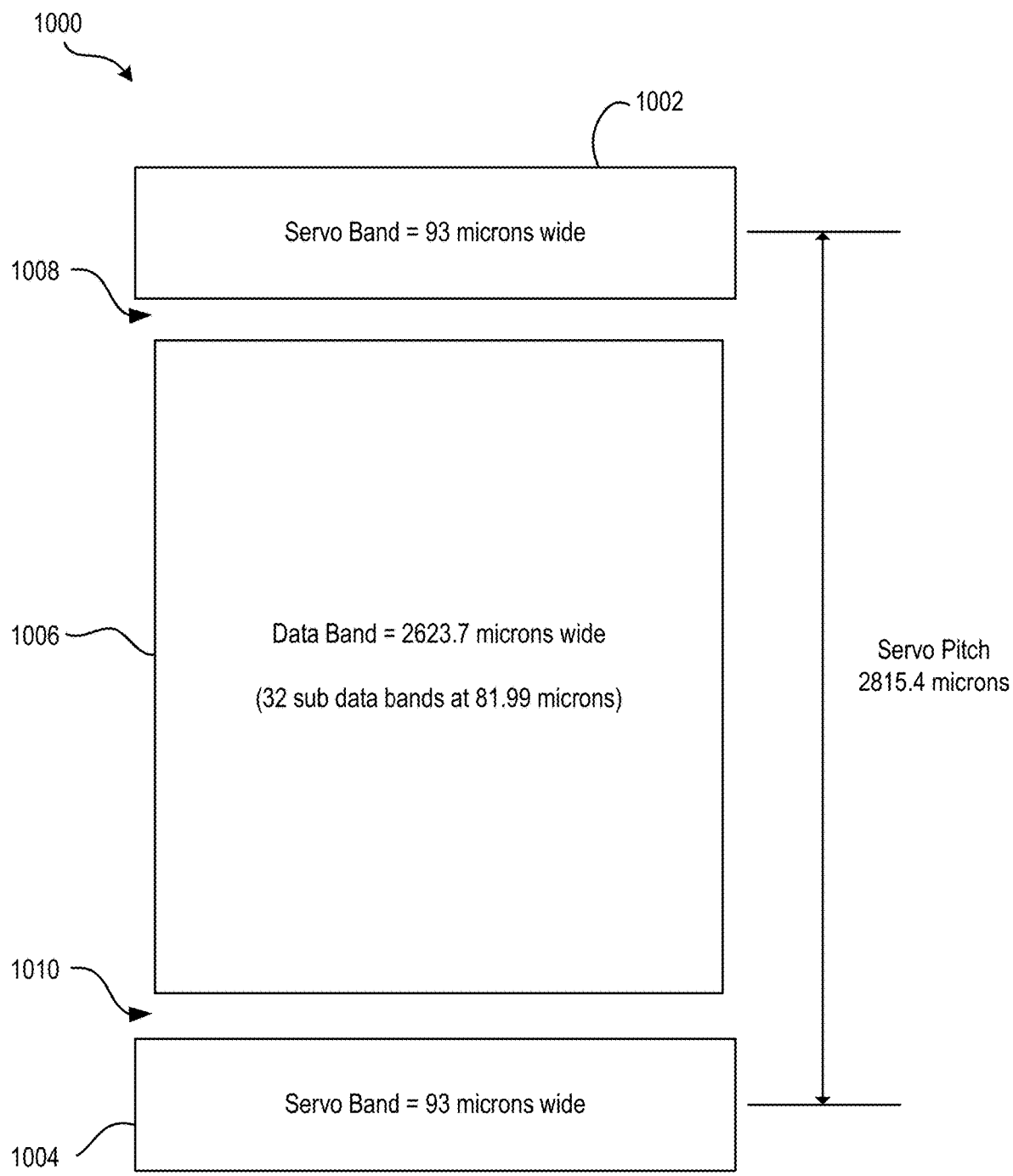
FIG. 10 is a partial representative view of a magnetic tape formatted according to the LTO 10 format.

It follows that the servo tracks prewritten on a magnetic tape are used throughout the life of the magnetic tape. Conventional wisdom has been to protect the servo tracks from overwrite to ensure their integrity, as damage to the servo tracks may render data on the tape unreadable. Accordingly, as shown in FIG. 10, which is a partial representative view of a magnetic tape 1000 factory-formatted according to the LTO 10 format having two factory-written servo bands 1002, 1004 (three other servo bands not shown) flanking a data band area 1006. Unwritable guard bands 1008, 1010 are specified as being positioned between the data band area 1006 and each servo band 1002, 1004 adjacent thereto. The guard bands 1008, 1010 are areas on the tape which are not written to, as specified by the format, to protect the servo bands 1002, 1004 from accidental overwrite.

Extant tape drives for large scale data storage use read/write heads with multiple reader elements and writer elements, and servo readers used to determine the position on the tape for reading and writing. The magnetic tape is segmented into $N_{DB}$ data bands, DB, each having a width $W_{DB}$; $N_{DB}+1$ servo bands, SB, of width $W_{SB}$; and two edge bands, EB of width, $W_{Edge}$; The data is written in the DBs by the $N_E$ writer elements and read back with the $N_E$ reader elements. Extant drives use a 1-band head where the reader and writer elements write to only 1 DB at a time. For such a design, the $N_E$ reader or writer elements are located sequentially, 1 to $N_E$ on the read/write module separated by a fixed element pitch, $W_{EP}$. Extant heads locate one servo within a servo band separated from the nearest element by $W_{SE}$. A writer element of width $W_W$ writes a wrap of data, then steps over by a fixed track pitch, $W_{TP}$, overwriting a portion of the previous wrap leaving a shingled data track of width $W_{TP}$. To avoid overwriting data, the final track has a width $W_W$ rather than the desired width of $W_{TP}$. Accordingly, to first order, each writer element can fit $$N_{trk} = \frac{(W_{EP} - W_W)}{W_{TP}}$$

tracks, all but the final of width $W_{TP}$ within a data sub band without overwriting the data written in the adjacent tracks. The larger the element pitch, the higher the capacity. The width of the SB and the location of the servo readers is chosen to enable the data elements to span the DB. Optimizing the capacity includes adjusting all parameters to satisfy the requirements, noting that all of the parameters are interconnected. With a single servo reader within each SB, the width of the SB is essentially $W_{SB}=W_{EP}+W_S-W_{TP}$, where $W_S$ is the servo reader width.

One form of servo pattern is timing based. A chevron pattern is written in the SB via magnetic bars written at angles relative to a line normal to the longitudinal axis of the magnetic tape. Simplifying the pattern to a V shape, on one edge of the SB, the time to cross the two lines in the V near the apex is shorter for a given tape velocity. Moving to the wide end of the V, the time is relatively longer at the same tape velocity. Higher angle Vs enable better control, but the time to cross the two lines should be kept below a threshold. For instance, higher angles generally require narrower SBs. One method to reduce the width of the servo band, in accordance with one aspect of the present invention, is to place two servo readers per SB (dual servo option) and each servo reader is used to write and read half the data sub band. Thus the servo band may be reduced to about half the width needed for a single servo reader option.

A dual servo design in accordance with one approach includes the following transducers: a group of two first servo readers (SG1a, SG1b), a group of $N_E$ data (reader or writer) elements (EG), and a group of two second servo readers (SG2a, SG2b). SG1a and SG2a span their respective SBs, and during writing will be used to read from or write to half the sub DB. SG1b and SG2b also span their respective SBs, and during reading or writing, will read from or write to the second half of the DB. The dual servo option in one approach has a servo band width $W_{SB}$ of approximately:

$$W_{SB} = \frac{W_{EP}}{2} + W_S - W_{TP} \text{ (ignoring buffers)}.$$

The dual servo option may serve two purposes: (1) enable a higher angle of the servo band marks since the maximum time to cross a servo band is cut in half; (2) enable higher capacity since the value for $W_{SB}$ may be approximately half the value used for the single servo option.

The designs described in the previous three paragraphs are of a single band head, in which a single array of elements are flanked by a group of servos (1 or 2 per group) in surrounding SBs. A design in accordance with another aspect of the present invention is a 2-band head comprised of: servo group 1, element group 1, servo group 2, element group 2, servo group 3. Element groups 1 and 2 are configured to simultaneously write data in two adjacent DBs. As with the single servo option, the dual servo option can be described as: SG1a, SG1b, EG1, SG2a, SG2b, EG2, SG3a, SG3b. An apparatus with such configuration, and as further described herein, optimizes the capacity written on tape and also greatly increases the rate at which data can be written or read, by operating on two data bands.

According to various aspects of the present invention described below, there is described an apparatus having a magnetic head design which utilizes two servos per servo band and optimizes the capacity written to the tape. The design is fully symmetric, so that alignment of reader and writer modules is versatile.

Particularly preferred approaches have the same number of data elements per array as data channels, are fully symmetric, and optimize the capacity available on the tape. This is far superior to previous attempts which had an asymmetric transducer array, which limited versatility of its module. Moreover, designs utilizing an extra element per data band (e.g., 33 elements in the array, but only 32 active channels per data operation) were even less efficient in terms of data capacity on tape.

Other aspects of the present invention may include dual servo designs which are not symmetric. For example, a dual servo design may be constructed to use media from a single servo design so that $W_{EP}$ is unchanged and the distance between one servo reader and the nearest data element is the same as the legacy design. In this case, adding a second servo reader results in an asymmetric design. Furthermore since $W_{EP}$ is unchanged, the capacity remains unchanged. Such a design has been patented and built. Furthermore, the design which was built and targeted for a product utilizes an extra element per data band making the design even less efficient for capacity.

Extant tape media used for data storage has several major regions: two edge guard bands along opposite edges of the tape having a width $W_{Edge}$; $N_{DB}$ data bands (one or more); and $N_{SB}=N_{DB}+1$ servo bands. No information resides in the edge guard bands. Data resides in the data bands and is written by writer elements and read by reader elements. The servo bands contain pre-written information about the location of the servo reader within the servo band. The servo readers read the information in the servo band and use it to determine the location of the reader and writer elements within the data band. The tape heads include reader, writer, and servo elements. Writer elements (writers) write data to the media, reader elements (readers) read the written data, all within the data bands. Servo elements (servo readers) are positioned within the servo bands, and the servo bands are located on either side of a data band. A servo band has a width, $W_{SB}$, and a data band has a width, $W_{DB}$. Excluding any buffers, the width of tape, $W_{Tape}$, is approximately the sum of the above-mentioned regions:

$$W_{Tape} = 2 \cdot W_{Edge} + N_{DB} \cdot W_{DB} + N_{SB} \cdot W_{SB} \quad\quad 1$$

The data band width is given by:

$$W_{DB} = N_E \cdot W_{EP} \quad\quad 2$$

The data tracks are written with writer elements each having a width $W_W$ and read by reader elements of width $W_R$. The final tracks are spaced by a track pitch distance, $W_{TP}$ which is less than $W_W$, via shingled writing of known type. A magnetic tape head has arrays of $N_E$ elements (e.g., 16, 32, 64, 128 readers or 16, 32, 64, 128 writers) and a number of read/write channels, $N_{CH}$. $N_E$ is equal to $N_{CH}$. On a tape head module, the data elements are separated by a distance, $W_{EP}$ or element pitch. Accordingly, for a single write pass of the tape, $N_E$ tracks of width $W_W$ are written and are separated by the element pitch distance, $W_{EP}$. On the next pass, the location of the writer elements is stepped over by $W_{TP}$ and another row of data is written of width $W_W$. The previously written track is partially written over, leaving data from the previous path with a width of $W_{TP}$ (shingling). Ideally (excluding buffers and physical fluctuations), then each writer element can write $N_{trk}$ tracks within the region spanning the element pitch minus the writer element width:

$$(N_{trk} - 1) \cdot W_{TP} = W_{EP} - W_W \quad\quad 3a$$

or $$N_{trk} = (W_{EP} - W_W + W_{TP}) / W_{TP} \quad\quad 3b$$

In the simplest case, only one servo reader is placed toward either end of the module, flanking the array of $N_E$ elements. The servos would then need to move across the servo band a distance equal to this motion. Ideally, (excluding buffers and physical fluctuations), when the servo reader moves across the width of the servo band ($W_{SB}$), the reader elements move across the element pitch, being placed half a track pitch ($W_{TP}$) from either end of the element pitch. Thus, $$W_{SB} - W_S = W_{EP} - W_{TP}, \quad\quad 4a$$

or $$W_{SB} = W_{EP} + W_S - W_{TP}. \quad\quad 4b$$

This is the densest packing of the data.

The servo readers are separated from the nearest element (S1-to-E1 and S2-to-$E_{NE}$) by $W_{SE}$. In an ideal case, $W_{SE}$ is selected in order to place the edge of the servo at the top of the servo band and the reader element centered one half a track pitch ($W_{TP}$) from the top of the data band:

$$W_{SE} = W_{SB} - \frac{W_S}{2} + \frac{W_{TP}}{2} \quad\quad 5$$

The head span from one servo to the next, then, is given by:

$$W_{HeadSpan} = 2 \cdot W_{SE} + (N_E - 1) \cdot W_{EP} \quad\quad 6$$

The servo band-to-servo band spacing is then $W_{HeadSpan}$. Combining equations 1, 2 and 4b yields:

$$W_{EP} = \frac{W_{Tape} - 2 \cdot W_{Edge} - (N_{DB} + 1) \cdot (W_S - W_{TP})}{N_{DB} \cdot N_E + (N_{DB} + 1)} \quad\quad 7$$

Again, in the absence of buffers, the media and head are designed with the parameters: $W_{Tape}$, $W_{Edge}$, $W_{SB}$, $W_{HeadSpan}$, and $N_{PB}$. The heads are designed with the parameters: $N_E$, $W_{EP}$ and $W_{SE}$. $W_W$, $W_R$ and $W_{TP}$ and can be modified to achieve the desired capacity using the base design.

A design which increases the capacity further by increasing the area available for data is the dual servo option, in accordance with an aspect of the present invention.

The dual servo option utilizes two servo readers in each servo band, with spacing defined by $W_{SE.Short}$ and $W_{SE.Long}$, representing the distance from the given servo reader to the nearest element. For the dual servo option, the arrangement is: S1a, S1b, EG1, S2a, S2b, EG2, S3a and S3b representing three groups of a pair of servo readers (S1a+S1b, S2a+S2b, S3a+S3b) and two groups of data elements (element group 1 and element group 2, EG1, EG2) within each SB. In this example, S1a and S1b are each positioned a distance $W_{SE.Long}$ and $W_{SE.Short}$ from the first element in EG1, EG1.1. S2a is a distance $W_{SE.Short}$ from the last element in EG1, EG1. $N_E$ and a distance $W_{SE.Long}$ from the first element in EG2, EG2.1. S2b is a distance $W_{SE.Long}$ from the last element in EG1, EG1. $N_E$ and a distance $W_{SE.Short}$ from the first element in EG2, EG2.1. S3a and S3b are respectively distances $W_{SE.Short}$ and $W_{SE.Long}$ from the last element in EG2. Servo readers $S_{na}$ are used to position writer elements to write data in one half of each DB in which EG1 and EG2 align and servo readers $S_{nb}$ span the second half of the servo band, enabling writing in the other half of each DB. The design is completely symmetric. The design can be used for either a 2-module, a 3-module, a 4-module head design, etc. A 2-module design has two modules, each with a "piggybacked" design where both reader and writer elements are deposited on each module. Data written by writer elements from one module can be read with either reader elements in the same or opposite module. A 3-module design in one approach has two "outer" writer modules and a central reader module (WRW configuration). One outer writer module writes in one direction of tape movement and the other outer writer module writes in the opposite direction of tape movement. A 3-module design in another approach has two outer reader modules and a central writer module. The writer module writes in both directions, but one reader module reads in one direction of tape movement and the other reader module reads in the opposite direction of tape movement.

Any of the foregoing dual servo reader options may be extended to a triple servo option having three servo readers on each side of the data elements in an array. Thus, the respective servo readers may be used to read and write from approximately one third of the DB.

Writer elements are made by depositing metals onto a wafer in layers. A ring writer element in some approaches has two poles at the tape bearing surface separated by a gap.

In tape recording, the writing is done by the trailing edge, or the pole on the side of tape motion. Defining P1 and P2 as the poles deposited first and second in the wafer processing, depending on the orientation of the modules, either P1 or P2 will act as the trailing edge. It is possible that preferred writing is achieved by choosing either P1 or P2 as the trailing edge. Changing the trailing edge may include rotating a module by 180 degrees. Because the present design is fully symmetric, the writer modules can be rotated 180 degrees and used for either P1 or P2 trailing without changing the drive code, saving time and money if the orientation needs to be changed. More details of exemplary designs according to various aspects of the present invention are given below.

Figure 11:
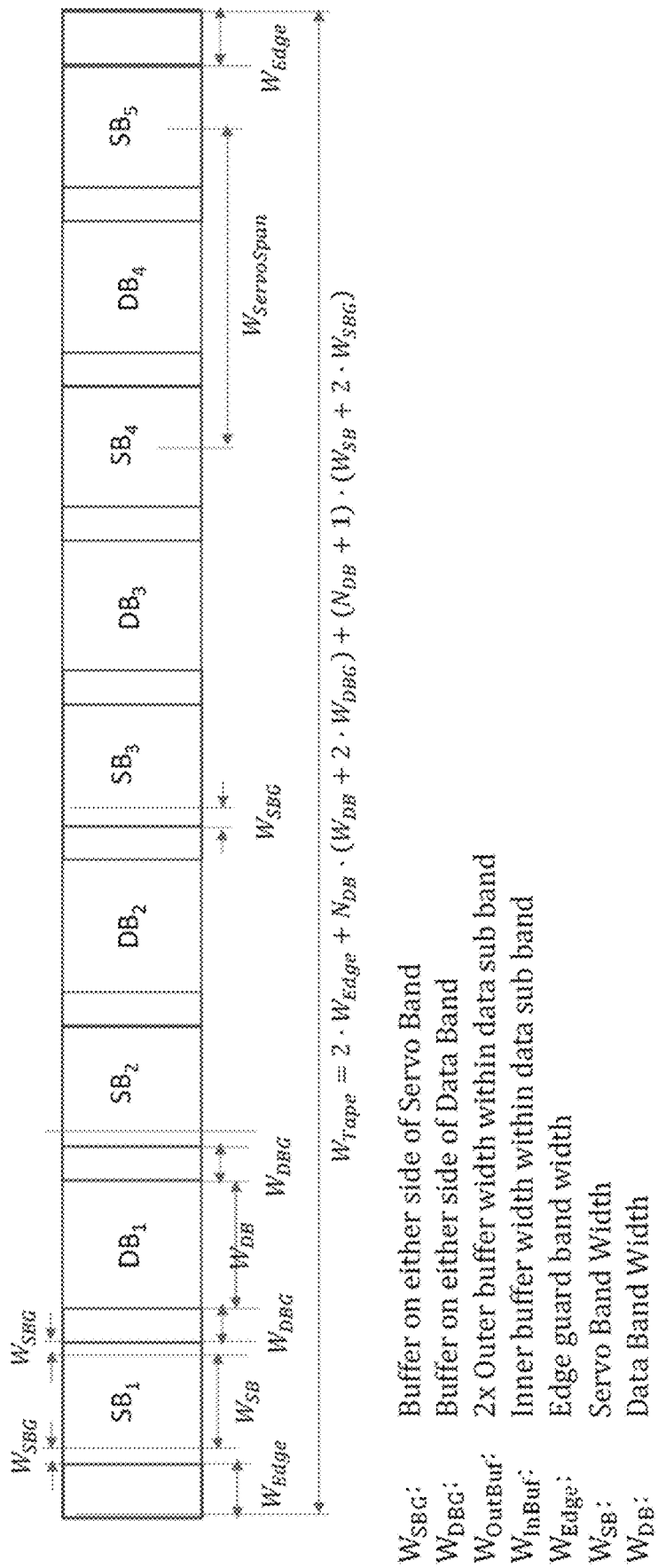
FIG. 11 is representational view of regions on a magnetic tape, according to a conventional format.

FIG. 11 is a representation of regions on a magnetic tape, according to a conventional format. Two edge guard bands, each of width $W_{Edge}$, are show, one on either end of the tape. No magnetic information is written in these regions. This is a four data band tape format ($N_{DB}$=4), labeled $DB_1$ to $DB_4$, each of width $W_{DB}$, and five servo bands, labeled $SB_1$ to $SB_5$, and each of width $W_{SB}$. The servo readers are designed to span the servo band while writing data within each data band. A buffer is located at either end of a data band (data band guard) of width $W_{DBG}$ and on either end of the servo band (servo band guard) of width $W_{SBG}$. The width of tape is given by Equation 9.

$$W_{Tape} = 2 \cdot W_{Edge} + N_{DB} \cdot (W_{DB} + 2 \cdot W_{DBG}) + (N_{DB} + 1) \cdot (W_{SB} + 2 \cdot W_{SBG}) \quad 9$$

The addition in Equation 9 to Equation 1 are the servo and data band guards, which act as buffers between the servo bands and the data bands respectively to avoid overwriting these regions.

Note that in viewing FIG. 11, the parameter $W_{DBG}$ is not strictly needed, in some approaches, as it can be accounted for by modifying $W_{SBG}$ and $W_{Edge}$. The benefit of $W_{DBG}$ is if one chooses to define media with $W_{SBG}$ for the media and then add a drive protection of $W_{DBG}$, then the media and the head can account for the buffers differently. However, in various approaches, it is not necessary to include $W_{DBG}$:

{$W_{SBG2}$, $W_{Edge2}$ and $W_{DBG2}$ = 0} with $W_{SBG2}$ = $W_{SBG1}$ + $W_{DBG1}$, $W_{Edge2}$ = $W_{Edge1}$ − $W_{DBG1}$. gives equivalent results to {$W_{SBG1}$ + $W_{DBG1}$, $W_{Edge1}$ ≠ 0}.

Often in the figures and text, $W_{DBG}$ is either set to 0 or simply ignored. To include it, simply use the math given above and redefine the parameters.

In the description of writing, data is written top-to-bottom of a data band for forward or even wraps and bottom-to-top for reverse or odd wraps. "Forward" and "even" are used interchangeably herein to describe forward wraps, as are "reverse" and "odd" wraps.

Method to Write Data

Determination of writing process focuses on the sub data bands.

Figure 12:
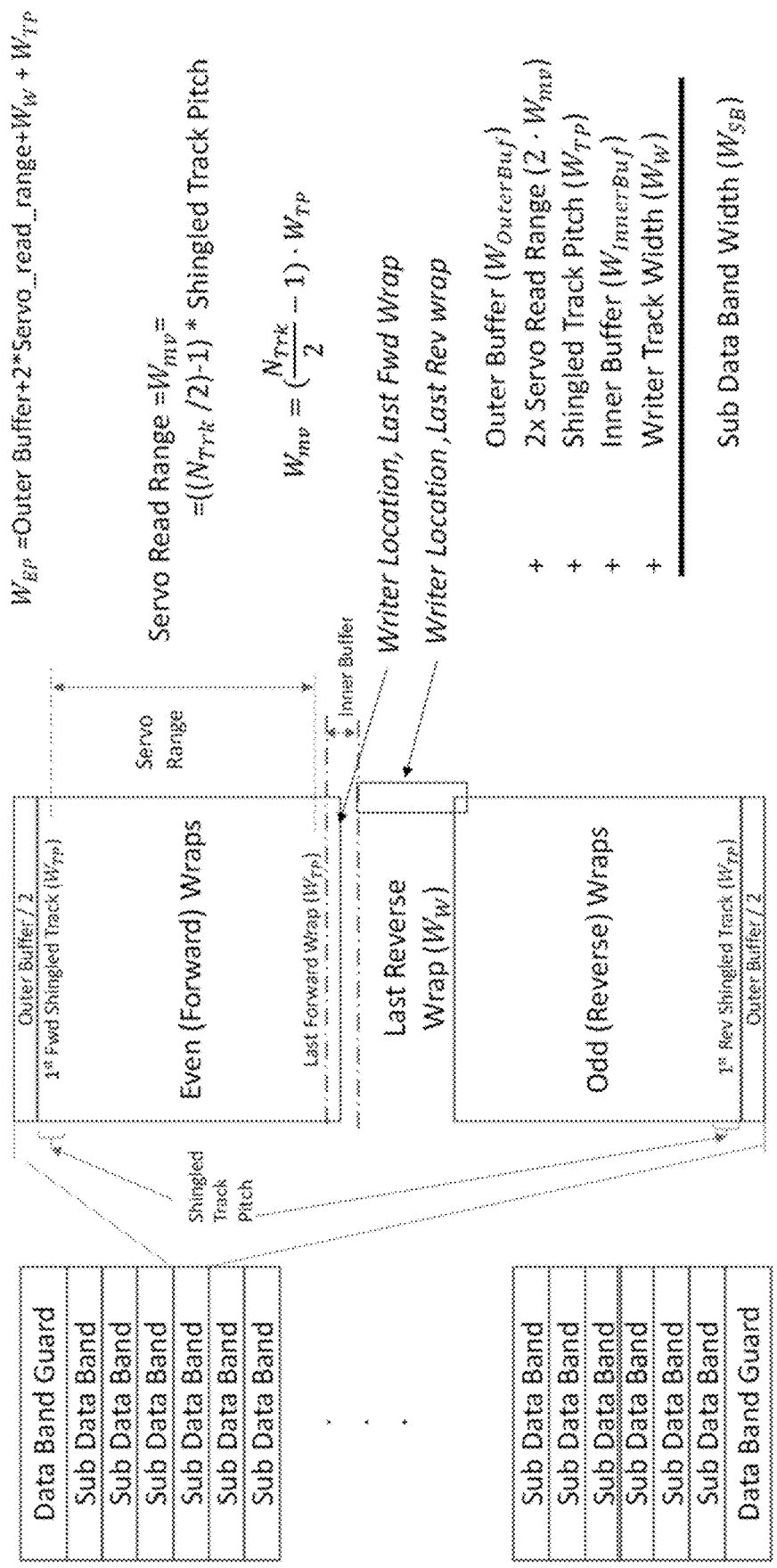
FIG. 12 is a representational view of data band and sub-data band composition, in accordance with an exemplary approach.

FIG. 12 is a representation of a Data Band (DB) and Sub Data Bands, SDB. The data band is surrounded by two data band guards (DBGs), each of width $W_{DBG}$. The data band guards act as buffers between the data band and the surrounding servo bands. For a tape head with $N_E$ reader and $N_E$ writer elements and a drive with $N_{CH}$ read/write channels, where $N_E$=$N_{CH}$, the number of sub data bands is $N_E$.

On the reader and writer modules, the elements (readers or writers) are all separated by an element pitch of width, $W_{EP}$. The width of the data band, $W_{DB}$, is given by the number of elements times the element pitch:

$$W_{DB} = N_E \cdot W_{EP}. \quad 10$$

Each SDB has an outer buffer on either end with the width, $W_{OutBuf}$/2. The data is written from the top of the SDB to the center on forward wraps and from the bottom of the SDB to the center on reverse wraps. An inner buffer of width, $W_{InBuf}$, separates the last forward track from the last reverse track.

A total of $N_{trk}$ wraps (or tracks) may be written. One half of the data tracks will be even (forward) wraps and half will be in the odd (reverse) wraps. In this document, even and forward are interchangeable as are odd and reverse. forward and reverse, simply indicate directions of tape motion. These terms are also interchangeable in practice. For the first even wrap, the writer element top edge abuts the lower edge of the top outer buffer. The data is shingled to a track pitch width, $W_{TP}$. The width of the even wrap data region within the SDB is $W_{TP} \cdot N_{trk}/2$. Thus, the writer element moves a distance, $W_{mv}$, given by:

$$W_{mv} = \left(\frac{N_{trk}}{2} - 1\right) \cdot W_{TP}. \quad 11$$

An inner buffer of width $W_{InBuf}$ is located between the even and odd wraps region to ensure that the data is not overwritten by the last even or odd written track. The bottom of the final shingled track for the even wraps abuts the top of the inner buffer. For the first odd wrap, the bottom of the writer element abuts the top of the outer buffer at the bottom of the SDB. For the final odd wrap, the top of the writer element will be positioned at or slightly below the bottom of the inner buffer. This is to ensure that no data is overwritten. The width of the final odd wrap will then be the width of the writer element as it is not shingled. The data sub band width is the element pitch, which may be calculated using Equation 12a:

$$W_{EP} = (N_{TrkR} - 1) \cdot W_{TP} + W_W + W_{OutBuf} + W_{InBuf}. \quad 12a$$

Solving for $N_{TrkR}$ gives:

$$N_{TrkR} = \frac{W_{EP} - W_W - W_{InBuf} - W_{OutBuf} + W_{TP}}{W_{TP}} \quad 12b$$

$N_{TrkR}$ is a real number. Physically, the number of wraps an integer, $N_{Trk}$. Because the number of even and odd wraps is the same, $N_{Trk}$ is an even integer:

$$\text{and } N_{Trk} = 2 \cdot \text{float}(N_{TrkR}/2), \text{ or} \quad 12c$$

$$N_{Trk} = 2 \cdot \text{floor}\left(\frac{W_{EP} - W_W - W_{InBuf} - W_{OutBuf} + W_{TP}}{2 \cdot W_{TP}}\right). \quad 12d$$

floor(x) is the mathematical function which rounds down to the nearest integer.

Because the buffers are much smaller than $W_{EP}$ and $W_W$, $N_{Trk}$ is primarily given by $W_{EP}-W_W$, so the wider the writer element, the lower the capacity.

$$N_{Trk} \sim \frac{W_{EP} - W_W}{W_{TP}} + 1 \quad \text{12e}$$

The next step is to determine the width of the servo bands. Two preferred options for servo-related configurations will be discussed below. The simplest is a single servo in each servo band (single servo option). The second is using two separate servos, one to write the even wraps and a second to write the odd wraps (dual servo option).

Single Servo Option for $N_E=N_{CH}$.

Figure 13:
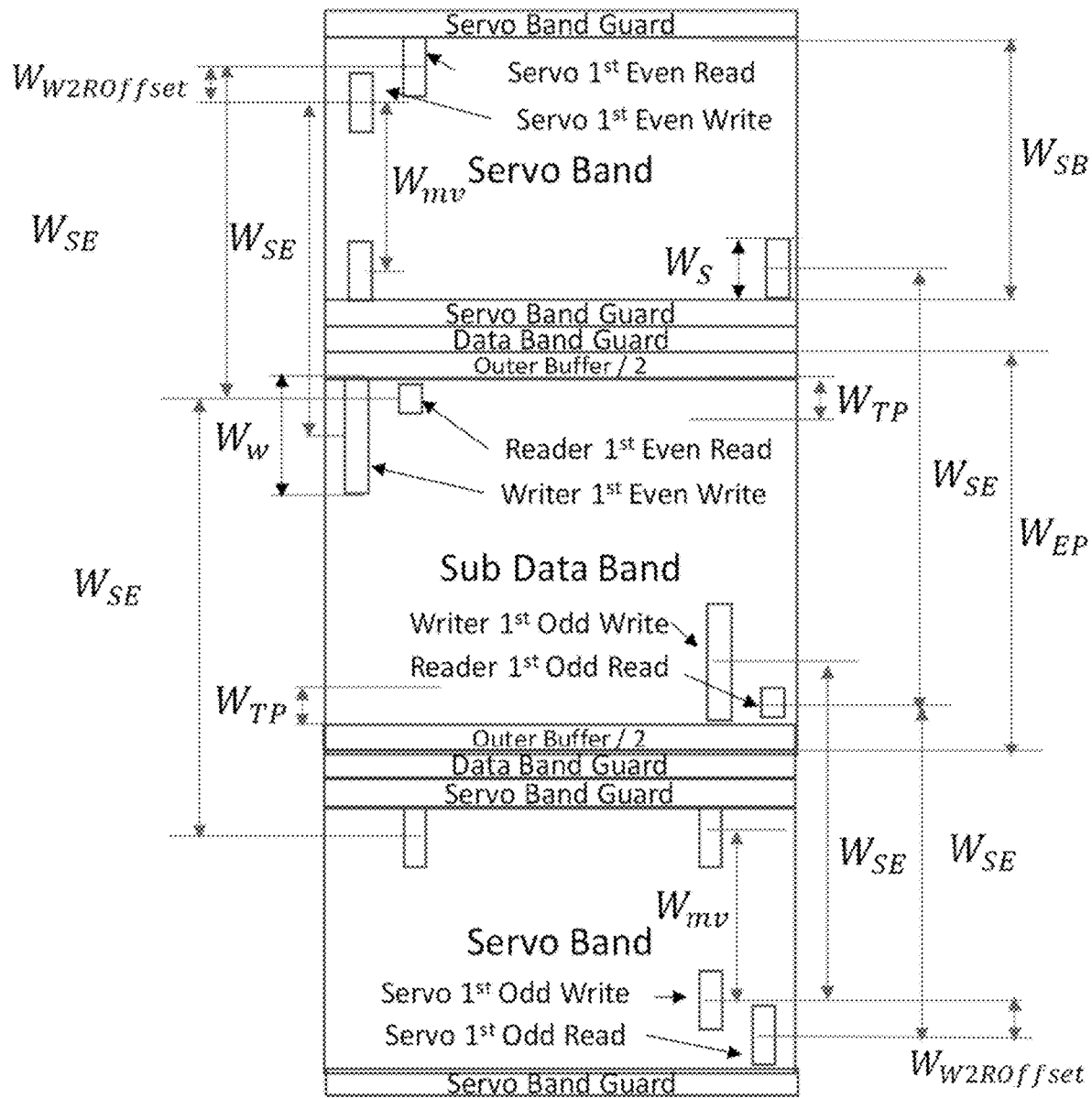
FIG. 13 is a schematic of the servo bands and a single sub data band for forward and reverse writing and reading, in accordance with an exemplary approach.

FIG. 13 is a schematic of two servo bands surrounding one sub data band in the case where $N_E=N_{CH}=1$. The concept can be expanded to any case where $N_E=N_{CH}+1$. FIG. 13 demonstrates how the servo-to-nearest element distance ($W_{SE}$ in FIG. 13) or the servo band width, $W_{SB}$, in FIG. 13 is sufficient for any $N_E$. For $N_E>1$, the length of the data band region is $W_{DB}$, given by Equation 10. Shown are the top and bottom servo bands with the servo band guards (labeled Servo Band Guard), the data band guards, the data band guards (labeled Data Band Guard), between the servo bands and the data band. Only a single SDB is shown, since this is pictorially easier than showing all SDBs on a tape having multiple SDBs.

Using a single servo reader when the number of channels is equal to the number of elements, $N_{CH}=N_E$, the width of the servo band and the distance between the servo reader and the nearest element, $W_{SE.EvenNE}$, (simply $W_{SE}$ in FIG. 13), can be explained using FIG. 13. The subscript "SE" indicates servo-to-element, and "EvenNE" indicates $N_E$ is an even number. Because the center of the reader element is $$\frac{W_{TP} + W_{OutBuff}}{2}$$

from the top of the SDB for the first even read wrap and from the bottom of the SDB for the first odd read wrap, the reader element moves a distance:

$$W_{mv.R} = W_{EP} - W_{TP} - W_{OutBuff}. \quad \text{13a}$$

The servo reader moves the same distance. The top edge of the servo reader abuts the top of the SB for the first even read wrap and the bottom edge of the servo reader abuts the bottom edge of the SB for the first odd wrap so the center of the servo reader is $W_S/2$ from the top and bottom edge of the SB for the first even and odd wraps respectively. $W_S$ is the servo reader width. Thus, the width of the servo band is:

$$W_{SB} = W_{mv.R} + 2 \cdot \frac{W_S}{2} = W_{EP} + W_S - W_{TP} - W_{OutBuff}. \quad \text{13b}$$

The distance between the center of the top servo reader and the center of the first reader element can be determined as depicted in FIG. 13 for the first even read with the distance $W_{SE.EvenNE}$ labeled as $W_{SE.Short}$:

$$W_{SE.EvenNE} = W_{SB} - \frac{W_S}{2} + W_{SBG} + W_{DBG} + \frac{W_{OutBuff}}{2} + \frac{W_{TP}}{2}. \quad \text{14a}$$

Combining 13b with 14a yields:

$$W_{SE.EvenNE} = W_{EP} + \frac{W_S - W_{TP} - W_{OutBuff}}{2} + W_{SBG} + W_{DBG}. \quad \text{14b}$$

By symmetry, the distance from the lower servo reader to the last reader element is also given by Equation 14b. Note that the actual width of the data band is given by Equation 8 for $N_E$ elements, but for explanation purposes a single SDB is sufficient and easier to show pictorially.

Equation 9 gives $W_{Tape}$ as a function of unknowns $W_{DB}$ and $W_{SB}$; Equations 10 and 13b respectively give $W_{DB}$ and $W_{SB}$ as a function of $W_{EP}$. Combining Equations 9, 10 and 13b allows one to solve for $W_{EP}$, as follows:

$$W_{EP} = \frac{W_{Tape} - 2 \cdot W_{Edge} - 2 \cdot N_{DB} \cdot W_{DBG} - (N_{DB}+1) \cdot (W_S - W_{TP} - W_{OutBuff} + 2 \cdot W_{SBG})}{(N_{DB} \cdot N_E + N_{DB} + 1)}. \quad \text{15a}$$

An approximation for $W_{EP}$ is:

$$W_{EP} \sim \frac{W_{Tape} - 2 \cdot W_{Edge}}{(N_{DB} \cdot N_E + N_{DB} + 1)}. \quad \text{15b}$$

Error in 15b is ~300 nm.

$W_{SB}$ can be determined using Equation 13b using the value for $W_{EP}$ from Equation 15a.

The servo reader-to-servo reader span, $W_{ServoSpan.Even}$, is given by:

$$W_{ServoSpan.Even} = 2 \cdot W_{SE.EvenNE} + (N_E - 1) \cdot W_{EP}. \quad \text{16a}$$

$$W_{ServoSpan.Even} = \quad \text{16b}$$
$$(N_E + 1) \cdot W_{EP} + W_S - W_{TP} - W_{OutBuff} + 2 \cdot (W_{SBG} + W_{DBG}).$$

Thus, $W_{ServoSpan.Even} \sim (N_E + 1) \cdot W_{EP} + W_S. \quad \text{16c}$

Single Servo Option for $N_E=N_{CH}+1$.

Figure 14:
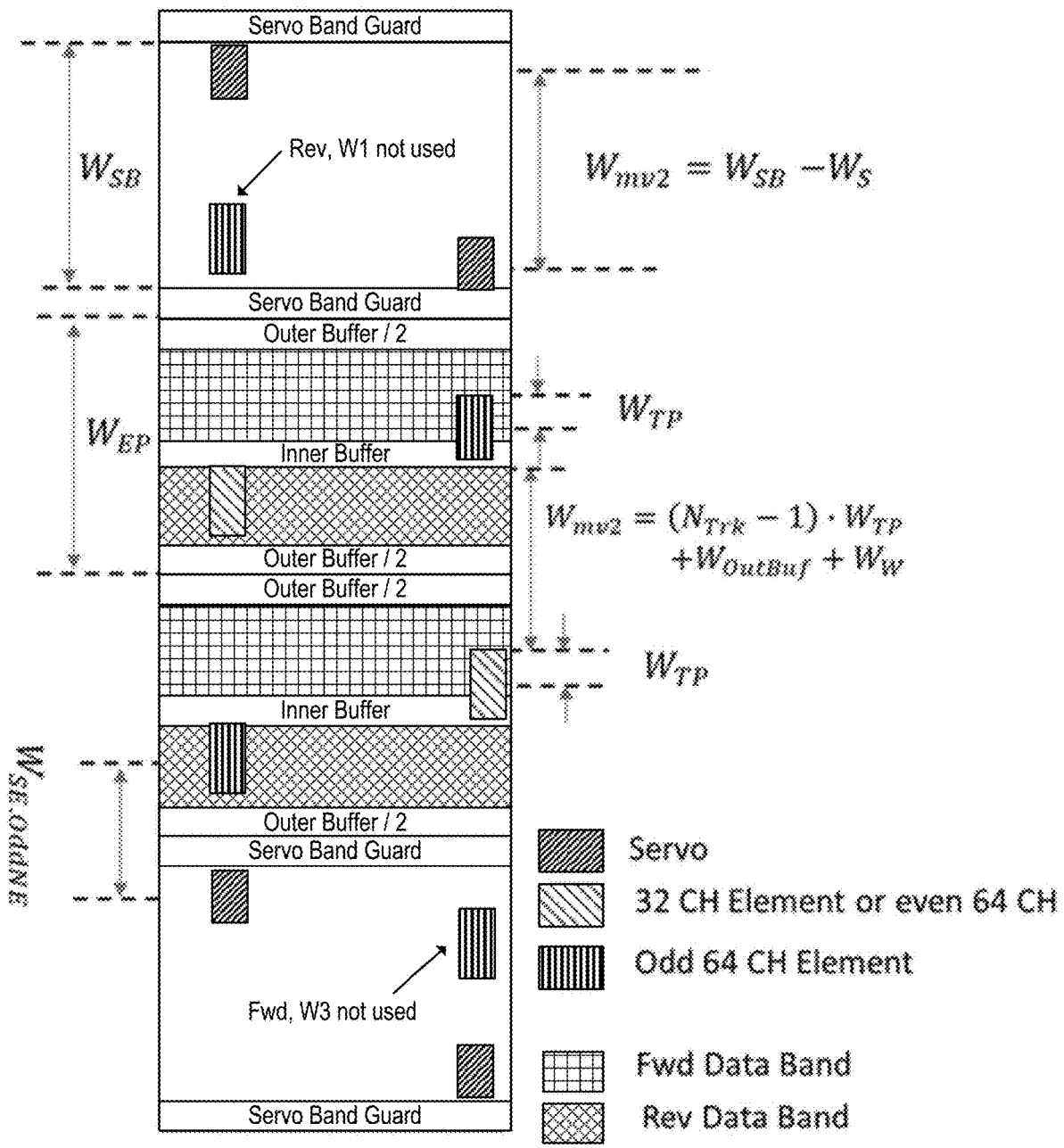
FIG. 14 is a schematic of the servo bands and a two sub data bands for one servo reader per servo band for the case where $N_E=3$ and $N_{CH}=2$, in accordance with an exemplary approach.

Another option, in accordance with one aspect of the present invention, is to use a single servo reader per servo band when the number of elements is one more than the number of channels, $N_E=N_{CH}+1$. FIG. 14 shows a schematic of two servo bands surrounding two sub data bands in the case where $N_E=3$ and $N_{CH}=2$. The concept can be expanded to any case where $N_E=N_{CH}+1$. The data band width is now given by Equation 17.

$$W_{DB} = N_{CH} \cdot W_{EP} = (N_E - 1) \cdot W_{EP}. \quad \text{17}$$

A total of $N_{trk}$ wraps (or $N_{trk}$) may be written. Half will be in the even wraps written in forward (Fwd.) direction and half will be in the odd wraps for the reverse (rev.) direction. In the forward wraps, the last element is not used, data is written in the top half of the data sub bands and the servo reader uses the bottom half of the servo band. Thus, the position of the writer element in the last even wrap defines the lowest location of the servo reader in the servo band. In the reverse (rev.) wraps, the first element is not used, data is written in the bottom half of the data sub bands and the servo reader uses the top half of the servo band. Thus, the position of the writer element in the last odd wrap defines the highest location of the servo reader in the servo band. The distance the servo readers move, $W_{mv}$, then, is given by:

$$W_{mv2} = W_{SB} - W_S. \tag{18a}$$

The writer elements move the same distance given as:

$$W_{mv2} = (N_{Trk} - 1) \cdot W_{TP} + W_{OutBuf} + W_W. \tag{18b}$$

Combining Equations 16a and 16b gives $W_{SB}$.

$$W_{SB} = W_S + (N_{Trk} - 1) \cdot W_{TP} + W_{OutBuf} + W_W \tag{18c}$$

FIG. 14 shows the concept for the wraps and Equations 12a-d still determine $N_{trk}$. Combining Equation 12b (with $N_{Trk}=N_{TrkR}$) yields:

$$W_{SB} = W_{EP} + W_S - W_{InBuf} \tag{18d}$$

Equation 9 gives $W_{Tape}$ with unknowns $W_{DB}$, and $W_{SB}$. Equations 17 and 18d respectively give $W_{DB}$, and $W_{SB}$ in terms of the unknown $W_{EP}$. Combining Equations 1, 17 and 18d yield a solution for $W_{EP}$:

$$W_{EP} = \frac{W_{Tape} - 2 \cdot W_{Edge} - 2 \cdot N_{DB} \cdot W_{DBG} - (N_{DB} + 1) \cdot (W_S + 2 \cdot W_{SBG} - W_{InBuf})}{N_{DB} \cdot (N_E - 1) + (N_{DB} + 1)}. \tag{19}$$

The distance between the center of the top servo reader and the center of the first writer element, $W_{SE.OddNE}$, can be determined as shown in FIG. 14 for the forward wraps: half the servo reader width plus the servo band guard, plus outer buffer/2 plus the distance the writer element move in forward wraps $$\left(\text{Equation 11. } W_{mv} = \left(\frac{N_{trk}}{2} - 1\right) \cdot W_{TP}\right),$$

plus, half the writer Width:

$$W_{SE.OddNE} = \frac{W_S}{2} + W_{SBG} + \frac{W_{OutBuf}}{2} + \left(\frac{N_{Trk}}{2} - 1\right) \cdot W_{TP} + \frac{W_W}{2}. \tag{20a}$$

Taking Equation 20a and replacing $N_{Trk}$ with $N_{TrkR}$ from Equation 12b yields:

$$W_{SE.OddNE} = \frac{W_{EP} + W_S - W_{InBuf} - W_{TP}}{2} + W_{SBG} \tag{20b}$$

Note that, for $N_E=N_{CH}+1$, (i.e. odd $N_E$), the distance of the servo reader to the nearest element is approximately half the element pitch plus half the servo reader width (($W_{EP}+W_S$)/2) while the even $N_E$ case the distance is approximately one element pitch plus half the servo reader width ($W_{EP}+W_S$).

The servo reader-to-servo reader span, $W_{ServoSpan.Odd}$, is given by:

$$W_{ServoSpan.Odd} = 2 \cdot W_{SE.OddNE} + (N_E - 1) \cdot W_{EP}. \tag{21a}$$

$$W_{ServoSpan.Odd} = N_E \cdot W_{EP} + W_S - W_{InBuf} - W_{TP} + 2 \cdot W_{SBG}. \tag{21b}$$

Thus, $$W_{ServoSpan.Odd} \sim N_E \cdot W_{EP} + W_S. \tag{21c}$$

Thus, for the two options of even and the odd $N_E$, both the data band width and the servo reader-to-servo reader span values (16c & 21c) are essentially the same.

Dual Servo Option for $N_E=N_{CH}$.

Figure 15:
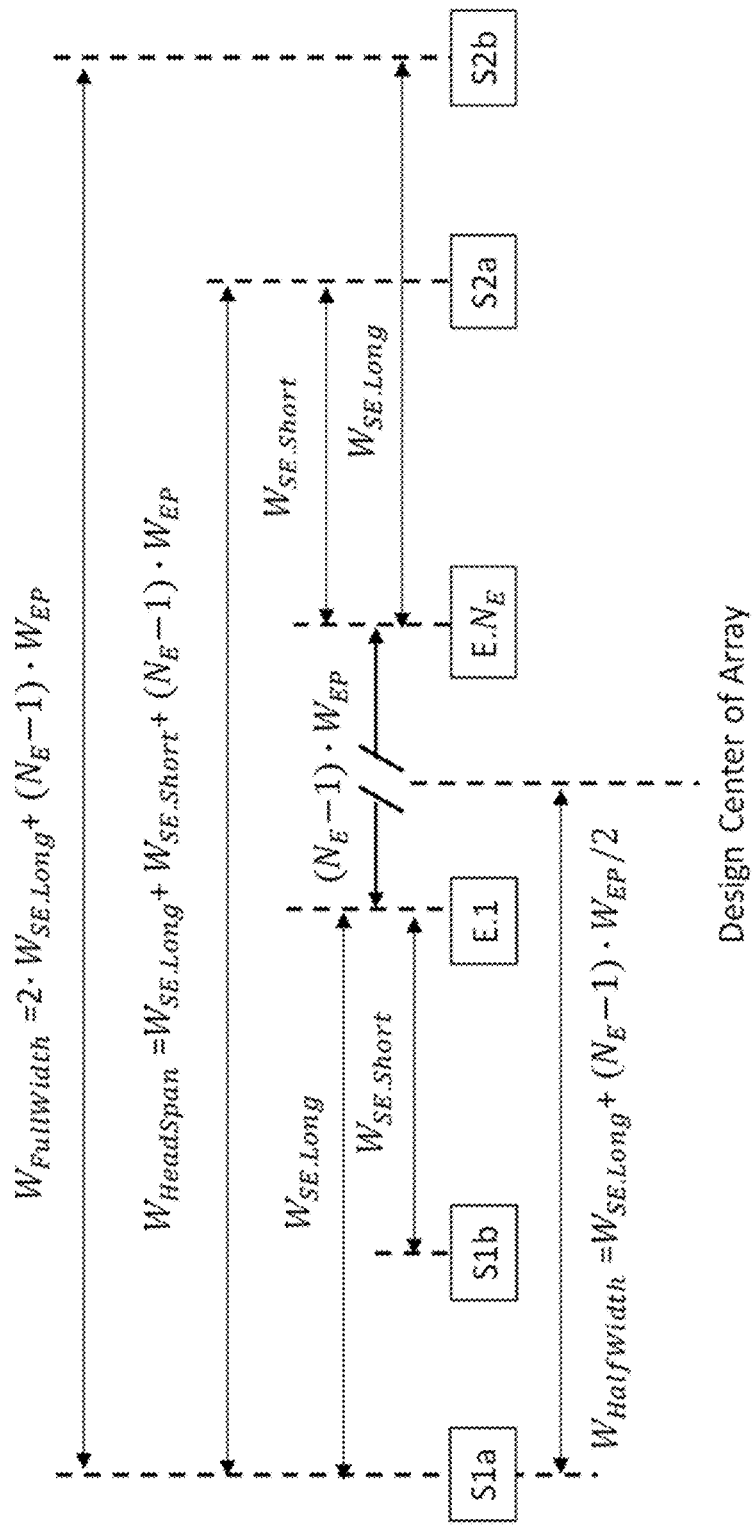
FIG. 15 is a schematic of a single band head with dual servo readers per servo band, in accordance with an exemplary approach.

FIG. 15 shows a schematic of a single band head with dual servo readers per servo band. The elements, E.1 to E.$N_E$ can be either a group of $N_E$ reader elements, R.1 to R.$N_E$, or writer elements, W.1 to W.$N_E$. The servo readers work in pairs: {S1$a$ and S2$a$} for forward or {S1$b$ and S2$b$} for reverse reading and/or writing.

Figure 16A:
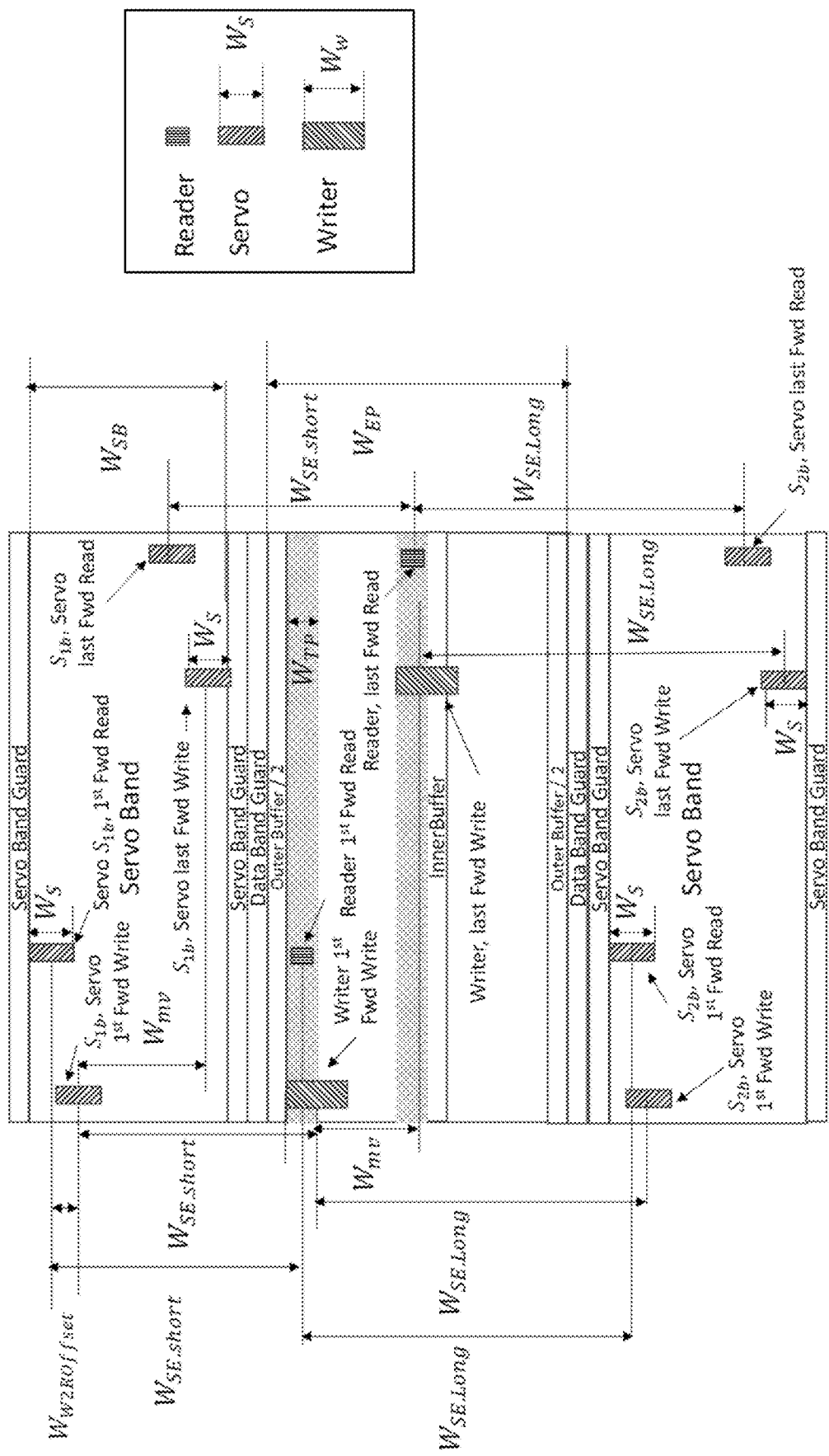
FIG. 16A is a schematic of servo bands and a single sub data band for forward writing and reading utilizing servo readers $S_{1b}$ and $S_{2b}$, in accordance with an exemplary approach.
Figure 16B:
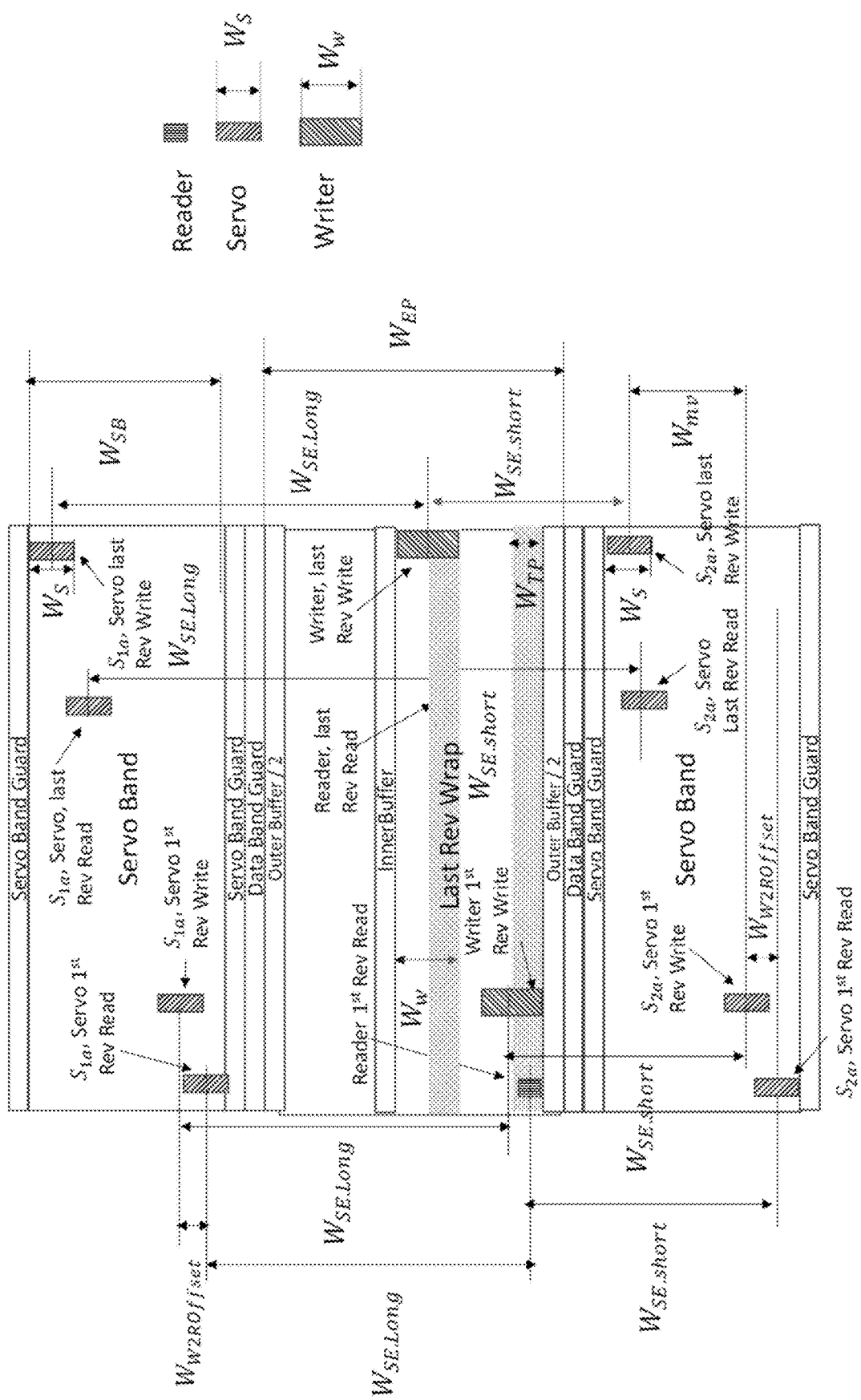
FIG. 16B is a schematic of servo bands and a single sub data band for reverse writing and reading utilizing servo readers $S_{1a}$ and $S_{2a}$, in accordance with an exemplary approach.

FIGS. 16A and 16B, respectively, are schematics of two servo bands surrounding a single Sub Data Band, SDB, for (16A) forward and (16B) reverse writing and reading. The actual length of the data band region is $W_{DB}$, given by Equation 8. As will be shown later, the distance from one of each servo reader pair to the nearest element is $W_{SE.Short}$ (also referred to herein as $W_{SE.Short.Head}$) while the second servo reader in the pair has a distance $W_{SE.Long}$ (same as $W_{SE.Long.Head}$) with the subscript "SE" referring to servo reader-to-element and the subscripts "Short" and "Long" for relative distance. The concept can be expanded include any number of SDBs. FIGS. 16A and 16B demonstrate how to determine the distances from a servo reader to the nearest element and the servo band width. FIGS. 11-12 and Equations 1 and 10 may be used for determining servo reader-to-servo reader spans and element pitch for $N_{DB}>1$, and the length of the data band region is $W_{DB}$, given by Equation 10. Shown in FIGS. 16A and 16B are a top servo band (toward top of page) and a bottom servo band with the servo band guard (labeled "Servo Band Guard"), the data band guards (labeled "Data Band Guard"), and the data band guards between the servo bands and the data band.

The positioning of the servo readers will now be described. Focusing on FIG. 16A for the forward wraps, $S_{1b}$ spans the top servo band and $S_{2b}$ spans the bottom servo band. The distance between the center of the top servo reader and the center of the first reader element may be determined as follows: the highest location of the servo reader is during first forward read wrap. The top edge of the top servo reader abuts the lower edge of the top servo band and the reader elements are located half a track pitch below the top outer buffer. Thus, the distance from the top servo reader, $S_{1b}$, to the first reader element, (e.g., $E_1$ in FIG. 15), is $W_{SE.Short}$, and is given as:

$$W_{SE.Short} = W_{SB} - \frac{W_S}{2} + W_{SBG} + W_{DBG} + \frac{W_{OutBuff}}{2} + \frac{W_{TP}}{2}. \tag{22}$$

This is the same Equation as used for the Single Servo option, but $W_{SB}$ is different as shown below. Here is where the difference occurs. For the first forward wrap, the top edge of the servo reader used in the lower servo band abuts the lower edge of the top servo band guard in that servo band (e.g., the top edge of the bottom servo band in FIG. 16A). The separation from the last reader element, $E_{NE}$, to the lower servo reader, $S_{2b}$, is labeled $W_{SE.Long}$.

$$W_{SE.Long} = W_{EP} - \frac{W_{OuterBuf}}{2} - \frac{W_{TP}}{2} + W_{DBG} + W_{SBG} + \frac{W_S}{2}. \quad 23$$

The primary dimension determining the distance between the servo reader and the closest reader element is $W_{SB}$ for $W_{SE.Short}$ and $W_{EP}$ for $W_{SE.Long}$. Because each pair of servo readers only spans half the data band for the even wraps, $W_{SB} \sim W_{EP}/2$, as will be shown below.

The odd wraps also use a pair of servo readers, and by symmetry, they have the same dimensions as the even wraps, except they are reversed, with $S_{SE.Long}$ (with $W_{SE.Long}$) being in the top servo band and $W_{SE.Short}$ being in the bottom servo band. Thus, the order of elements from top to bottom is: $S_{Long}$, $S_{Short}$, $N_E$ elements, $S_{Short}$, $S_{Long}$, or in FIG. 15: $S_{1a}$, $S_{1b}$, $N_E$ elements, $S_{2a}$, $S_{2b}$. The servo reader Span, or distance from the top servo reader to the bottom servo reader is then:

$$W_{ServoSpan.Even2S} = W_{SE.Short} + W_{SE.Long} + (N_E - 1) \cdot W_{EP}. \quad 24$$

The reverse wraps, shown in FIG. 16B, are similarly analyzed with the same results.

The next step is to determine the length of the servo band. Observing FIG. 16A, the top of the servo band is a distance $W_S/2$ above the center of $S_{1b}$ positioned for the first forward read wrap. For the first forward write wrap, the writer elements are positioned so the top edge of the writer element abuts the lower edge of the top outer buffer region (width $W_{OutBuf}/2$). For the first forward wrap, the distance between the center of the writer element and reader element is $W_{W2ROffset}$:

$$W_{W2ROffset} = (W_W - W_{TP})/2. \quad 25$$

The writer element writes $N_{trk}$ wraps, stepping a distance $W_{TP}$ per wrap (see FIGS. 12 and 16A). The distance moved, $W_{mv}$, is then:

$$W_{mv} = \left(\frac{N_{Trk}}{2} - 1\right) \cdot W_{TP}. \quad 26$$

The lower edge of the servo reader abuts the top of the lower servo band guard, which is $W_S/2$ below the center of the servo reader. The servo band width, $W_{SB}$, is given by the sum of the terms described above.

$$W_{SB} = \frac{W_S}{2} + W_{W2ROffset} + W_{mv} + \frac{W_S}{2}. \quad 27a$$

Combining Equations 25, 26 and 27a gives:

$$W_{SB} = W_S + \left(\frac{N_{Trk}}{2} - 1\right) \cdot W_{TP} + \frac{W_W - W_{TP}}{2}. \quad 27b$$

Substituting Equation 10b into 27b (using $N_{Trk}$ for $N_{TrkR}$ from 12b) yields $W_{SB}$ in terms of $W_{EP}$:

$$W_{SB} = \frac{W_{EP} - W_{OutBuf} - W_{InBuf}}{2} + W_S - W_{TP}. \quad 27c$$

To first order:

$$W_{SB} \sim \frac{W_{EP}}{2} + W_S - W_{TP}. \quad 27d$$

Or to within the width of $W_S$:

$$W_{SB} \sim \frac{W_{EP}}{2}. \quad 27e$$

The final dimension to calculate is $W_{EP}$, which is solved using Equation 9 for $W_{Tape}$, which contains the dimensions $W_{DB}$ (Equation 8) and $W_{SB}$ (Equation 20c):

$$W_{EP} = \left( \frac{W_{Tape} - 2 \cdot W_{Edge} - 2 \cdot N_{DB} \cdot W_{DBG} - (N_{DB} + 1) \cdot (W_S + 2 \cdot W_{SBG} - W_{TP} + (W_{OutBuf} - W_{InBuf})/2)}{\left(N_E \cdot N_{DB} + \frac{(N_{DB} + 1)}{2}\right)} \right). \quad 28$$

The optimum choice of element pitch, $W_{EP}$, is determined using the tape input values of tape width $W_{Tape}$, edge guard band width $W_{Edge}$, number of data bands $N_{DB}$, and the head/drive parameter of the number of elements $N_E$ and the servo band guard $W_{SBG}$ and data band guard $W_{SBG}$ and the outer and inner buffers $W_{OutBuf}$ and $W_{InBuf}$ chosen for drive operation. To first order, $W_{EP}$ is:

$$W_{EP} \sim \frac{W_{Tape} - 2 \cdot W_{Edge}}{N_E \cdot N_{DB} + \frac{(N_{DB} + 1)}{2}}, \quad 29a$$

$W_{EP}$ can be further approximated with a loss of ~1% in accuracy as:

$$W_{EP} \sim \frac{W_{Tape} - 2 \cdot W_{Edge}}{N_E \cdot N_{DB}}, \quad 29b$$

Which, to first order, is the used portion of tape ($W_{Tape} - 2 \cdot W_{Edge}$) divided by the total number of sub data bands ($N_E \cdot N_{DB}$).

Head Assembly/Alignment, 1-Band Head and Dual Servo Option

A 1-band head is one in which the elements span a single band, surrounded by servo bands. FIG. 15 is a schematic for a 1-band head with $N_E$ elements utilizing the Dual Servo Option. FIGS. 16A and 16B describe the operation of forward and reverse writing/reading for a 1-band head. In practice, reader and writer elements should be aligned in the intended direction of tape travel thereacross to enable operation in read-while-write and read-only modes.

Figure 17:
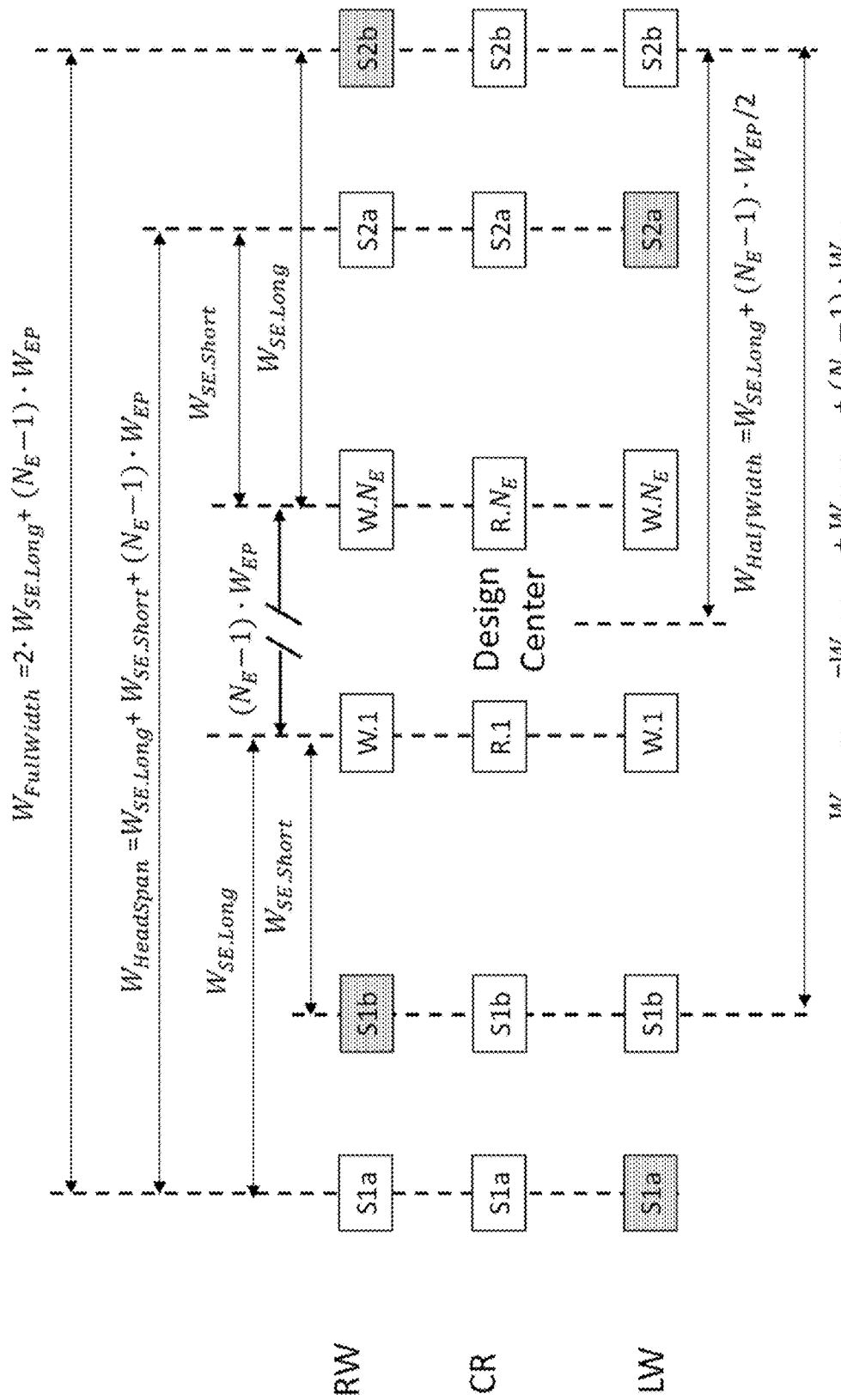
FIG. 17 is a schematic of a 1-band head with $N_E$ elements utilizing a Dual Servo Option for a 3-module head alignment with Left Writer (LW), Right Writer (RW) and Center Reader (CR) modules, in accordance with an exemplary approach.

FIG. 17 shows the alignment and assembly schematic for a 3-module head alignment with Left Writer (LW), Right Writer (RW) and Center Reader (CR) modules. To match FIG. 17 alignment with FIGS. 16A and 16B, the arrays shown in FIG. 17 are rotated 90 degrees clockwise. LW refers to media traveling from left to right in FIG. 16A for forward motion; thus LW will be writing, and the Center Reader, CR, will be reading even wraps. RW refers to media traveling from right to left in FIG. 16B, so LW will be writing and the Center Reader, CR, will be reading odd wraps. For forward wraps, servo readers, $S_{1b}$ and $S_{2b}$ will be used by both the CR and the LW, so $S_{1a}$ and $S_{2a}$ are "hashed out" in FIG. 17 for the LW. For reverse wraps, servo readers, $S_{1a}$ and $S_{2a}$ will be used by both the CR and the RW, so $S_{1b}$ and $S_{2b}$ are "hashed out" in FIG. 17 for the RW.

Head Assembly/Alignment, 2-Band Head and Dual Servo Option

A 2-band head is one in which the elements span two bands. Particularly, half the data elements are used in one band and the other half are used in an adjacent band, with three groups of servo readers in three servo bands in a preferred approach. For a 2-band head, the media should have an even number of data bands with data being written to, or read from, two adjacent data bands simultaneously. The arrangement during read or write is, in one approach: SB, DB, SB, DB, SB.

Preferably, data elements operate simultaneously to write and/or read data in both data bands simultaneously. Conventional encoding and decoding techniques may be applied to the groups of data elements in both data bands, in a manner that would become apparent to one skilled in the art after reading the present disclosure. For example, in one approach, the two groups of elements above the two data bands operate together as one larger array. Thus, for example, if there are 32 writers in each group for a total of 64 writers across both data bands, a single stream of data may be deserialized for concurrent writing using writers in both groups, i.e., data from the single stream is written concurrently into both data bands, preferably along with error correction encoding of known type. In another approach, each group of writers operates independently, e.g., for concurrently writing two streams of data to the two data bands, for concurrently writing alternating chunks from the data stream that are held in a buffer associated with each group so as to maintain constant writing, etc.

FIG. 8 is a schematic for a 2-band head with $N_E$ elements in each Group (A and B) utilizing Dual Servo Option for a 3-module head alignment with a Left Writer (LW), a Right Writer (RW), and a Center Reader (CR) module, in accordance with one approach. To match FIG. 8 alignment with FIGS. 13 and 14, the arrays shown are rotated 90 degrees clockwise. LW refers to media traveling from left to right in FIGS. 13 and 14; thus LW will be writing and the Center Reader, CR, will be reading even wraps (forward or Fwd.). RW refers to media traveling from right to left in FIGS. 13 and 14; thus RW will be writing and the Center Reader, CR, will be reading odd wraps (reverse or rev.). S servo readers, $S_{nb}$, will be used for even (forward) wraps and T servo readers, $S_{na}$, for odd (reverse) wraps (or vice versa).

As described earlier, a 3-module head is not the only functional design for a linear tape product. One could also build a 2-module head which has both reader elements and writer elements on each module.

Figure 19:
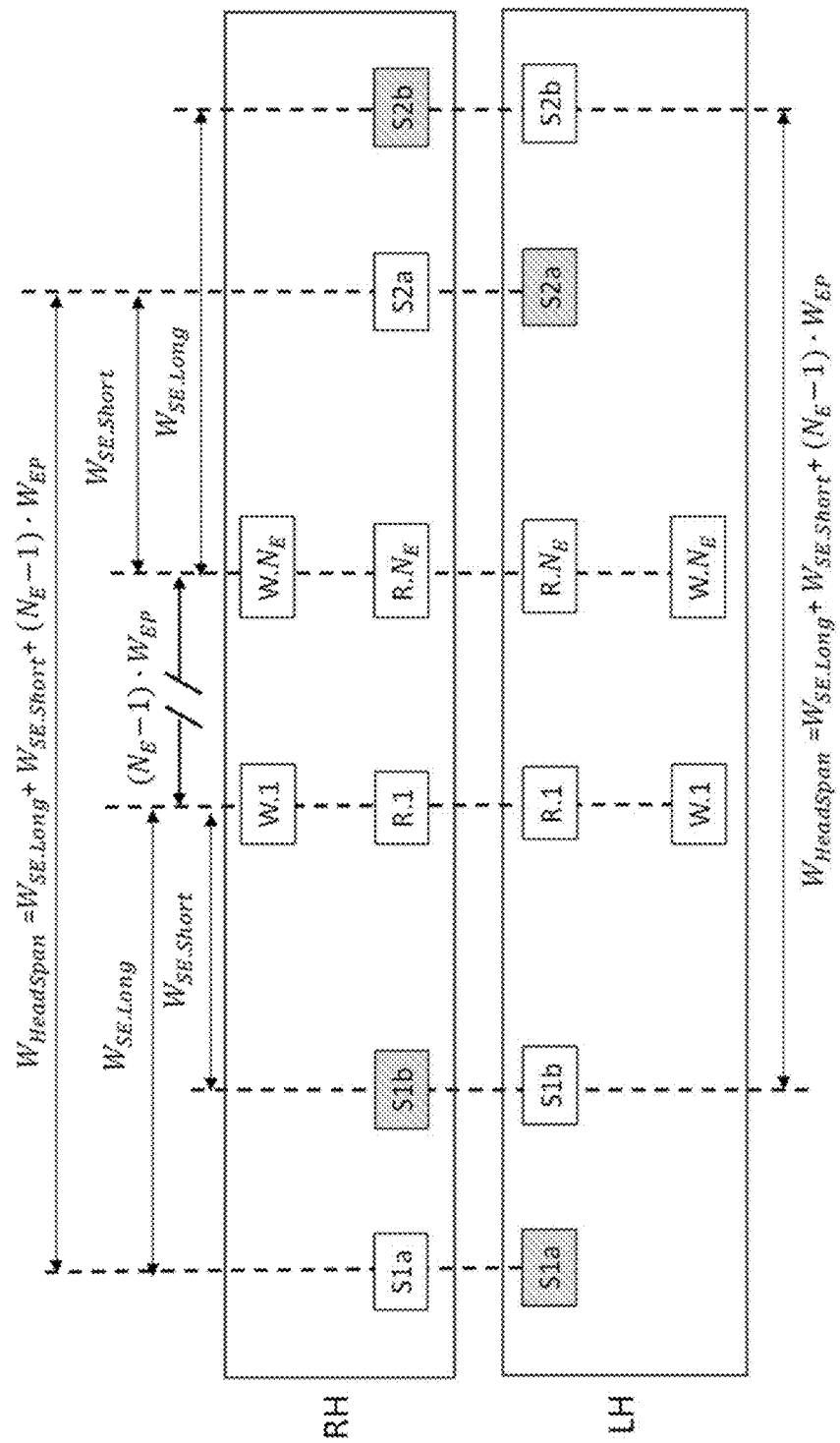
FIG. 19 is a schematic of a 1-band head with $N_E$ elements utilizing a Dual Servo Option for a 2-module head alignment, in accordance with an exemplary approach.

FIG. 19 shows a schematic of a 2-module, 1-band head with $N_E$ elements utilizing Dual Servo Option for a 2-module head alignment with a Left Head (LH) and a Right Head (RH), both with $N_E$ Readers and $N_E$ Writers.

For the 2-module head, the servo readers may be placed in the line of the reader elements in the design, and accordingly may be built in the same process on the wafer. While it is possible to make multiple process steps in the wafer build, to place the reader elements and servo readers in different layers, it is substantially more expensive. The writer elements are preferably placed on the outside of the head since the reader elements from the same module will read while the writer elements are writing. In forward motion, the direction of tape movement is from bottom of the LH from the writer side to the reader side. For reverse writing, the direction of tape movement is from the top of the RH from the writer side to the reader side. For read-while-write, reading from the same module as writing has the advantage for alignment, especially in the case of the rotated head where alignment will be better. It is equally possible to reverse the ordering (i.e., rotate both modules around 180 degrees) and reverse the ordering of the module read/write. Another possibility is to write using one module and read using the second module.

Because of the cost of a wafer and servo writer for the media, a general design is often reused for several generations. The head design of element pitch and servo reader locations remain fixed and only parameters such as reader element and writer element widths and track pitch are changed to achieve higher capacity. The media servo pattern locations and widths remain unchanged, only modifying the media properties such as magnetic layers, surface roughness, substrate thickness and length for enabling higher capacity.

The change in the optimum element pitch is not affected by the writer element width.

$$\frac{\partial W_{EP}}{\partial W_W} = \frac{\partial W_{SE.Long}}{\partial W_W} = \frac{\partial W_{SE.Short}}{\partial W_W} = 0 \quad\quad 30$$

The dependence on optimized $W_{EP}$ and a change in $W_{TP}$ is given by:

$$\frac{\partial W_{EP}}{\partial W_{TP}} = \frac{(N_{DB}+1)}{\left(N_E \cdot N_{DB} + \frac{(N_{DB}+1)}{2}\right)} \sim 1/N_E \quad\quad 31$$

For $N_E$=64 and $W_{TP}$ changing from 500 to 200 nm, the change in the optimum $W_{EP}$ is only 4.7 nm. By using a design calculated for a fixed $W_{TP}$ of say 350 nm to optimize for track pitches ranging from 500 to 200 nm, the head will function for the full range with minor or no reduction in the capacity ($N_{trk}$) for a $W_{TP}$ other than 350 nm.

The change in $W_{SE.Long}$ and $W_{SE.Short}$ with changes in $W_{TP}$ are given here:

$$\frac{\partial W_{SE.Long}}{\partial W_{TP}} = \frac{\partial W_{SE.Short}}{\partial W_{TP}} = -0.5 \text{ nm/nm} \quad\quad 32$$

A change in $W_{TP}$ by ±150 nm will change the optimum $W_{SE.Long}$ and $W_{SE.Short}$ by ±75 nm, which is minimal with buffers of 1 μm or more. By using a design calculated for a fixed $W_{TP}$ of $W_{TP.Nom}$=350 nm, the head will function for the full range with minor or no reduction in the capacity ($N_{trk}$) for $W_{TP}$ other than 350 nm. Because the design is specific to a given media format, the locations and sizes of the servo patterns remain unchanged resulting in only minor or no reduction in the capacity achieved compared to the optimum.

Head Design

Reader and writer tape modules as described herein may be fabricated using known techniques. In exemplary fabrication processes, material is deposited onto a ceramic substrate. The deposition is built vertically. For a ringed writer, the first pole deposited is termed P1 and the latter deposited pole is P2. From the tape bearing surface, TBS, one sees the outline of P1, a gap of non-magnetic material, and P2.

Moreover, the values used for the variables in any of the Equations listed herein may be any number desired by the designer, so long as the final numbers all work together in an operable apparatus or tape product, as would be apparent to one skilled in the art after reading the present disclosure. Typically, some of the values are selected to provide a desired function or are prespecified. Such values selected or prespecified may include tape width, data element width, servo reader width, number of data bands on tape, etc.

Figure 20B:
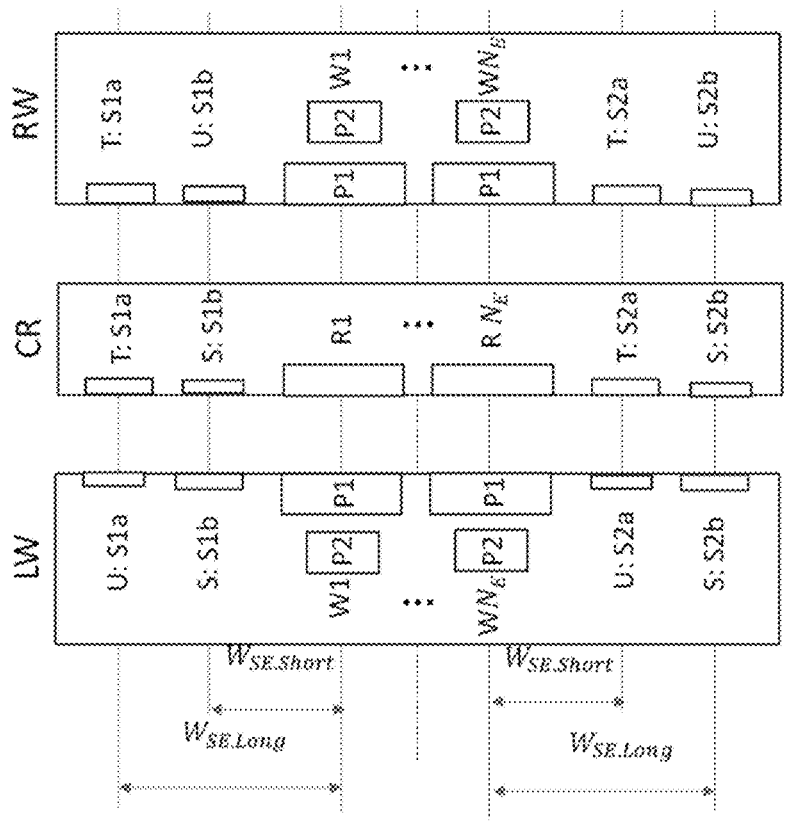
FIG. 20B is a schematic for a 1-band head with $N_E$ elements utilizing Dual Servo Option for a 3-module head alignment with LW, RW and CR modules, in accordance with one approach in which writer pole P1 is the trailing edge.
Figure 20A:
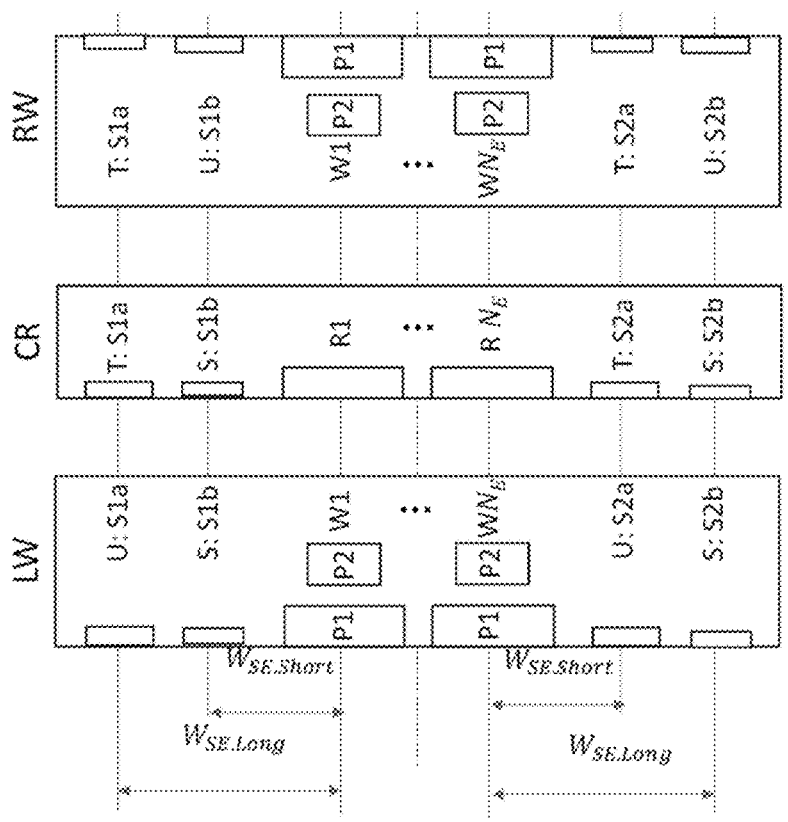
FIG. 20A is a schematic for a 1-band head with $N_E$ elements utilizing Dual Servo Option for a 3-module head alignment with LW, RW and CR modules, in accordance with one approach in which writer pole P2 is the trailing edge.

FIGS. 20A and 20B are schematics for a 1-band head with $N_E$ elements utilizing Dual Servo Option for a 3-module head alignment with a Left Writer (LW) and Right Writer (RW) and Center Reader (CR) modules, in accordance with various approaches. The LW and RW respectively write while media moves from left-to-right and right-to-left. In FIG. 20A, writer pole P2 is the trailing edge. In FIG. 20B, writer pole P1 is the trailing edge. Because of processing constraints, the geometry of P1 and P2 are often different. The trailing pole material dominates the quality of the written magnetic bit transition. Because of differences in processing, either P1 or P2 trailing may be preferable. With the symmetric design described in this disclosure, one can use either P1 or P2 trailing without modifying the drive code. Because of the long time and large cost in building wafers and developing drive code, the versatility in enabling either P1 or P2 trailing designs with the same wafer is highly beneficial in time, effort, and cost.

Apparatus

An apparatus, in accordance with one approach, includes a magnetic head having an array of transducers, the transducers comprising data elements such as read elements or write elements, at least two first servo readers positioned toward a first end of the array and at least two second servo readers positioned toward a second end of the array. The data elements and servo readers may be of any type mentioned herein and may be constructed via known techniques. The servo readers are preferably generally aligned with the data elements along the longitudinal axis of the array, the servo readers being positioned relative to the data elements to enable positioning of the data elements within a data band of a magnetic tape based on readback signals from at least some of the servo readers reading the servo bands that flank the data band. The array of transducers is symmetrical about a centerpoint thereof, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto.

In a preferred aspect, only two of the first servo readers and only two of the second servo readers are present in the array. For example, FIG. 20A depicts such an approach, where S1a and S1b are the first servo readers in each array, while S2a and S2b are the second servo readers in each array. See also FIGS. 15-17 and 19-20B.

The various dimensions of the respective components of the apparatus, and their relative positioning, may be as listed or suggested elsewhere herein. In one exemplary approach, an average pitch $W_{EP.Head}$ of the data elements is in a range of 86 to 97 microns, a center to center distance $W_{SE.Short}$ between the data element closest to the first end of the array and the first servo reader closest to the data elements is in a range of $(W_{EP}/2)+3$ to $(W_{EP}/2)+10$ microns, a center to center distance $W_{SE.Long}$ between the data element closest to the first end of the array and the first servo reader farthest from the data elements is in a range of $W_{EP}+3$ to $W_{EP}+10$ microns, a center to center distance between the data element closest to the second end of the array and the second servo reader closest to the data element is about equal to $W_{SE.Short}$, and a center to center distance between the data element closest to the second end of the array and the second servo reader farthest from the data element is about equal to $W_{SE.Long}$.

In one approach, the data elements are writer elements, and the magnetic head includes a second array aligned with the array in an intended direction of tape travel thereacross, the second array comprising read elements e.g., in a read-while-write arrangement. At least two third servo readers positioned toward a first end of the second array and at least two fourth servo readers positioned toward a second end of the second array. The second array is also symmetrical about a centerpoint thereof, e.g., as if the array were folded over on the centerline such that the second end of the array overlies the first end of the array. This feature enables read-while-write, which is important for data verification.

As described in more detail below, a longitudinal axis of the array may be nominally tilted by greater than 0 degrees, e.g., greater than 1 degree, greater than 2 degrees, preferably greater than 5 degrees, etc. from normal relative to an intended direction of tape travel thereacross. The maximum nominal tilt may be about 15 degrees. Thus, the actual nominal tilt may be any value in the range of greater than 0 and about 15 degrees. The range of tilt may be from 0 to about 20 degrees, ± some value from the nominal tilt (e.g., <5 degrees, <3 degrees, etc.). The tilt provides a predefined "effective" element pitch, and enables compensation for tape lateral expansion and contraction by adjusting the tilt, which in turn increases or decreases the effective element pitch. For example, reducing the tilt increases the effective pitch.

Figure 18:
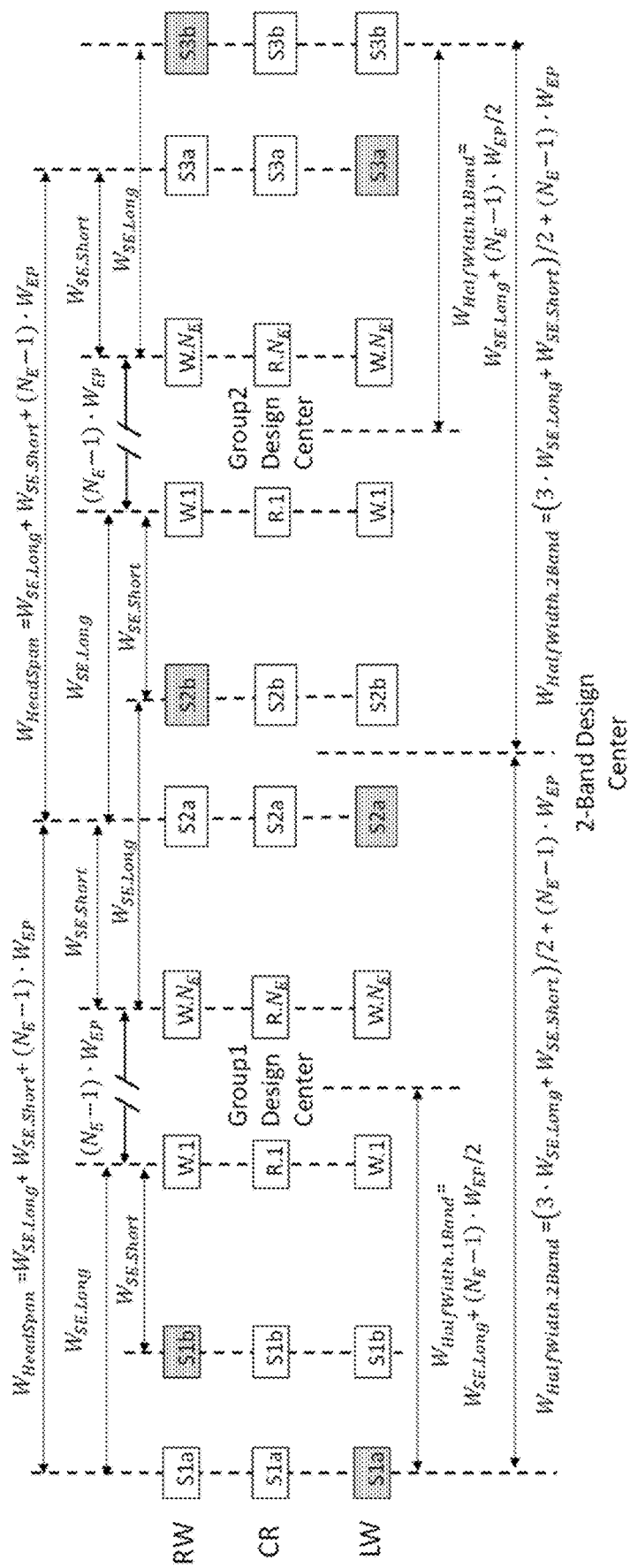
FIG. 18 is a schematic of a 2-band head with $N_E$ elements in each of two groups of transducers, and utilizing a Dual Servo Option for a 3-module head alignment with LW, RW and CR modules, in accordance with an exemplary approach.

In one approach for performing data operations on two data bands, a second array of transducers is aligned along a longitudinal axis of the array. See, e.g., FIG. 18. A first end of the second array is positioned adjacent the array. The second array of transducers comprises second data elements and at least two third servo readers positioned toward a second end of the second array. The distance between the center of the innermost second servo reader and a center of the data element of the second array closest thereto is the same as the distance between the center of the outermost first servo reader and the center of the data element closest thereto, as shown in FIG. 18. The distance between a center of the outermost second servo reader and a center of the data element of the second array closest thereto is the same as the distance between the center of the innermost second servo reader and the center of the data element closest thereto, as also shown in FIG. 18. The combined array consisting of the array and the second array is ideally symmetrical about a centerpoint of the combined array.

As mentioned above, the various dimensions of the respective components of the apparatus according to the many approaches described herein, and their relative positioning, may be as listed or suggested anywhere herein. Accordingly, dimensions such as the average pitch $W_{EP.Head}$ of the data elements; the distance $W_{SE.Short.Head}$ between the center of the innermost first servo reader and the center of the data element closest thereto; the distance $W_{SE.Long.Head}$ between the center of the outermost first servo reader and the center of the data element closest thereto; the distance $W_{ServoSpan.Head}$ between the center of the innermost one of the first servo readers and the center of the outermost one of the second servo readers; and so on may satisfy any of the corresponding equations presented herein.

Tilted Head for Tape Dimensional Stability Compensation.

In writing data to tape with a multi-element read/write head, the spacing between elements can increase or decrease due to changes in spacing on the head and/or in the media. Expansion or contraction of the head and/or media width due to thermal changes, humidity changes, and/or other stresses can occur. One mechanism for correcting for these changes is to tilt the head at an angle relative to the track direction. For example, if the media moves in the x direction and the track pitch is in the y direction, rotating the head by an angle θ relative to the y axis will shorten the track pitch in the frame of the tape, and thus, the effective track pitch as presented to tape is shortened. The apparatus can be built with a nominal value of $θ_o$, and active tilting of the array to change θ can be performed to change the effective transducer pitch as presented to tape. The analysis given so far can be generalized to include the head tilt concept by analyzing the dimensions in the reference of the media. For example, assume the media dimensions, $d_{media}$, are fixed and the head dimensions, $d_{head}$, are translated to the media reference plane by multiplying by cos ($θ_o$). The calculations for the head dimensions for parameter X, $W_{X.Head}$, are then done in the reference plane of the media as transformed dimensions, $W_{X.Tape}$ and visa versa:

$$W_{X.Tape} = \cos(θ_o) \cdot W_{X.Head} \quad 33$$

Media parameters include: $W_{Tape}, W_{Edge}, W_{DB}, W_{DBG}, W_{SB}, W_{SBG}, W_{OutBuf}, W_{InBuf}$ and $W_{TP}$, as described elsewhere herein.

Head parameters include: $W_S$, $W_W$, $W_R$, and $W_{EP}$, as described elsewhere herein.

Figure 21:
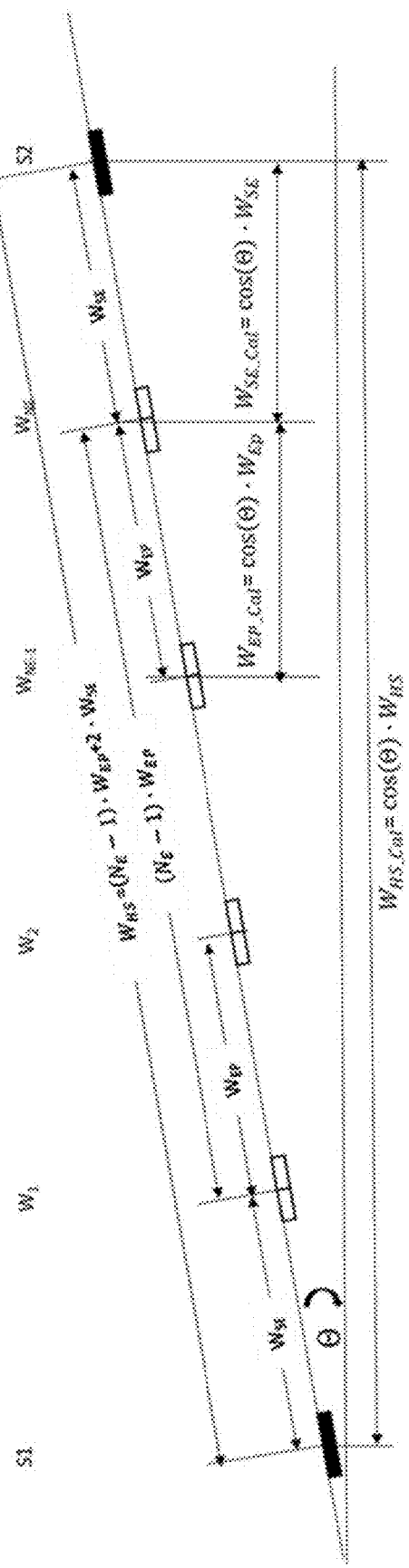
FIG. 21 is a schematic of a tilted head concept for tape dimensional stability (TDS) compensation, in accordance with an exemplary approach.

FIG. 21 shows the concept of tilting pictorially, e.g., for TDS compensation, whereby said concept may be applied to various aspects of the present invention, as would become apparent to one skilled in the art after reading the present disclosure. The Pisa angle is the nominal angle θ of tilt.

Following are exemplary guidelines for designing an apparatus that implements head tilt.

A head dimension used for determining the element pitch is the servo reader width. Thus, for a tilted head, the dimensions of the element pitch on tape, $W_{EP.Tape}$, is derived from Equation 28 using the servo reader width converted to tape dimension, $W_S \rightarrow W_S \cdot \cos(θ_o)$, and with $2 \cdot N_{DB} \cdot W_{DBG} = 0$:

$$W_{EP.Tape} = \left( \frac{W_{Tape} - 2 \cdot W_{Edge} - (N_{DB}+1) \cdot (W_S \cdot \cos(θ_o) + 2 \cdot W_{SBG} - W_{TP} + (W_{OutBuf} - W_{InBuf})/2)}{\left(N_E \cdot N_{DB} + \frac{(N_{DB}+1)}{2}\right)} \right) \quad 34a$$

$W_{EP.Tape}$ is approximated by:

$$W_{EP.Tape} \sim \frac{W_{Tape} - 2 \cdot W_{Edge}}{N_E \cdot N_{DB} + \frac{(N_{DB}+1)}{2}}. \quad 34b$$

The error in $W_{EP.Tape}$ using Equation 34b is approximately.

$$\Delta W_{EP.Tape1} \sim -\left(\frac{N_{DB}+1}{N_E \cdot N_{DB}}\right) \cdot (W_S \cdot \cos(θ_o) + 2 \cdot W_{SBG} - W_{TP}). \quad 34d$$

For $W_{Tape}$=12,650 μm and $W_{Edge}$=500 μm, Equation 34b yields $W_{EP.Tape}$=89.27 μm. With $W_{DBG}$=0, $N_{DB}$=4, $N_E$=32, $W_S$=2 μm, $θ_o$=10 deg, $W_{SBG}$=7 μm, and $W_{OutBuf}$=$W_{InBuf}$ the error in $W_{EP.Tape}$, $\Delta W_{EP.Tape1}$, is 0.18 μm or 0.2%. $W_{EP.Tape}$ can be further approximated to:

$$W_{EP.Tape} \sim \frac{W_{Tape} - 2 \cdot W_{Edge}}{N_E \cdot N_{DB}}. \quad 34e$$

With $N_{DB}$=4 and $N_E$=32, the additional error is about 2%:

$$\frac{\Delta W_{EP.Tape2}}{W_{EP.Tape}} \sim \frac{N_{DB}+1}{2N_E \cdot N_{DB}}. \quad 34f$$

The element pitch on the head is determined using Equation 33 as:

$$W_{EP.Head} = \frac{W_{EP.Tape}}{\cos(θ_o)}. \quad 35a$$

Combining Equations 34b and 35a yields an approximation for $W_{EP.Head}$ to an accuracy of 0.2% of:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(θ_o)}. \quad 35b$$

Equation 35b can be further approximated combining 34c with 35a to an accuracy of about 2%:

$$W_{EP.Head} \sim \frac{W_{Tape} - 2 \cdot W_{Edge}}{N_E \cdot N_{DB} \cdot \cos(θ_o)}. \quad 35c$$

The servo buffer is converted from Equation 27c to:

$$W_{SB.Tape} = \frac{W_{EP.Tape} - W_{OutBuf} - W_{InBuf}}{2} + W_S \cdot \cos(\theta_o) - W_{TP}. \qquad 36a$$

The servo buffer on tape is approximated by:

$$W_{SB.Tape} \sim \frac{W_{EP.Tape}}{2} + W_S \cdot \cos(\theta_o) - W_{TP.Nom}. \qquad 36b$$

The error in Equation 36a using 36b is:

$$\Delta W_{SB.Tape} = -\frac{W_{OutBuf} + W_{InBuf}}{2} - (W_{TP} - W_{TP.Nom}). \qquad 36c$$

With $W_{OutBuf} = W_{InBuf} = 0.25$ μm, and $W_{TP.Nom} = 0.35$ μm, and $0.2$ μm $\leq W_{TP} \leq 0.5$ μm, the error in $W_{SB.Tape}$ using the approximation of 36b rather than 36a is between −0.1 μm and −0.4 μm, which is easily accounted for with a $W_{SBG}$ between about 2 to 10 μm.

Inserting Equation 34e into 36b yields:

$$W_{SB.Tape} \sim \frac{W_{Tape} - 2 \cdot W_{Edge}}{2 \cdot N_E \cdot N_{DB}} + W_S \cdot \cos(\theta_o) - W_{TP.Nom}. \qquad 36d$$

$W_{SB.Tape}$, can be further reduced to half the element pitch:

$$W_{SB.Tape} \sim \frac{W_{EP.Tape}}{2} = \frac{W_{Tape} - 2 \cdot W_{Edge}}{2 \cdot N_E \cdot N_{DB}}. \qquad 36e$$

The error in using Equation 36e rather than 36d is primarily from $W_S$, which can be up to about 2 μm which is on the order of a 4% error.

Another important parameter for the tape is $W_{Servospan.Tape}$, which is the distance from the center of one servo band and the next. This can be derived in two ways. One derivation of $W_{Servospan.Tape}$ is by viewing the physical distance between the center of the two servo bands in FIGS. 16A and 16B. Setting $W_{DBG} = 0$:

$$W_{ServoSpan.Tape} = W_{SB.Tape} + N_E \cdot W_{EP.Tape} + 2 \cdot W_{SBG} \qquad 37$$

The second means to derive $W_{ServoSpan.Even2S}$ is using the servo band dimensions, $W_{SE.Short}$, and $W_{SE.Long}$ using Equations 22, 23 and 24 with 33. Setting $W_{DBG} = 0$ yields:

$$W_{SE.Short.Tape} = W_{SB.Tape} - \frac{W_S \cdot \cos(\theta_o)}{2} + W_{SBG} + \frac{W_{OutBuff}}{2} + \frac{W_{TP}}{2}. \qquad 38a$$

$$W_{SE.long.Tape} = W_{EP.Tape} - \frac{W_{OuterBuf}}{2} - \frac{W_{TP}}{2} + W_{SBG} + \frac{W_S \cdot \cos(\theta_o)}{2}. \qquad 38b$$

$$W_{ServoSpan.Tape} = \qquad 38c$$
$$W_{SE.Short.Tape} + W_{SE.Long.Tape} + (N_E - 1) \cdot W_{EP.Tape} + 2 \cdot W_{SBG}.$$

For tape dimensions, only the term in 38c, $W_{ServoSpan.Tape}$, is relevant. The Media used is defined by the dimensions: $W_{Tape}$, $W_{Edge}$, $W_{SB.Tape}$, $W_{ServoSpan.Tape}$, and $W_{SBG}$. Inserting Equations 38a and 38b into Equation 38c yields $W_{ServoSpan.Tape}$:

$$W_{ServoSpan.Tape} = W_{SB.Tape} + N_E \cdot W_{EP.Tape} + 2 \cdot W_{SBG}. \qquad 39$$

Equations 37 and 39 agree.

$W_{SB.Tape}$ and $W_{EP.Tape}$ are given by Equations 34a and 36a or approximated as 34b and 36d. Variations in the actual values of $W_{Tape}$ and $W_{Edge}$ of even 10s of microns don't substantially affect the results since end results are the head parameter definitions, and the tape definitions of $W_{Servospan.Tape}$ and $W_{SB.Tape}$.

Next is the calculation of the head parameters.

$W_{SB.Head}$ can be converted from Equation 36d with 33 to $W_{SB.Head}$:

$$w_{SB.Head} \sim \frac{W_{Tape} - 2 \cdot W_{Edge}}{2 \cdot N_E \cdot N_{DB} \cdot \cos(\theta_o)} + W_S - \frac{W_{TP.Nom}}{\cos(\theta_o)}. \qquad 40$$

Note that a wafer design for a head is often used for multiple product generations using different track pitches, $W_{TP}$, on the tape to achieve higher data capacities per generation. These different generations may need to operate with the same head spacings of $W_{EP}$, $W_{SE.Long}$, $W_{SE.Short}$, etc., with only the reader and or writer element widths and gaps changing. Thus a design may be chosen which functions for the potential future capacities or $W_{TP}$ values. An option is to calculate and use the average or median $W_{TP}$ for these generations in the Equations, which is what $W_{TP.Nom}$ represents. $W_{TP.Nom}$ could also be the target $W_{TP}$ for a single use.

Note that, $W_{SB.Head}$ is not a physical parameter of the head and is only useful for calculations.

Inserting $W_{SB.Tape}$ from Equation 36b into 39 yields:

$$W_{ServoSpan.Tape} = \left(N_E + \frac{1}{2}\right) \cdot W_{EP.Tape} + W_S \cdot \cos(\theta_o) + 2 \cdot W_{SBG} - W_{TP.Nom}. \qquad 41$$

Inserting $W_{EP.Tape}$ from Equation 34b into 38b yields:

$$W_{SB.Tape} \sim \frac{W_{EP.Tape}}{2} + W_S \cdot \cos(\theta_o) - W_{TP.Nom}, \qquad 42$$

with $W_{EP.Tape}$ given by 34b or 34e with respective errors of 0.2% and 2%.

To set the media specifications, the designers may define $W_{Tape}$, $W_{Edge}$, $W_{SB.Tape}$, and $W_{SBG}$, calculate a $W_{ServoSpan.Tape}$. The specifications then define a nominal tape width with a loose tolerance, such as 10 mm to 20 mm width dimension, or whatever tolerances allow for physically running the tape. The specification on $W_{ServoSpan.Tape}$ must be tightly defined within a range that can be compensated for environmental and aging changes, preferably within ±1 mm. $W_{SB.Tape}$ can then be set to be the calculated value as the minimum, $W_{SB.Tape}$.cal as the value in Equation 36b, and the maximum adding $W_{SB.Tape}$.cal+$W_{SBG}$.

Now for the head definitions. Repeating Equation 35b for the element pitch on the head, $W_{EP.Head}$, for an accuracy of about 0.2%:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(\theta_o)}. \qquad 43a$$

Or repeating Equation 35c for the element pitch on the head for an accuracy of about 2%:

$$W_{EP.Head} \sim \frac{W_{Tape} - 2 \cdot W_{Edge}}{N_E \cdot N_{DB} \cdot \cos(\theta_o)}. \qquad 43b$$

Next is the servo reader locations. $W_{SE.Short.Head}$ is calculated from Equations 38a with 33.

$$W_{SE.Short.Head} = \qquad\qquad 44a$$
$$\frac{W_{SB.Tape}}{\cos(\theta_o)} - \frac{W_S}{2 \cdot \cos(\theta_o)} + \frac{W_{SBG}}{\cos(\theta_o)} + \frac{W_{OutBuff}}{2 \cdot \cos(\theta_o)} + \frac{W_{TP}}{2 \cdot \cos(\theta_o)}.$$

Removing the contribution from $W_{OutBuff}$ and replacing $W_{TP}$ with $W_{TP.Nom}$ and using Equation 42 for $W_{SB.Tape}$ gives:

$$W_{SE.Short.Head} = \frac{W_{EP.Head}}{2} + \frac{W_S}{2} + \frac{W_{SBG}}{\cos(\theta_o)} - \frac{W_{TP.Nom}}{2 \cdot \cos(\theta_o)}. \qquad 44b$$

With $W_{TP.Nom}$=350 nm and $W_{TP}$=350±150 nm and $W_{OutBuff}$~250 nm, the error in $W_{SE.Short.Head}$ using Equation 44b rather than 44a is between 50 and 200 nm.

$W_{SE.Long.Head}$ is calculated from Equation 38b with 33:

$$W_{SE.Long.Head} = W_{EP.Head} - \frac{W_{OuterBuf}}{2 \cdot \cos(\theta_o)} + \frac{W_{SBG}}{\cos(\theta_o)} + \frac{W_S}{2} - \frac{W_{TP}}{2 \cdot \cos(\theta_o)}. \qquad 45a$$

Removing the contribution from $W_{OutBuff}$ and replacing $W_{TP}$ with $W_{TP.Nom}$, 45a becomes:

$$W_{SE.Long.Head} = W_{EP.Head} + \frac{W_{SBG}}{\cos(\theta_o)} + \frac{W_S}{2} - \frac{W_{TP.Nom}}{2 \cdot \cos(\theta_o)}. \qquad 45b$$

$W_{ServoSpan.Head}$ can be calculated as:

$$W_{ServoSpan.Head} = W_{SE.Short.Head} + W_{SE.Long.Head} + (N_E - 1) \cdot W_{EP.Head}. \qquad 46a$$

Combining Equations 44b and 45b into 46a yields:

$$W_{ServoSpan.Head} \sim \left(N_E + \frac{1}{2}\right) \cdot W_{EP.Head} + W_S + \frac{2 \cdot W_{SBG}}{\cos(\theta_o)} - \frac{W_{TP.Nom}}{\cos(\theta_o)}. \qquad 46b$$

Exemplary Chip Dimensions

The tape head module and chip dimensions are specified prior to production. A wafer contains many tape head chips. The chip is defined as the wafer portion containing all the elements. The chip is then attached to a module. For a tape head, the center of the design is centered on the module. The module, in-turn, may be centered over the tape. The width of the chip may or may not span the width of the module.

Figure 22:
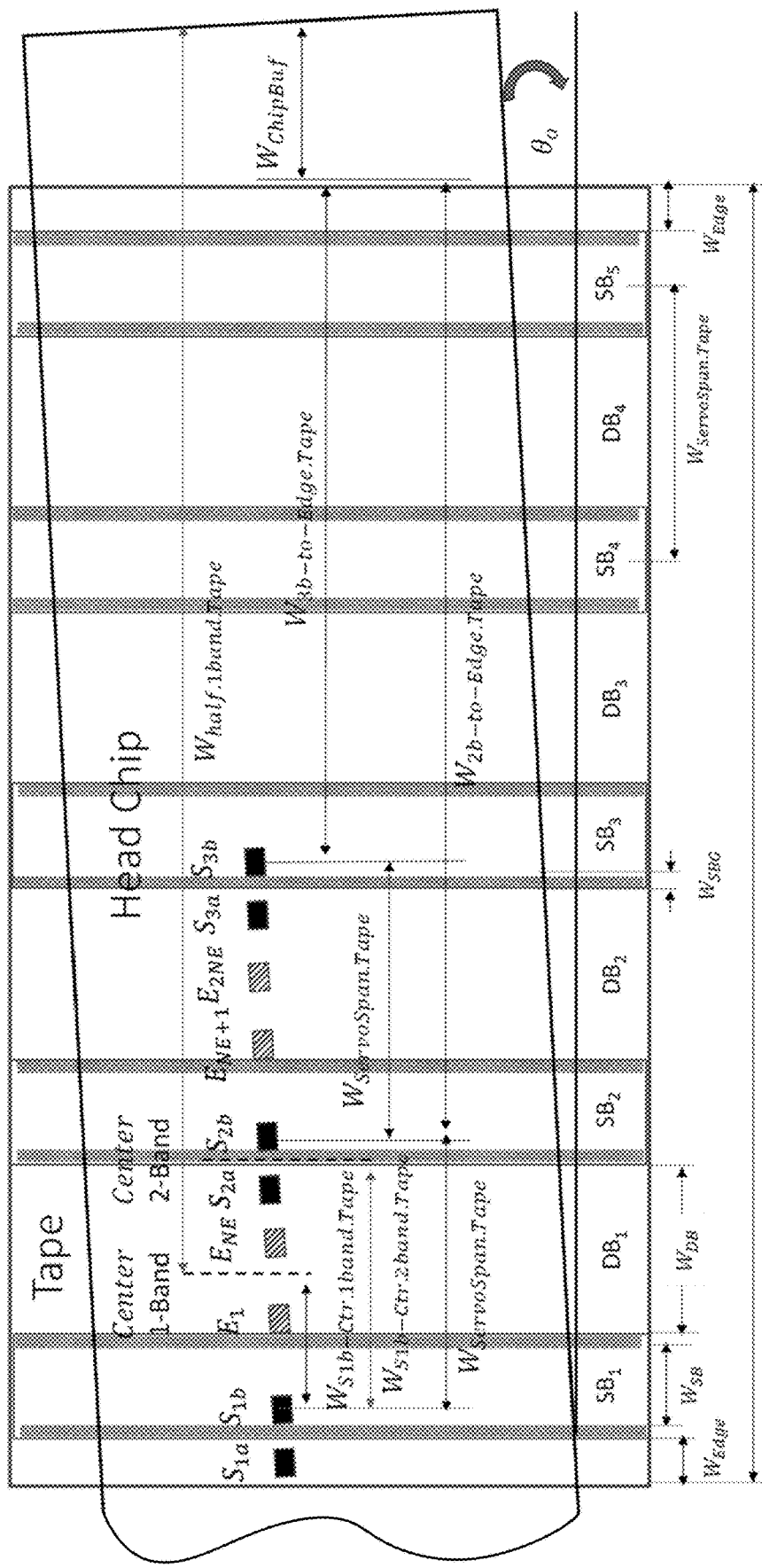
FIG. 22 is a schematic of a head chip with a dual-band head design with two servo readers per band taken in the reference frame of the tape, in accordance with an exemplary approach.

FIG. 22 depicts a head chip (Head Chip) overlaying a tape (Tape). The head chip has a dual-band head design with two servo readers per band. The depicted features of the head chip and tape shown in FIG. 22 can be used to explain both dual-band and a single-band head design to determine the dimensions. Preferably, the head chip extends beyond the edge of the tape by a minimum distance, $W_{ChipBuf}$. In calculating the requisite width of the chip to ensure the tape is always supported by the chip, it is assumed that $W_{ChipBuf}$ is large (ie $W_{ChipBuf}$>100 µm). Thus, the relevant parameters can be approximated by their terms which are at least 10s of microns. Thus $W_{SBG}$ and $W_S$ can be ignored. The cos ($\theta_o$) term to convert from tape reference to head reference is significant across the width of the tape. Note that $W_{Tape}$ and $W_{Edge}$ are in the tape reference frame, so no subscript is needed. The calculation will be first done in the reference frame of the tape, and then converted to the head/chip reference frame using Equation 33:

$$W_{EP.Tape} \sim \frac{W_{Tape} - 2 \cdot W_{Edge}}{N_E \cdot N_{DB} + \frac{(N_{DB}+1)}{2}}, \qquad 46a$$

$$W_{SB.Tape} \sim \frac{W_{EP.Tape}}{2}. \qquad 46b$$

$$W_{SE.Long.Tape} \sim W_{EP.Tape} \qquad 46c$$

$$W_{SE.Short.Tape} \sim \frac{W_{EP.Tape}}{2} \qquad 46d$$

$$W_{ServoSpan.Tape} \sim \left(N_E + \frac{1}{2}\right) \cdot W_{EP.Tape} \qquad 46e$$

Viewing FIG. 22, the distance from the center of the 1-band design to the furthest edge of the chip, $W_{half.1band.Tape}$, is:

$$W_{halfChip.1band.Tape} = \qquad 47a$$
$$W_{Tape} - W_{Edge} - W_{SGB} - W_{SE.Short.Tape} - \left(\frac{N_E - 1}{2}\right) \cdot W_{EP.Tape} + W_{ChipBuf}$$

Taking $W_{SE.Short.Tape} \sim \frac{W_{EP.Tape}}{2}$, yields; $\qquad 47b$ $$W_{halfChip.1band.Tape} \sim W_{Tape} - W_{Edge} - W_{SGB} - \left(\frac{N_E}{2}\right) \cdot W_{EP.Tape} + W_{ChipBuf}$$

To determine the width in the head reference frame, simply divide by cos ($\theta_o$) and using the approximation for $W_{SE.Short.Tape}$ in Equation 46d:

$$W_{halfChip.1band.Head} \sim \frac{W_{Tape} - W_{Edge} - W_{SGB} + W_{ChipBuf}}{\cos(\theta_o)} - \qquad 47c$$
$$\left(\frac{N_E}{2}\right) \cdot W_{EP.Head}$$

The dual-band design will have two groups of $N_E$ elements. For a 4-band media, data bands, $DB_1$ and $DB_2$ will be written to simultaneously as will $DB_3$ and $DB_4$. Thus, for the dual-band design, the required distance to the edge of the chip will be less by the shift from the center of the Group 1 to the center of the 2-band design:

$$W_{half.2band.Tape} = \qquad 48a$$
$$W_{halfChip.1band.Tape} - \left(\frac{N_E - 1}{2}\right) \cdot W_{EP} - \frac{W_{SE.Short.Tape} + W_{SE.Long.Tape}}{2}$$

Combining Equations 47b and 48a and with 46c, 46d and 10 yields:

$$W_{halfChip.2band.Head} = \frac{W_{Tape} - W_{Edge} - W_{SGB} + W_{ChipBuf}}{\cos(\theta_o)} - \quad \text{48b}$$

$$(N_E - 1) \cdot W_{EP.Head} - \frac{3 \cdot W_{SE.Short.Head} + W_{SE.Long.Head}}{2}$$

Taking $W_{SE.Short.Tape} \sim \frac{W_{EP.Tape}}{2}$, and $W_{SE.Long.Tape} \sim W_{EP.Head}$, yields: 48c $$W_{halfChip.2band.Head} \sim \frac{W_{Tape} - W_{Edge} - W_{SGB} + W_{ChipBuf}}{\cos(\theta_o)} - \left(N_E + \frac{1}{4}\right) \cdot W_{EP.Head}$$

The N-band head will have the design center aligned with the module center with a minimum extension of the chip from the center being $W_{half.Nband.Head}$ where N=1 or 2 are defined by Equations 47b and 48c.

Figure 23:
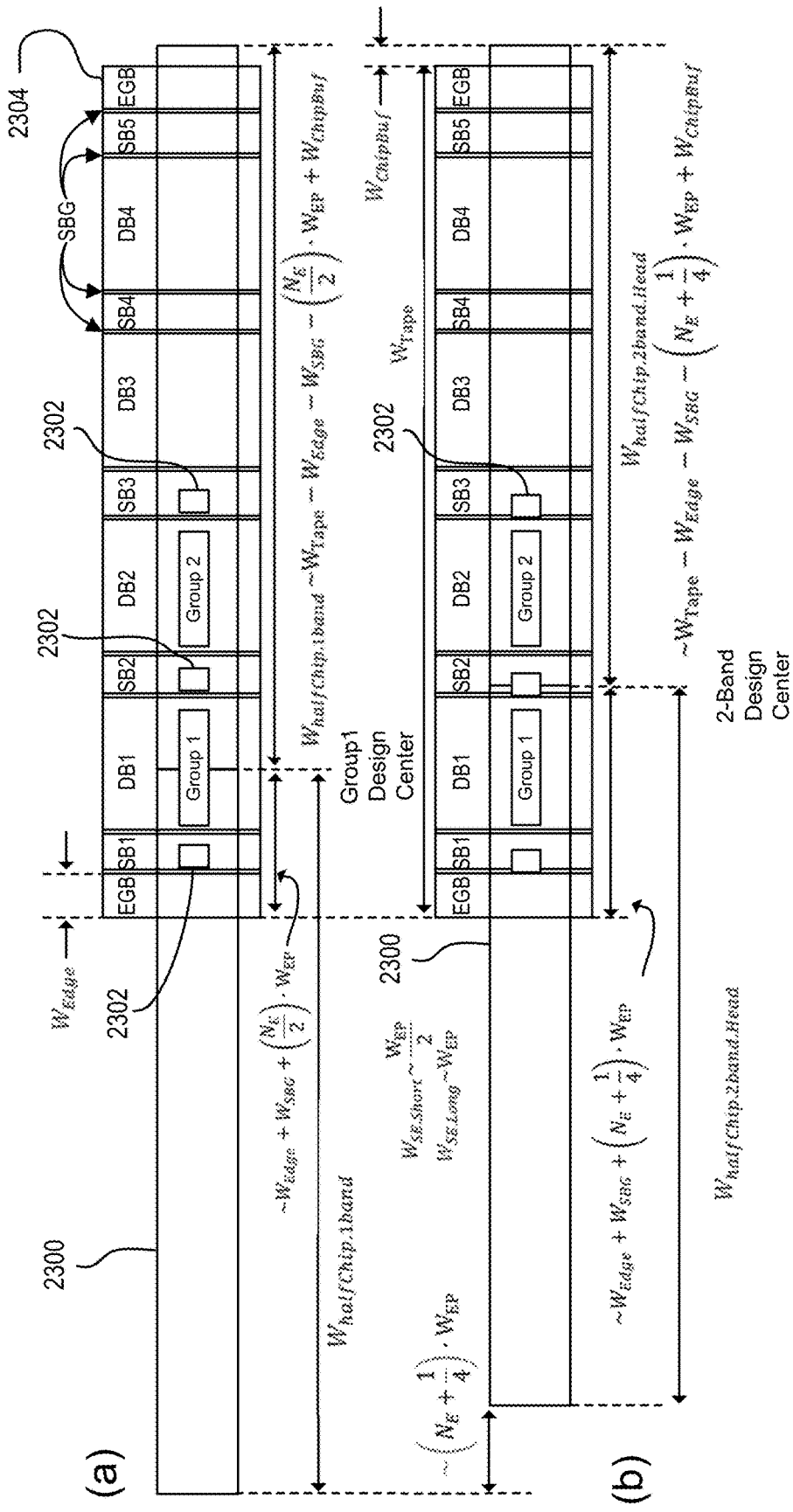
FIG. 23 is a schematic of the alignment on a module of a dual-band head with two servo readers per band for use in a tape drive with, as shown in part (a), 1-band of $N_E$ channels, and as shown in part (b), 2-bands of $2 \times N_E$ channels.

FIG. 23 is a schematic of the alignment on a module 2300 of a dual-band head design with two servo readers 2302 per band for use in a tape drive with, as shown in part (a), 1-band of $N_E$ channels, or as shown in part (b), 2-bands of $2 \times N_E$ channels. Both types of modules use the same 2-band design with $2 \times N_E$ channels to reduce the cost of building two wafer designs. As noted in comparison of FIG. 23 and Equations 47b and 48c, the width of the 1-band module is longer than the width of the 2-band module (Equation 48c). The wafer solution is to center Group 1 (or Group 2) design on the wafer chip of final width 2× the value given by Equation 48c. The chip on the wafer should have the width required for the 1-band use. For the 1-band use, the chip should be aligned on the module with the centerpoint of the Group 1 or Group 2 elements centered on the module. For the 2-band use, the chip should be aligned on the module with the centerpoint of the 2-band design centered on the module. Note that in preferred approaches, two servo readers per servo band are used.

Also shown in FIG. 23 (and FIGS. 24-25), for reference, is a tape 1204 with sections described elsewhere herein, namely edge guard bands (EGB), servo bands (SB1-SB5), data bands (DB1-DB5), and servo band guards (SBG).

Figure 24:
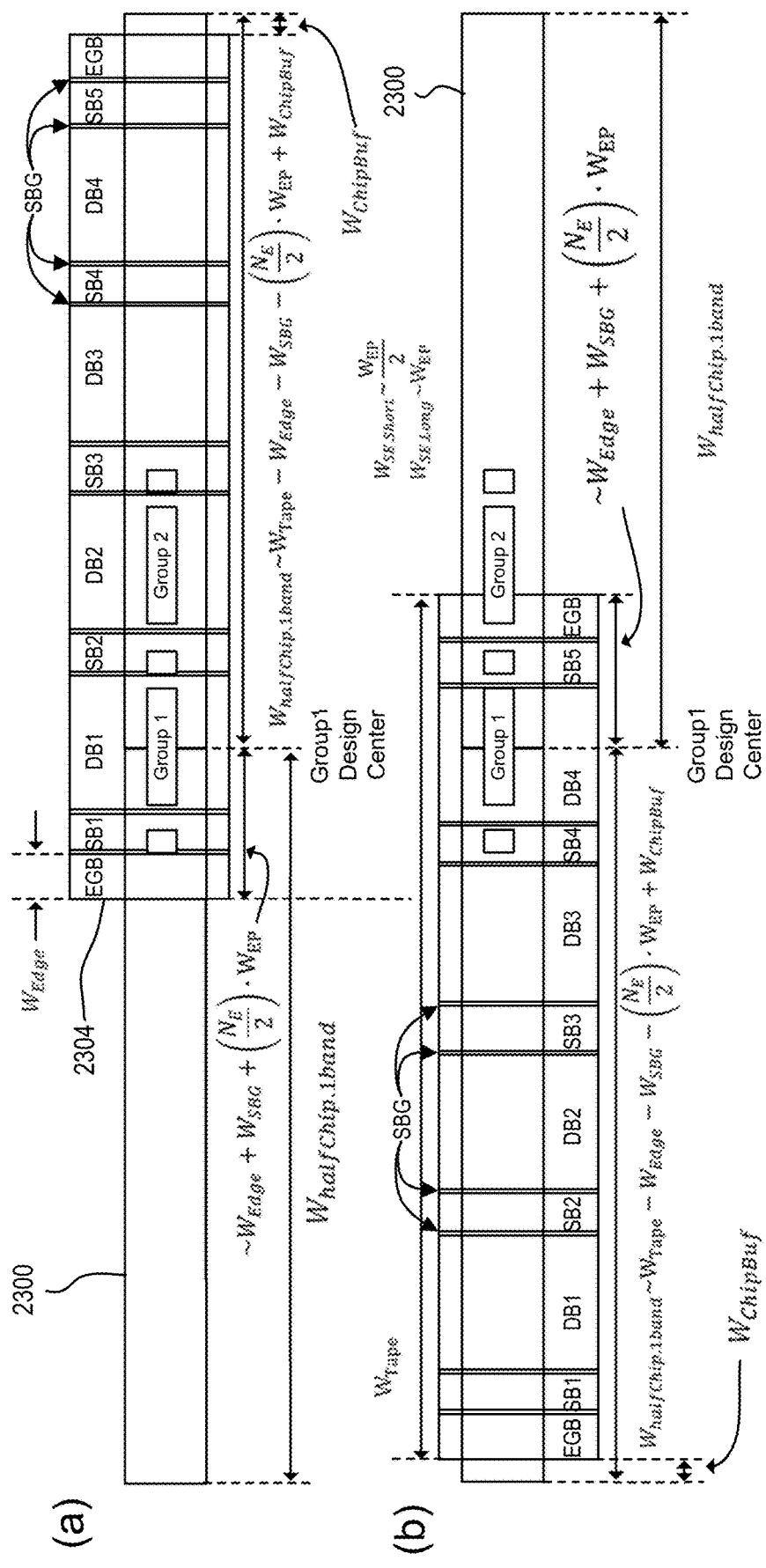
FIG. 24 is a schematic of the alignment on a module of a dual-band head with two servo readers per band for use in a tape drive with 1-band of $N_E$ channels using only Group 1 data elements aligned at operation at far ends of operation.

FIG. 24 shows the alignment on a module of a dual-band head design with two servo readers per band for use in a tape drive with 1-band of $N_E$ channels using only Group 1 elements aligned at operation at far ends of operation.

Figure 25:
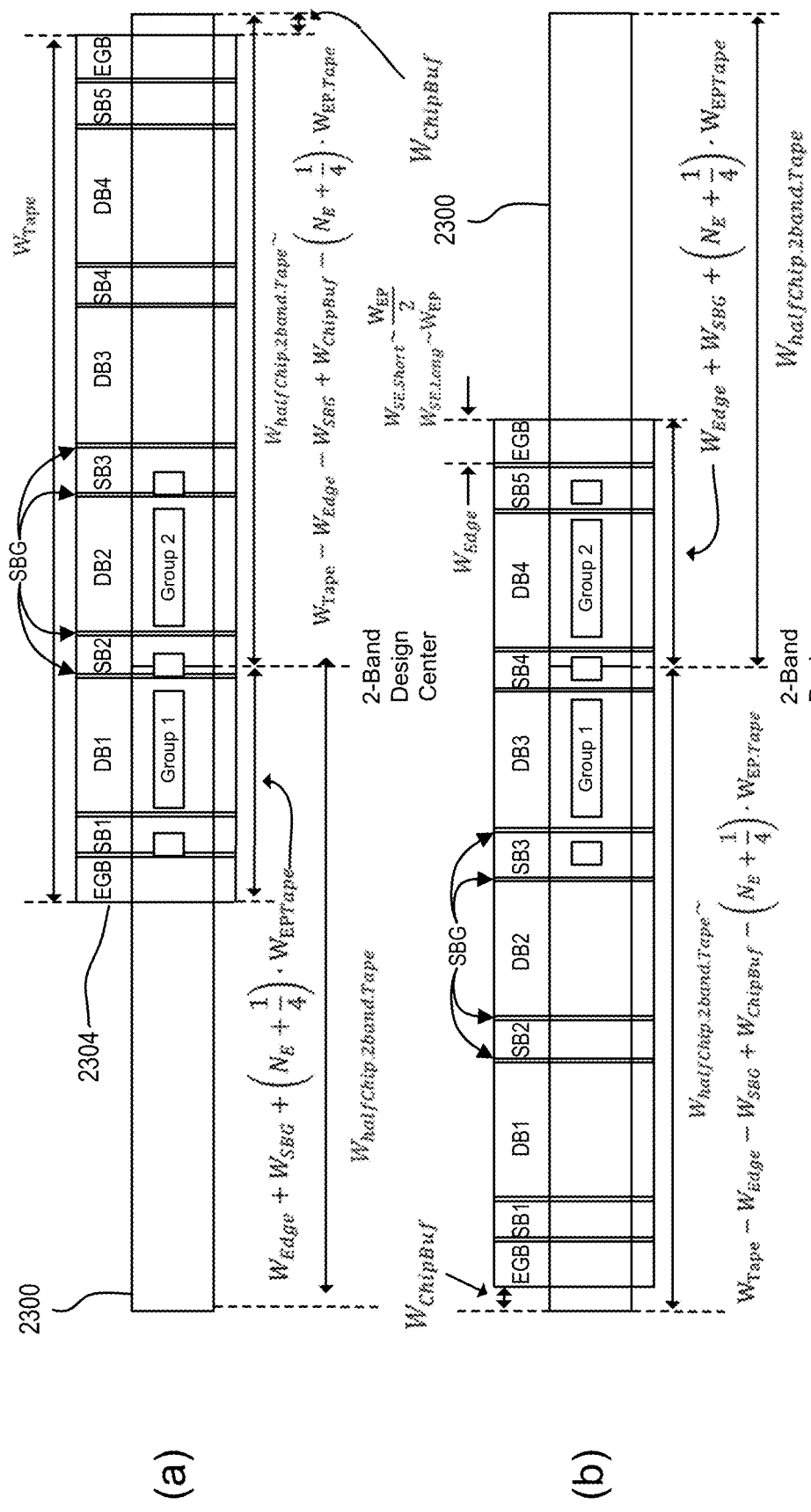
FIG. 25 is a schematic of the alignment on a module of a dual-band head with two servo readers per band for use in a tape drive with 2-band of $2 \times N_E$ channels ($N_E$ per Group), with the data elements aligned at operation at far ends of operation.

FIG. 25 shows the alignment on a module of a dual-band head design with two servo readers per band for use in a tape drive with 2-band of $2 \times N_E$ channels using both Group 1 and Group 2 elements aligned at operation at far ends of operation.

The dimensions of the elements and servo readers are fully defined by: $W_{EP.Head}$ (43a or 43b), $W_{SE.Short.Head}$ (44b), $W_{SE.Long.Head}$ (45b) and $W_{ServoSpan.Head}$ (46b).

For a single span head, in one approach, there are $N_E$ elements arranged as: $S_{1a}$, $S_{1b}$, $\{E_1, \ldots, E_{NE}\}$, $S_{2a}$, $S_{2b}$.

The elements are spaced by $W_{EP.Head}$. The spacing: $S_{1a}$-to-$E_1$ and $S_{2b}$-to-$E_{NE}$ are given by $W_{SE.Long.Head}$. The spacing: $S_{1b}$-to-$E_1$, $S_{2a}$-to-$E_{NE}$ are given by $W_{SE.Short.Head}$. The spacing: $S_{1a}$-to-$S_{2a}$ and $S_{1b}$-to-$S_{2b}$ are given by $W_{ServoSpan.Head}$.

For a dual span head, in one approach, there are two groups of $N_E$ elements arranged as: $S_{1a}$, $S_{1b}$, $\{E_1, \ldots, E_{NE}\}$, $S_{2a}$, $S_{2b}$, $\{E_{NE+1}, \ldots, E_{2NE}\}$, $S_{3a}$, $S_{3b}$.

In each group, the elements are spaced by $W_{EP.Head}$. The spacing: $S_{1a}$-to-$E_1$, $S_{2b}$-to-$E_{NE}$, and $S_{3b}$-to-$E_{2NE}$ are given by $W_{SE.Long.Head}$. The spacing: $S_{1b}$-to-$E_1$, $S_{2a}$-to-$E_{NE}$, $S_{2b}$-to-$E_{NE+1}$, and $S_{3a}$-to-$E_{2NE}$ are given by $W_{SE.Short.Head}$. The spacing: $S_{1a}$-to-$S_{2a}$, $S_{2a}$-to-$S_{3a}$, $S_{1b}$-to-$S_{2b}$, and $S_{2b}$-to-$S_{3b}$ are given by $W_{ServoSpan.Head}$.

Media Specifications

To set the media specifications, one practicing the invention may define $W_{Tape}$, $W_{Edge}$, $W_{SB.Tape}$ (42), and $W_{SBG}$, calculate a $W_{ServoSpan.Tape}$ (41). The specifications then define a nominal tape width with a loose tolerance, such as 10-20 mm width dimension, or whatever tolerances allow physically running the tape. The specification on $W_{ServoSpan.Tape}$ should be tightly defined within a range that can be compensated for in terms of environmental and aging changes, e.g., within ±1 mm. $W_{SB.Tape}$ may then be set to be the calculated value as the minimum, $W_{SB.Tape}$.cal as the value in Equation 36b, and the maximum adding $W_{SB.Tape}$.cal+$W_{SBG}$.

Physical Chip Size for a 2-Band Design with $2 \times N_E$ Elements Used for Both 1 and 2-Band Operation The wafer used to create a head should have the width required for the 1-band use. For the 1-band use, the chip should be aligned on the module with the center of the Group 1 or Group 2 elements centered on the module. For the 2-band use, the chip should be aligned on the module with the center of the 2-band design centered on the module.

$$W_{halfChip.1band.Head} \sim \frac{W_{Tape} - W_{Edge} - W_{SGB} + W_{ChipBuf}}{\cos(\theta_o)} - \quad \text{47b}$$

$$\left(\frac{N_E}{2}\right) \cdot W_{EP.Head}$$

$$W_{halfChip.2band.Head} \sim \frac{W_{Tape} - W_{Edge} - W_{SGB} + W_{ChipBuf}}{\cos(\theta_o)} - \quad \text{48c}$$

$$\left(N_E + \frac{1}{4}\right) \cdot W_{EP.Head}$$

Head Design Examples

This section provides examples of head designs. With a fixed media width, $W_{Tape}$, edge guard band, $W_{Edge}$, track pitch, $W_{TP}$, writer element width $W_W$ and buffers, Equation 12d shows that one say to increase the capacity (e.g., by increasing $N_{trk}$) is by increasing the element pitch $W_{EP}$ so that more data tracks may be written in a given data band, e.g., by using previously unused guard band space on tape. Here, an evaluation of different options is explored.

Table 1, below, provides general media and head parameters common to several illustrative designs evaluated in accordance with various approaches. Table 2 provides an evaluation of four illustrative head designs and operating points using the Equations described above. Four groups of designs are evaluated: Dn, a, b, c, d. a and b used $W_{Edge}$ of 500 mm and c and d use $W_{Edge}$ of 250 mm. a and c use Pisa angles of 0 and b and d use Pisa angles of 10 deg. D1 is a 4 DBs and 32 channels. D1 also represents a head which has 64 channels spanning two DBs, i.e., 32 channels per DB. D2 and D3 use three DBs and 32 and 64 channels respectively. D4 is a one DB analysis with 64 channels. All use the same number of elements as channels. The illustrative designs are rounded to the nearest 10 nm.

Table 2 provides the head and media parameters using the head and media parameters given in Table 1. Dimensions are rounded to 10 nm resolution. The choice of resolution depends on the wafer fabrication process. Five groups are studied: D1 to D5 respectively use 4, 3, 3, 1, and 1 data bands and 32, 32, 64, 64 and 128 elements (or channels). Each group uses 0 or 10 deg Pisa angle and 1 or 2 servo readers per servo band. Group D1 can also be used for a 64 element (or channel) design spanning two data bands (i.e. 32 elements per data band). Such a design would be:

{$NSG1$, $NEG1$, $NSG2$, $NEG2$, $NSG3$}. 49

Where NSGn represent a "group" of either 1 or 2 servo readers for 1 or 2 servo readers per group; and NEGn represent a "group" of $N_E$ elements with spacings given in Table 2.

In all cases, using two servo readers per servo band yields a higher capacity because the servo band width is narrower (close to half the size). A primary benefit of using two servo readers per band, though, is to limit the transit time across the widest servo patterns to enable the use of higher angles in the servo band pattern, which in turn translates into more precise positioning. Note that if $N_E$ is fixed, the capacity may be increased by reducing $N_{DB}$ (D2 versus D1). However, in the case of $N_E$ elements split between two data bands (D1 design with 2×32 elements and three groups of servo readers) versus placing all $N_E$ elements in a single data band and reducing the number of data bands by one (D3), the capacity is reduced. Note that the design is not affected by $W_W$, but the capacity by $\Delta W_W/W_{TP}$, where $\Delta W_W$ is the change in $W_W$ from the value given in Table 2 (see Equations 12).

One note is that for a fixed $N_E$, the servo band width increases with a reduction in $N_{DB}$ and decreases with an increase in the number of servo readers per band. For servo pattern angles of 12 degrees or lower, a $W_{SB}$ on the order of 100 mm is acceptable. However, for servo pattern angles of 18 to 24, a $W_{SB}$ should be on the order of 50 mm. Accordingly, for D4, two servo readers per servo band yield too wide a $W_{SB}$. Therefore, a design with 4 servo readers per servo band may be used. Such a model is not given here, but a similar approach may be used to develop the equations. D5 is a 128 element design with a single data band where $W_{SB}$ is again on the order of 50 mm with two servo readers per servo band.

TABLE 1

General Media and Head parameters common to the designs used in Table 2

| $W_{Tape}$ µm | $W_{Edge}$ µm | $W_S$ µm | $W_W$ µm | $W_{SBG}$ µm | $W_{OutBuf}$ nm | $W_{InBuf}$ Nm | $W_{TP}$ Nm |
|---|---|---|---|---|---|---|---|
| 12,650 | 500 | 2.0 | 10.0 | 4 | 250 | 250 | 300 |

TABLE 2

Comparison of design for variations in number of servo readers per band and $N_E$. General parameters are given in Table 1. Note the design is independent of $W_W$, but capacity will increase if a smaller $W_W$ is chosen. Dimensions are rounded to 10 nm resolution. The choice of resolution depends on the wafer fabrication process.

| test | Pisa Angle Deg | Servo Rdrs Per SB # | $N_{DB}$ # | $N_E$ # | $W_{EP}$ µm | $W_{SE}$ Long µm | $W_{SE}$ Short µm | Span on Head µm | Span on Tape µm | $W_{DB}$ µm | $W_{SB}$ µm | $N_{trk}$ # | Capacity $N_{DB} \cdot N_E \cdot N_{trt}$ # |
|---|---|---|---|---|---|---|---|---|---|---|---|---|---|
| D1a | 0 | 1 | 4 | 32 | 87.01 | 94.74 | 94.74 | 2886.88 | 2886.88 | 2784.42 | 88.46 | 256 | 32768 |
| D1b | 0 | 2 | 4 | 32 | 88.68 | 96.41 | 52.07 | 2897.55 | 2897.55 | 2837.76 | 45.79 | 260 | 33280 |
| D1c | 10 | 1 | 4 | 32 | 88.36 | 96.19 | 96.19 | 2931.43 | 2886.89 | 2784.46 | 88.43 | 256 | 32768 |
| D1d | 10 | 2 | 4 | 32 | 90.05 | 97.88 | 52.85 | 2942.26 | 2897.56 | 2837.80 | 45.76 | 262 | 33536 |
| D2a | 0 | 1 | 3 | 32 | 115.88 | 123.61 | 123.61 | 3839.56 | 3839.56 | 3708.22 | 117.33 | 352 | 33792 |
| D2b | 0 | 2 | 3 | 32 | 118.25 | 125.97 | 66.85 | 3858.48 | 3858.48 | 3783.90 | 60.57 | 360 | 34560 |
| D2c | 10 | 1 | 3 | 32 | 117.67 | 125.50 | 125.50 | 3898.80 | 3839.57 | 3708.26 | 117.30 | 352 | 33792 |
| D2d | 10 | 2 | 3 | 32 | 120.07 | 127.90 | 67.87 | 3918.01 | 3858.49 | 3783.94 | 60.54 | 360 | 34560 |
| D3a | 0 | 1 | 3 | 64 | 59.12 | 66.85 | 66.85 | 3858.48 | 3858.48 | 3783.90 | 60.57 | 162 | 31104 |
| D3b | 0 | 2 | 3 | 64 | 59.73 | 67.46 | 37.59 | 3868.23 | 3868.23 | 3822.91 | 31.32 | 164 | 31488 |
| D3c | 10 | 1 | 3 | 64 | 60.04 | 67.87 | 67.87 | 3918.01 | 3858.49 | 3783.94 | 60.54 | 162 | 31104 |
| D3d | 10 | 2 | 3 | 64 | 60.66 | 68.48 | 38.16 | 3927.91 | 3868.24 | 3822.95 | 31.29 | 164 | 31488 |
| D4a | 0 | 1 | 1 | 64 | 176.05 | 183.77 | 183.77 | 11458.50 | 11458.50 | 11267.01 | 177.50 | 552 | 35328 |
| D4b | 0 | 2 | 1 | 64 | 178.76 | 186.48 | 97.10 | 11545.17 | 11545.17 | 11440.34 | 90.83 | 560 | 35840 |
| D4c | 10 | 1 | 1 | 64 | 178.76 | 186.59 | 186.59 | 11635.30 | 11458.53 | 11267.07 | 177.47 | 552 | 35328 |
| D4e | 10 | 2 | 1 | 64 | 181.51 | 189.34 | 98.59 | 11723.31 | 11545.20 | 11440.40 | 90.80 | 562 | 35968 |
| D5a | 0 | 1 | 1 | 128 | 89.38 | 97.10 | 97.10 | 11545.17 | 11545.17 | 11440.34 | 90.83 | 262 | 33536 |
| D5b | 0 | 2 | 1 | 128 | 90.07 | 97.80 | 52.76 | 11589.52 | 11589.52 | 11529.03 | 46.49 | 266 | 34048 |
| D5c | 10 | 1 | 1 | 128 | 90.76 | 98.59 | 98.59 | 11723.31 | 11545.20 | 11440.40 | 90.80 | 264 | 33792 |
| D5d | 10 | 2 | 1 | 128 | 91.46 | 99.29 | 53.56 | 11768.33 | 11589.55 | 11529.09 | 46.46 | 266 | 34048 |

In one exemplary approach for a dual band head with two servos per servo band, exemplary parameters for a 10 degree nominal tilt angle are: $N_E$ (=32) elements per band, $N_{DB}$=4, $W_{EP.Head}$=90.05 µm, $W_{SE.Long.Head}$=97.88 µm, $W_{SE.Short.Head}$=52.85 µm, $W_{HeadSpan.Head}$=2942.26 µm.

In one exemplary approach for media, exemplary parameters are: $W_{Tape}$=12,650 µm, $W_{Span.Tape}$=2897.80 µm, $N_{DB}$=4 and $N_{SB}$=5, $W_{SB.Tape}$=45.76 µm {−0, +8 µm} with $W_{Edge}$=500 µm.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration but are not intended to be exhaustive or limited to the approaches disclosed. Many modifications and variations will be apparent to those of ordinary skill in the art without departing from the scope and spirit of the described approaches. The terminology used herein was chosen to best explain the principles of the present invention, the practical application or technical improvement over technologies found in the marketplace, or to enable others of ordinary skill in the art to understand the approaches disclosed herein.

What is claimed is:

1. An apparatus, comprising:
a magnetic head having an array of transducers, the transducers comprising data elements, at least two first servo readers positioned toward a first end of the array and at least two second servo readers positioned toward a second end of the array,
wherein the array is symmetrical about a centerpoint thereof, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto,
the magnetic head having a second array of transducers aligned along a longitudinal axis of the array, wherein a first end of the second array is positioned adjacent the second end of the array on the longitudinal axis of the array, wherein the second array of transducers comprises second data elements and at least two third servo readers positioned toward a second end of the second array, wherein a number of the second data elements is equal to a number of the data elements.

2. An apparatus as recited in claim 1, wherein only two of the first servo readers and only two of the second servo readers are present in the array.

3. An apparatus as recited in claim 2, wherein:
a number of the data elements, $N_E$, in the array is 32, the data elements having an average pitch $W_{EP.Head}$ in a range of 86 to 97 microns,
a center to center distance $W_{SE.Short.Head}$ between the data element closest to the first end of the array and the first servo reader closest to the data elements is in a range of $(W_{EP.Head}/2)+3$ to $(W_{EP.Head}/2)+10$ microns,
a center to center distance $W_{SE.Long.Head}$ between the data element closest to the first end of the array and the first servo reader farthest from the data elements is in a range of $W_{EP.Head}+3$ to $W_{EP.Head}+10$ microns,
a center to center distance between the data element closest to the second end of the array and the second servo reader closest to the data element is about equal to $W_{SE.Short.Head}$,
a center to center distance between the data element closest to the second end of the array and the second servo reader farthest from the data element is about equal to $W_{SE.Long}$.

4. An apparatus as recited in claim 1, wherein the data elements are write elements, wherein the magnetic head includes a second array aligned with the array in an intended direction of tape travel thereacross, the second array comprising read elements, at least two third servo readers positioned toward a first end of the second array and at least two fourth servo readers positioned toward a second end of the second array, wherein the second array is symmetrical about a centerpoint thereof.

5. An apparatus as recited in claim 1, wherein a longitudinal axis of the array is nominally tilted by greater than 0 degrees from normal relative to an intended direction of tape travel thereacross.

6. An apparatus as recited in claim 1, wherein a distance between the center of the innermost second servo reader and a center of the second data element of the second array closest thereto is the same as the distance between the center of the outermost first servo reader and the center of the data element closest thereto, wherein a distance between a center of the outermost second servo reader and a center of the second data element of the second array closest thereto is the same as the distance between the center of the innermost second servo reader and the center of the data element closest thereto.

7. An apparatus as recited in claim 6, wherein a combined array consisting of the array and the second array is symmetrical about a centerpoint of the combined array.

8. An apparatus as recited in claim 1, wherein an average pitch $W_{EP.Head}$ of the data elements satisfies one or more of the following equations:

$$W_{EP.Head} \sim \frac{W_{Tape} - 2 \cdot W_{Edge}}{\left(N_E \cdot N_{DB} + \frac{(N_{DB}+1)}{2}\right) \cdot \cos(\theta_o)}$$

$$W_{EP.Head} \sim \frac{W_{Tape} - 2 \cdot W_{Edge}}{N_E \cdot N_{DB} \cdot \cos(\theta_o)}$$

with an accuracy of 10%, where:
$W_{Tape}$ is a total width of a magnetic tape specified by a format for which the apparatus is designed,
$W_{Edge}$ is a width of an edge band of the magnetic tape specified by the format,
$N_E$ is a total number of data elements in the array,
$N_{DB}$ is a number of data bands on the magnetic tape specified by the format, and
$\theta_o$ is a nominal tilt angle of the magnetic head relative to normal from an intended direction of tape travel across the magnetic head.

9. An apparatus as recited in claim 1, wherein an average pitch $W_{EP.Head}$ of the data elements satisfies the following equation:

$$W_{EP.Head} = \left(\frac{W_{Tape} - 2 \cdot W_{Edge} - (N_{DB}+1) \cdot (W_S [\![ \cdot \cos(\theta]\!]_o) + 2 \cdot W_{SBG} - W_{TP.Nom})}{\left(N_E \cdot N_{DB} + \frac{(N_{DB}+1)}{2}\right) [\![ \cdot \cos(\theta]\!]_o)}\right)$$

with an accuracy of 2%, where:
$W_{Tape}$ is a total width of a magnetic tape specified by a format for which the apparatus is designed,
$W_{Edge}$ is a width of an edge band of the magnetic tape specified by the format,
$W_S$ is a width of a servo band of the magnetic tape specified by the format,
$W_{SBG}$ is a width of a servo band guard of the magnetic tape specified by the format,
$W_{TP.Nom}$ is a predefined nominal data track pitch that is in a range of greater than 0 to 650 nanometers, $N_E$ is a total number of data elements in the array for performing data operations on one data band, $N_{DB}$ is a number of data bands on the magnetic tape specified by the format, and $\theta_o$ is a nominal tilt angle of the magnetic head relative to normal from an intended direction of tape travel across the magnetic head.

10. An apparatus as recited in claim 1, wherein a distance $W_{SE.Short.Head}$ between the center of the innermost first servo reader and the center of the data element closest thereto satisfies the following equation:

$$W_{SE.Short.Head} = \frac{W_{EP.Head}}{2} + \frac{W_S}{2} + \frac{W_{SBG}}{[\![\cos(\theta)]\!]_o}$$

with an accuracy of 2%, where:

$W_{EP.Head}$ is an average pitch of the data elements of the array, $W_S$ is a width of the servo readers in the array, $W_{SBG}$ is a width of a servo band guard specified by a format for which the apparatus is designed, and $\theta_o$ is a nominal tilt angle of the magnetic head relative to normal from an intended direction of tape travel across the magnetic head.

11. An apparatus as recited in claim 1, wherein a distance $W_{SE.Short.Head}$ between the center of the innermost first servo reader and the center of the data element closest thereto satisfies the following equation:

$$W_{SE.Short.Head} = \frac{W_{EP.Head}}{2} + \frac{W_S}{2} - \frac{W_{TP.Nom}}{2[\![\cdot\cos(\theta)]\!]_o} + \frac{W_{SBG}}{[\![\cos(\theta)]\!]_o}$$

with an accuracy of 2%, where:

$W_{EP.Head}$ is an average pitch of the data elements of the array, $W_S$ is a width of the servo readers in the array, $W_{SBG}$ is a width of a servo band guard specified by a format for which the apparatus is designed, $W_{TP.Nom}$ is a predefined nominal data track pitch that is in a range of greater than 0 to 650 nanometers, and $\theta_o$ is a nominal tilt angle of the magnetic head relative to normal from an intended direction of tape travel across the magnetic head.

12. An apparatus as recited in claim 1, wherein a distance $W_{SE.Long.Head}$ between the center of the outermost first servo reader and the center of the data element closest thereto satisfies the following equation:

$$W_{SE.Long.Head} = W_{EP.Head} + \frac{W_S}{2} + \frac{W_{SBG}}{[\![\cos(\theta)]\!]_o}$$

with an accuracy of 2%, where:

$W_{EP.Head}$ is an average pitch of the data elements of the array, $W_S$ is a width of the servo readers in the array, $W_{SBG}$ is a width of a servo band guard specified by a format for which the apparatus is designed, and $\theta_o$ is a nominal tilt angle of the magnetic head relative to normal from an intended direction of tape travel across the magnetic head.

13. An apparatus as recited in claim 1, wherein a distance $W_{SE.Long.Head}$ between the center of the outermost first servo reader and the center of the data element closest thereto satisfies the following equation:

$$W_{SE.Long.Head} = W_{EP.Head} + \frac{W_S}{2} - \frac{W_{TP.Nom}}{2[\![\cdot\cos(\theta)]\!]_o} + \frac{W_{SBG}}{[\![\cos(\theta)]\!]_o}$$

with an accuracy of 2%, where:

$W_{EP.Head}$ is an average pitch of the data elements of the array, $W_S$ is a width of the servo readers in the array, $W_{TP.Nom}$ is a predefined nominal data track pitch that is in a range of greater than 0 to 650 nanometers, $W_{SBG}$ is a width of a servo band guard specified by a format for which the apparatus is designed, and $\theta_o$ is a nominal tilt angle of the magnetic head relative to normal from an intended direction of tape travel across the magnetic head.

14. An apparatus as recited in claim 1, wherein a distance $W_{ServoSpan.Head}$ between the center of the innermost one of the first servo readers and the center of the outermost one of the second servo readers satisfies the following equation:

$$W_{ServoSpan.Head} \sim \left(N_E + \frac{1}{2}\right) \cdot W_{EP.Head} + W_S + \frac{2 \cdot W_{SBG}}{[\![\cos(\theta)]\!]_o}$$

with an accuracy of 2%, where:

$N_E$ is a total number of data elements in the array, $W_{EP.Head}$ is an average pitch of the data elements of the array, $W_S$ is a width of the servo readers in the array, $W_{SBG}$ is a width of a servo band guard specified by a format for which the apparatus is designed, and $\theta_o$ is a nominal tilt angle of the magnetic head relative to normal from an intended direction of tape travel across the magnetic head.

15. An apparatus as recited in claim 1, wherein a distance $W_{ServoSpan.Head}$ between the center of the innermost one of the first servo readers and the center of the outermost one of the second servo readers satisfies the following equation:

$$W_{ServoSpan.Head} = \left(N_E + \frac{1}{2}\right) \cdot W_{EP.Head} + W_S + \frac{2 \cdot W_{SBG} - W_{TP.Nom}}{[\![\cos(\theta)]\!]_o}$$

with an accuracy of 2%, where:

$N_E$ is a total number of data elements in the array, $W_{EP.Head}$ is an average pitch of the data elements of the array, $W_S$ is a width of the servo readers in the array, $W_{TP.Nom}$ is a predefined nominal data track pitch that is in a range of greater than 0 to 650 nanometers, $W_{SBG}$ is a width of a servo band guard specified by a format for which the apparatus is designed, wherein $W_{SBG}$ is in a range of greater than 0 to 5 microns, and $\theta_o$ is a nominal tilt angle of the magnetic head relative to normal from an intended direction of tape travel across the magnetic head.

16. An apparatus as recited in claim 1, comprising:

a drive mechanism for passing a magnetic tape over the magnetic head; and a controller electrically coupled to the magnetic head.

17. An apparatus as recited in claim 16, wherein the controller is configured to not overwrite any portions of servo bands with data tracks during writing.

18. An apparatus, comprising:
a magnetic head having an array of transducers and a second array of transducers aligned along a same longitudinal axis, wherein a first end of the second array is positioned adjacent a second end of the array on the longitudinal axis of the arrays;
the array comprising data elements, at least two first servo readers positioned toward a first end of the array and at least two second servo readers positioned toward the second end of the array; and
the second array comprising at least two third servo readers positioned toward a second end of the second array, the second array comprising second data elements positioned between the second servo readers of the array and the third servo readers of the second array, wherein the array is symmetrical about a centerpoint thereof, such that a distance between a center of an innermost one of the first servo readers and a center of the data element closest thereto is the same as a distance between a center of an innermost one of the second servo readers and a center of the data element closest thereto, and such that a distance between a center of an outermost one of the first servo readers and the center of the data element closest thereto is the same as a distance between a center of an outermost one of the second servo readers and the center of the data element closest thereto, and
wherein a distance between the center of the innermost second servo reader and a center of the data element of the second array closest thereto is the same as the distance between the center of the outermost first servo reader and the center of the data element closest thereto, wherein a distance between a center of the outermost second servo reader and a center of the data element of the second array closest thereto is the same as the distance between the center of the innermost second servo reader and the center of the data element closest thereto.

19. An apparatus as recited in claim 18, wherein only two of the first servo readers and only two of the second servo readers are present in the array.

20. An apparatus as recited in claim 18, wherein the data elements are write elements, wherein the magnetic head includes a third array aligned with the array in an intended direction of tape travel thereacross and a fourth array aligned with the second array in the intended direction of tape travel, the third array comprising read elements, at least two fourth servo readers positioned toward a first end of the third array and at least two fifth servo readers positioned toward a second end of the third array, wherein the third array is symmetrical about a centerpoint thereof.

21. An apparatus as recited in claim 18, wherein a longitudinal axis of the array is nominally tilted by greater than 0 degrees from normal relative to an intended direction of tape travel thereacross.

22. An apparatus as recited in claim 18, wherein a combined array consisting of the array and the second array is symmetrical about a centerpoint of the combined array.

23. A product, comprising:
a magnetic tape having a plurality of servo bands extending along a longitudinal axis of the magnetic tape, wherein a width $W_{SB.Tape}$ of each of the servo bands satisfies the following equation:

$$W_{SB.Tape} \sim \frac{W_{EP.Tape}}{2}$$

to an accuracy of 10%, where:
$W_{EP.Tape}$ is an average pitch of elements on a head used to read and write data and is given as:

$$W_{EP.Tape} \sim \left( \frac{W_{Tape} - 2 \cdot W_{Edge}}{\left( N_E \cdot N_{DB} + \frac{(N_{DB} + 1)}{2} \right)} \right)$$

where:
$N_E$ is the number of elements used to write each data band,
$N_{DB}$ is the number of databands specified by a format of the magnetic tape,
$W_{Edge}$ is a width of an edge band of the magnetic tape where no data and no servo pattern is written as specified by the format, and
$W_{Tape}$ is a width of the magnetic tape.

24. A product as recited in claim 23, wherein a pitch $W_{ServoSpan.Tape}$ of adjacent pairs of the servo bands satisfies the following equation:

$$W_{ServoSpan.Tape} \sim \left( N_E + \frac{1}{2} \right) \cdot W_{EP.Tape} + 2 \cdot W_{SBG}$$

to an accuracy of 1%, where:
$N_E$ is a total number of data elements for concurrent writing per data band as specified by a format of the magnetic tape, and
$W_{SBG}$ is a width of a servo band guard, wherein $W_{SBG}$ is in a range of greater than 0 to 5 microns.

25. A product as recited in claim 23, wherein a pitch $W_{ServoSpan.Tape}$ of adjacent pairs of the servo bands satisfies the following equation:

$$W_{ServoSpan.Tape} = W_{SE.Short.Tape} + W_{SE.Long.Tape} + (N_E - 1) \cdot W_{EP.Tape}$$

with an accuracy of 1%, where
$W_{EP.Tape}$ is an average pitch of elements on the head used to read and write data and is given as:

$$W_{EP.Tape} \sim \left( \frac{W_{Tape} - 2 \cdot W_{Edge}}{\left( N_E \cdot N_{DB} + \frac{(N_{DB} + 1)}{2} \right)} \right)$$

$W_{SE.Short.Tape}$ is a design pitch, specified by a format of the magnetic tape, between a data element closest to a first end of an array and a servo reader of the array located closest to the data element, and is given by:

$$W_{SE.Short.Tape} \sim \frac{W_{EP.Tape}}{2}$$

$W_{SE.Long.Tape}$ is a design pitch, specified by a format of the magnetic tape, between the data element closest to the first end of the array and a second servo reader of the array located closest to the first end,
and is given by:

$$W_{SE.Short.Tape} \sim W_{EP.Tape}$$

where:
- $N_E$ is a total number of data elements for concurrent writing specified by a format of the magnetic tape, and
- $N_{DB}$ is a total number of data bands on the tape specified by a format of the magnetic tape, and
- $W_{Tape}$ is the width of the tape and specified by a format of the magnetic tape, and
- $W_{Edge}$ is a width of an edge band of the tape and specified by a format of the magnetic tape as the region on the tape where no data or servo pattern is written.

* * * * *